Nov. 6, 1956  J. S. BURGE ET AL  2,769,228
ASSEMBLING MACHINE

Filed April 11, 1951  39 Sheets-Sheet 1

Inventors
James S. Burge
Hilton J. McKee
Roy J. Alexander
Louis H. Conrad
Warren M. Rider
Gustave H. Noetzel
James F. Selatin
by Willits Hardman & Fehr
their attorneys

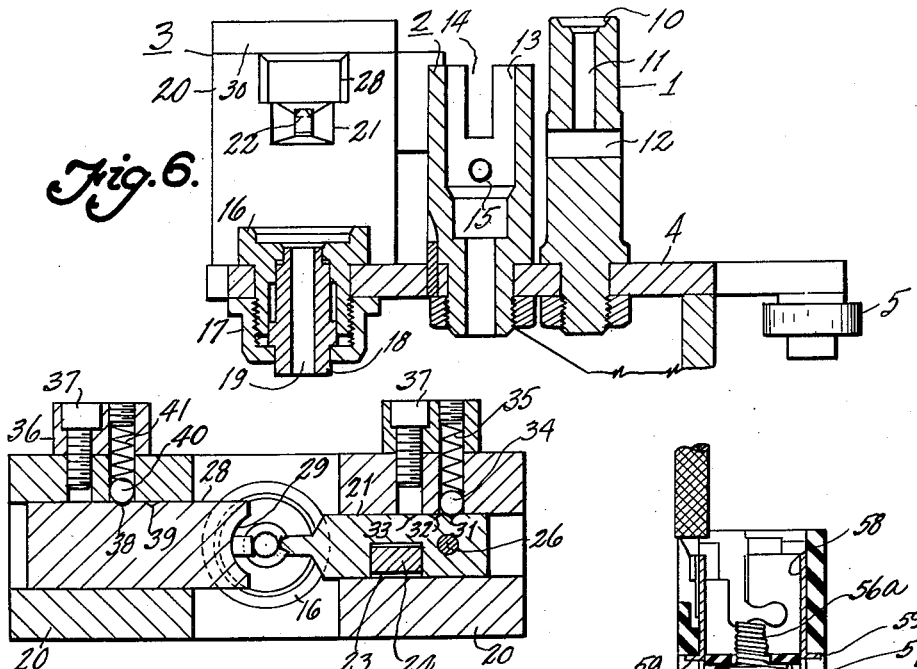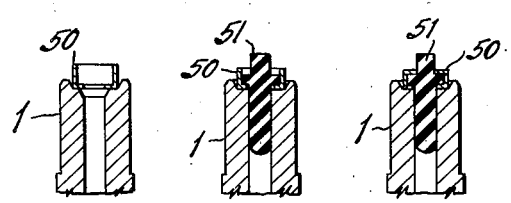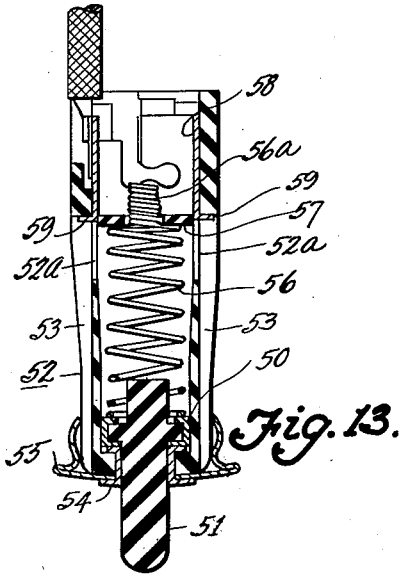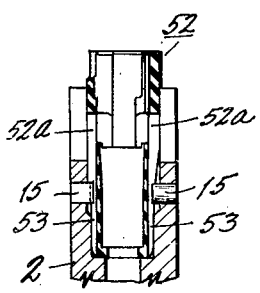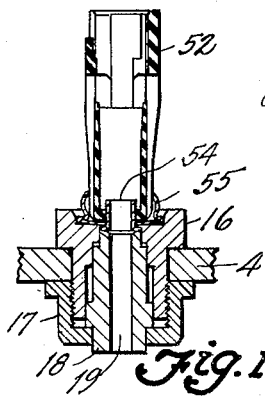

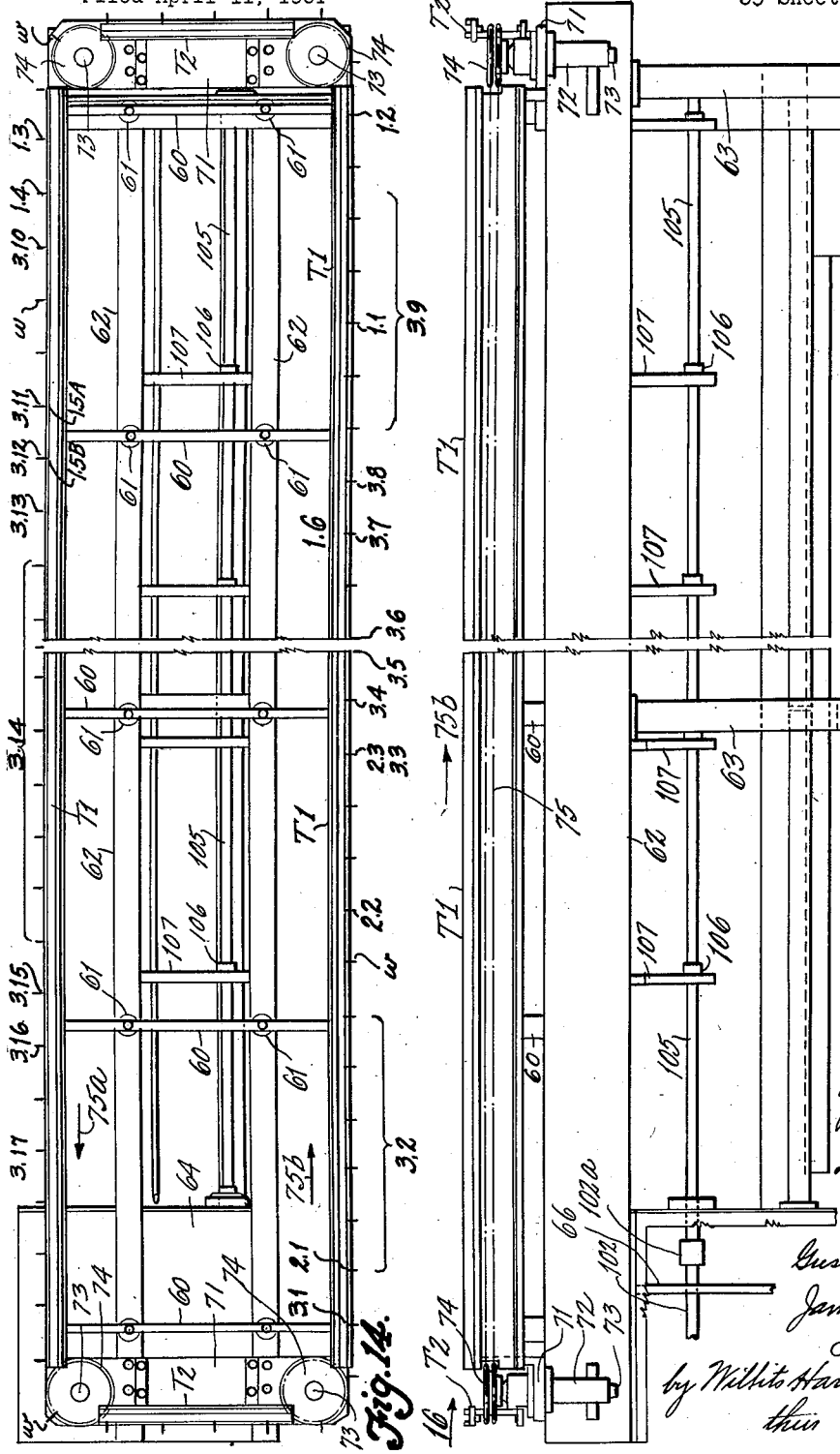

Nov. 6, 1956  J. S. BURGE ET AL  2,769,228
ASSEMBLING MACHINE
Filed April 11, 1951  39 Sheets-Sheet 4

Inventors
James S. Burge
Hilton J. McKee
Roy T. Alexander, Loris H. Conrad
Warren M. Rider, Gustav H. Noetzel
James F. Salatin
by Willits Hardman & Fehr
their attorneys Nov. 6, 1956 J. S. BURGE ET AL 2,769,228
ASSEMBLING MACHINE
Filed April 11, 1951 39 Sheets-Sheet 5
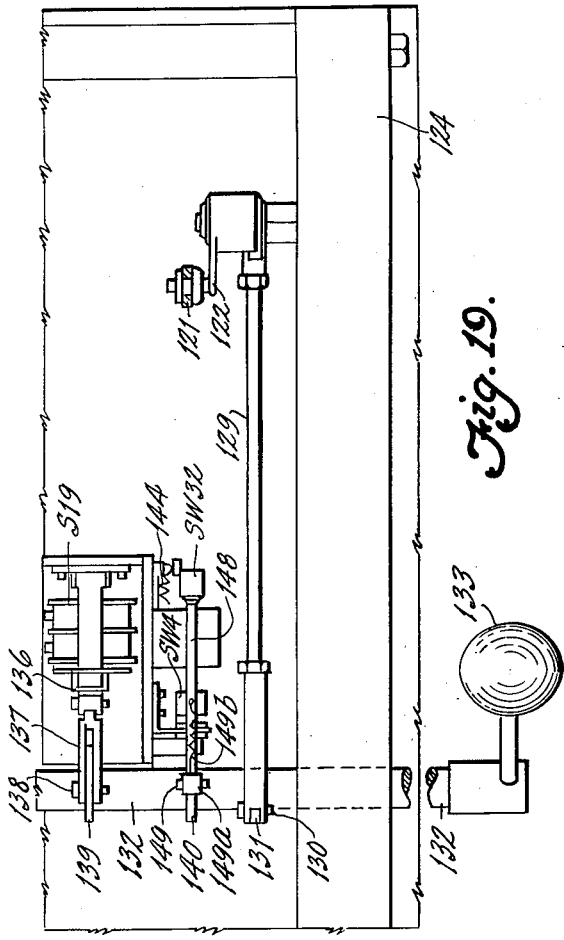
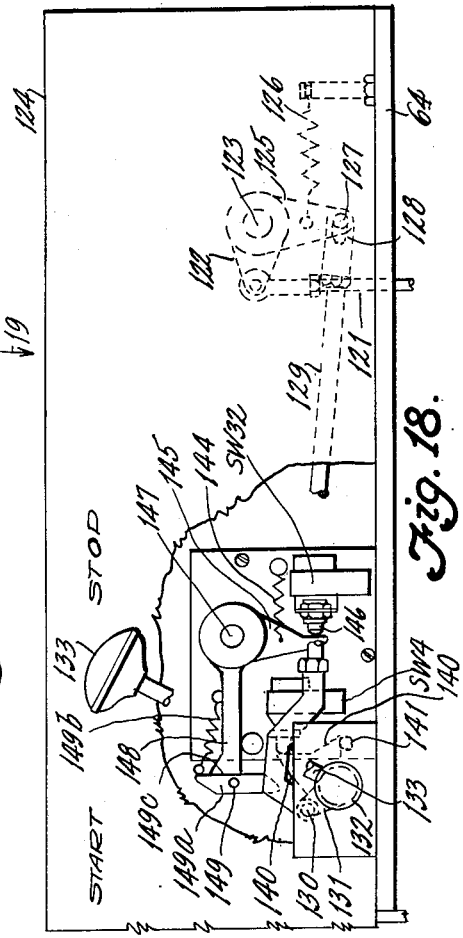
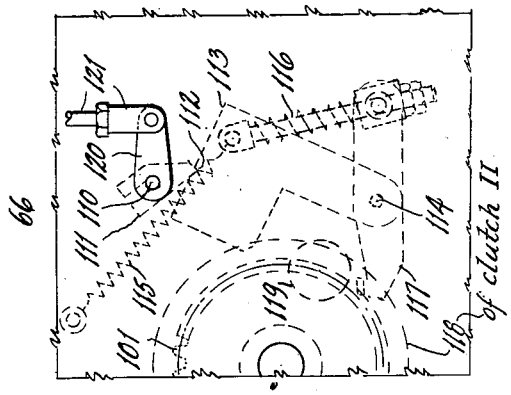
Inventors
James S. Burge
Hilton J. McKee
Roy T. Alexander
Loris H. Conrad
Warren M. Rider
Gustave H. Noetzel
James F. Salatin
by Willits, Hardman & Fehr
their attorneys Nov. 6, 1956     J. S. BURGE ET AL     2,769,228
ASSEMBLING MACHINE
Filed April 11, 1951     39 Sheets-Sheet 6
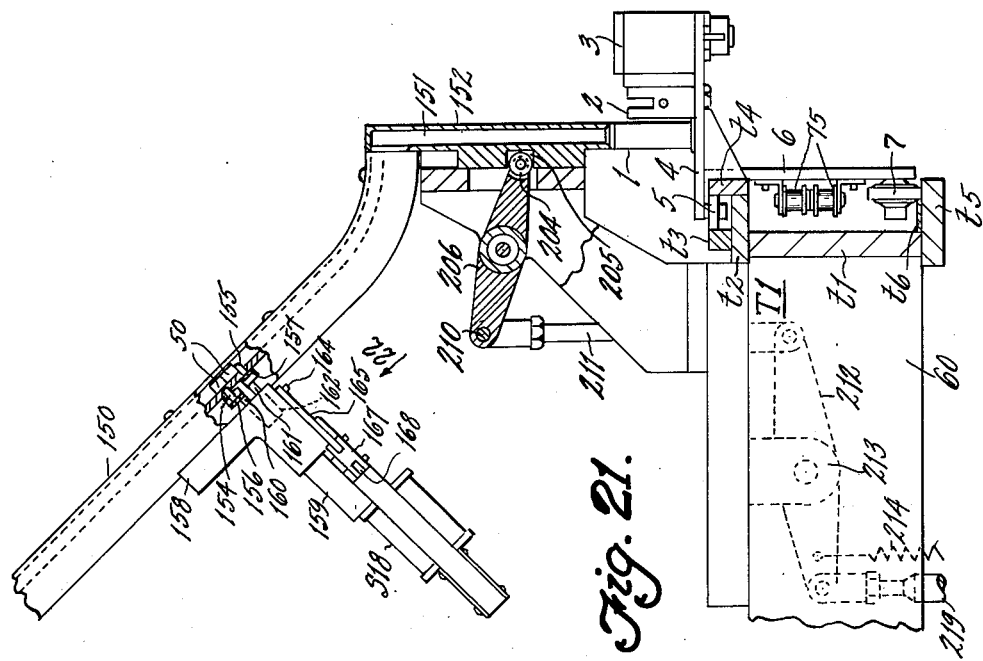
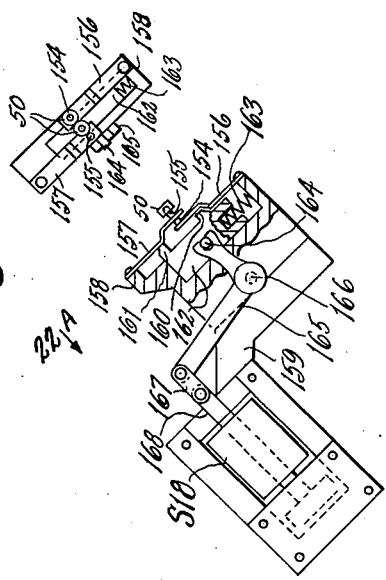
James S. Burge
Hilton J. McKee
Roy T. Alexander
Loris H. Conrad
Warren M. Rider
Gustave H. Noetzel
James F. Salatin
INVENTORS
BY Willits Hardman & Fehr
their attorneys

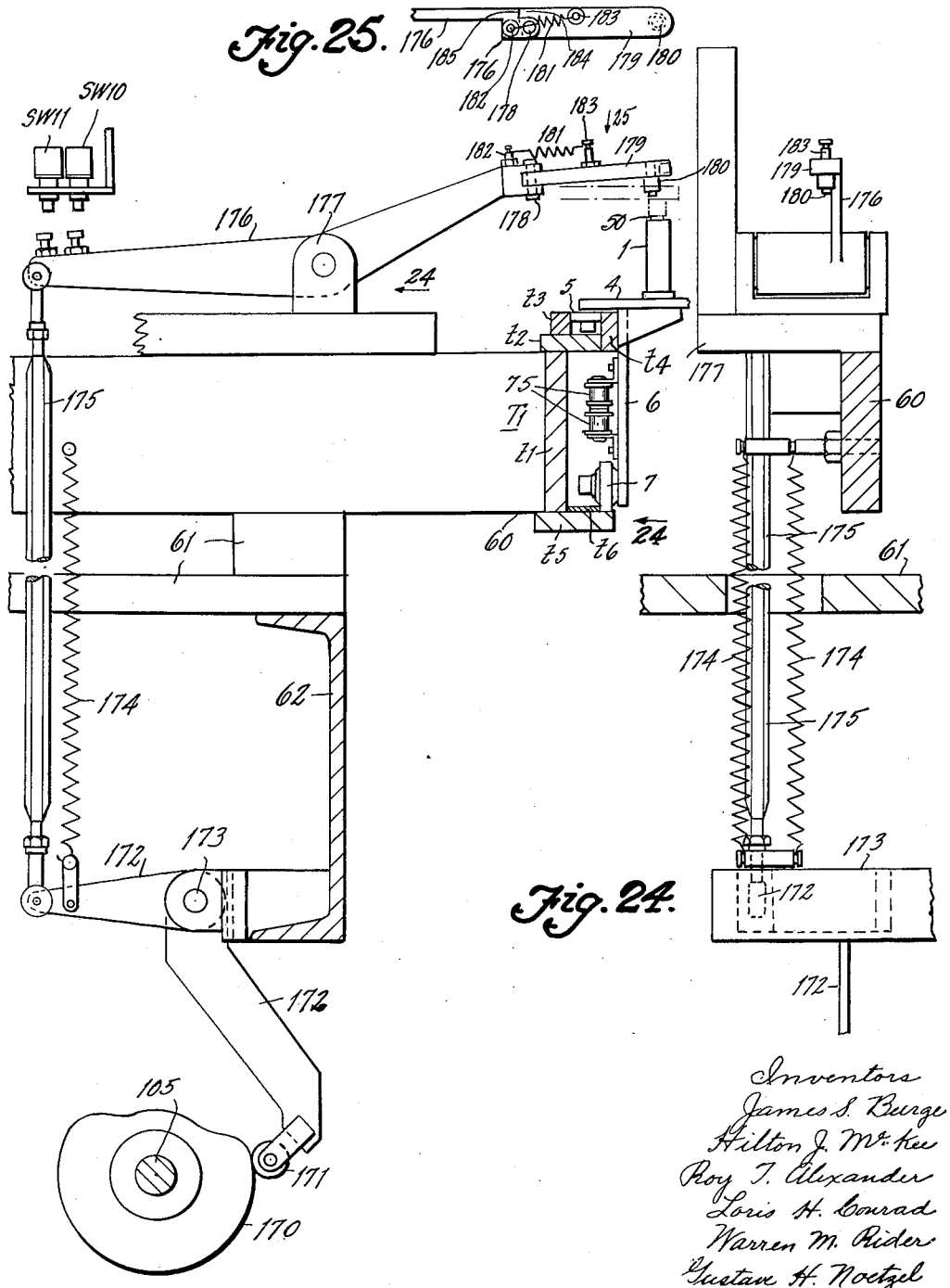

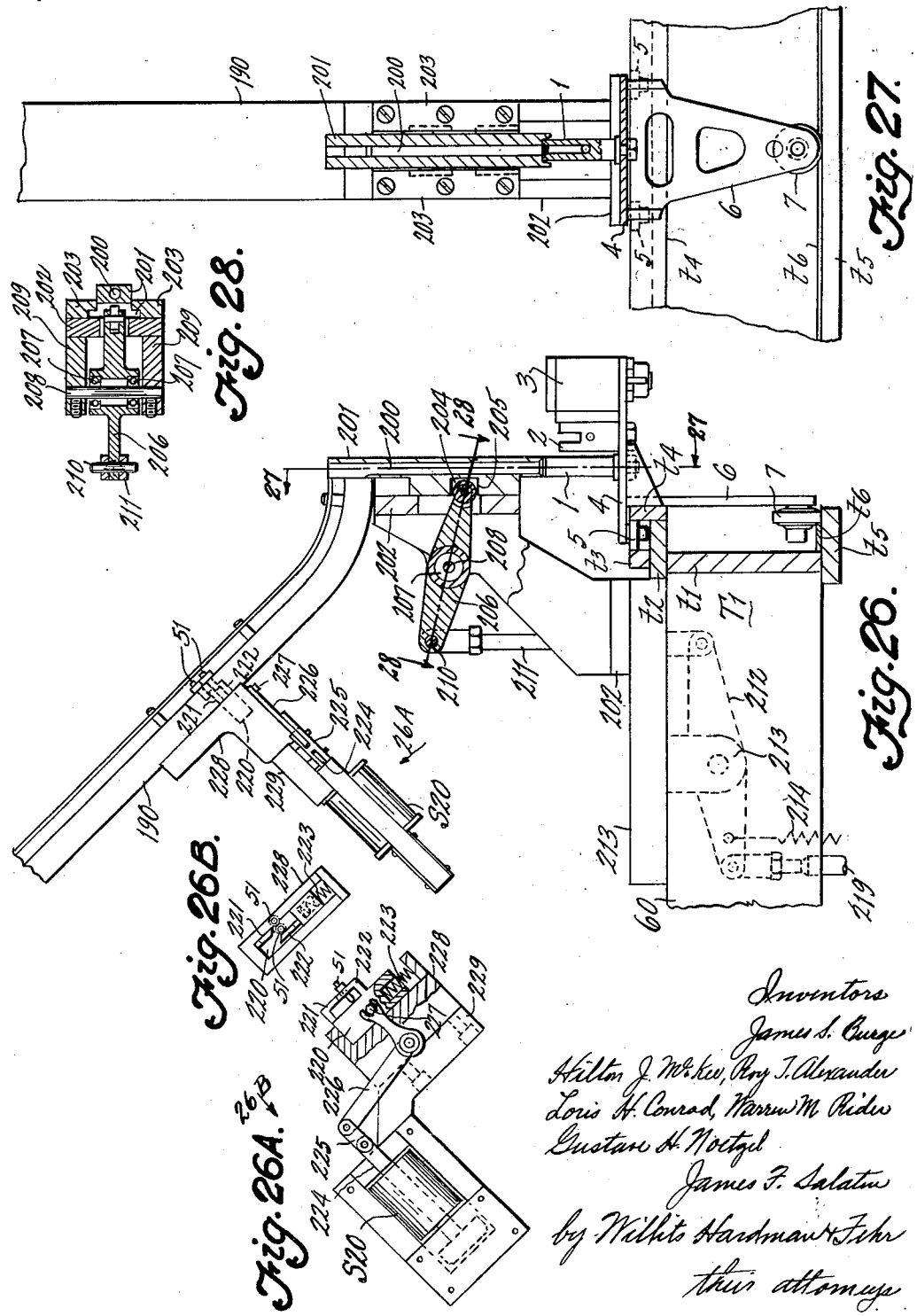

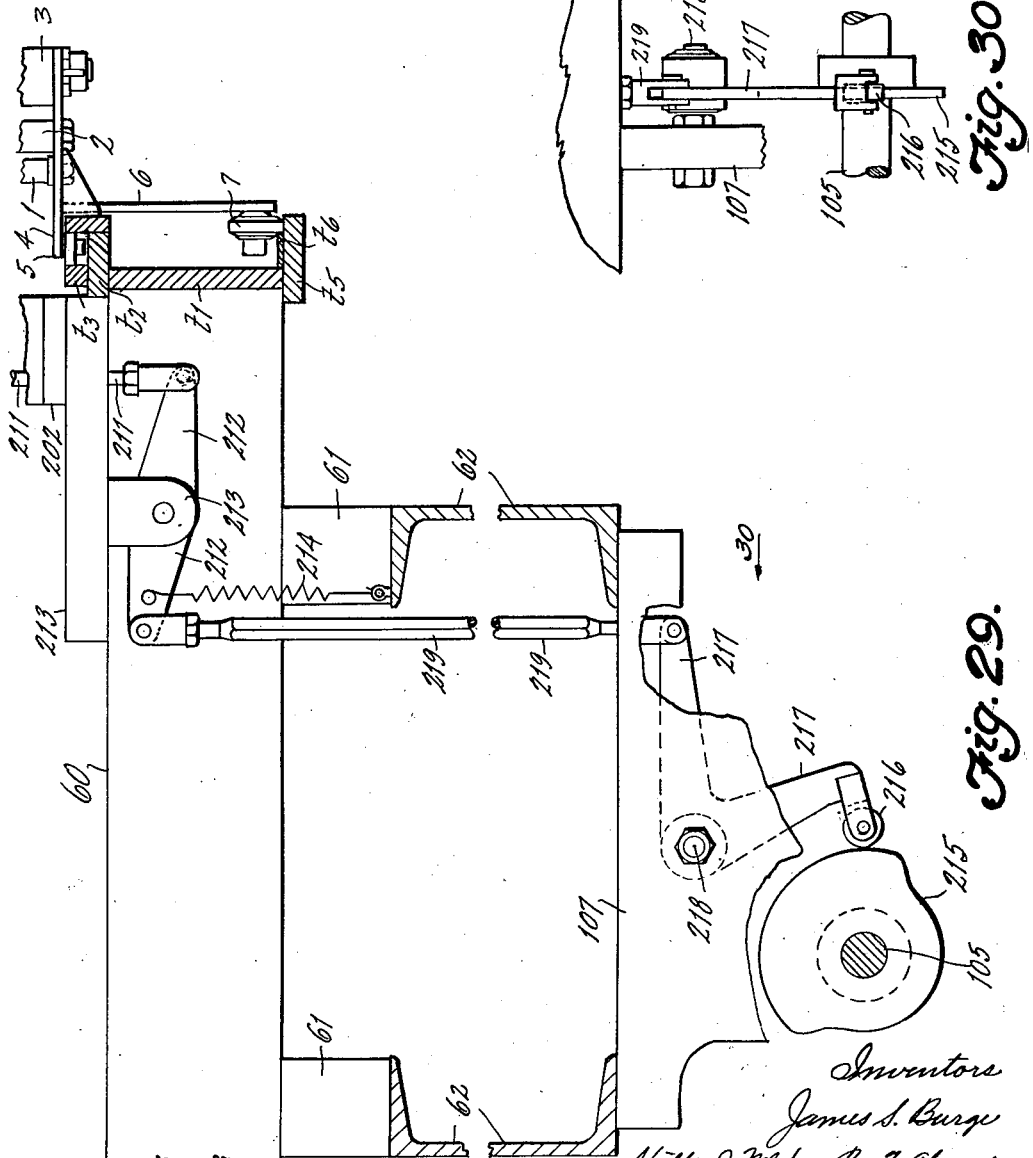

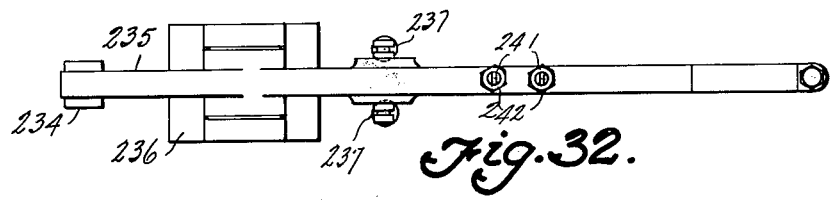
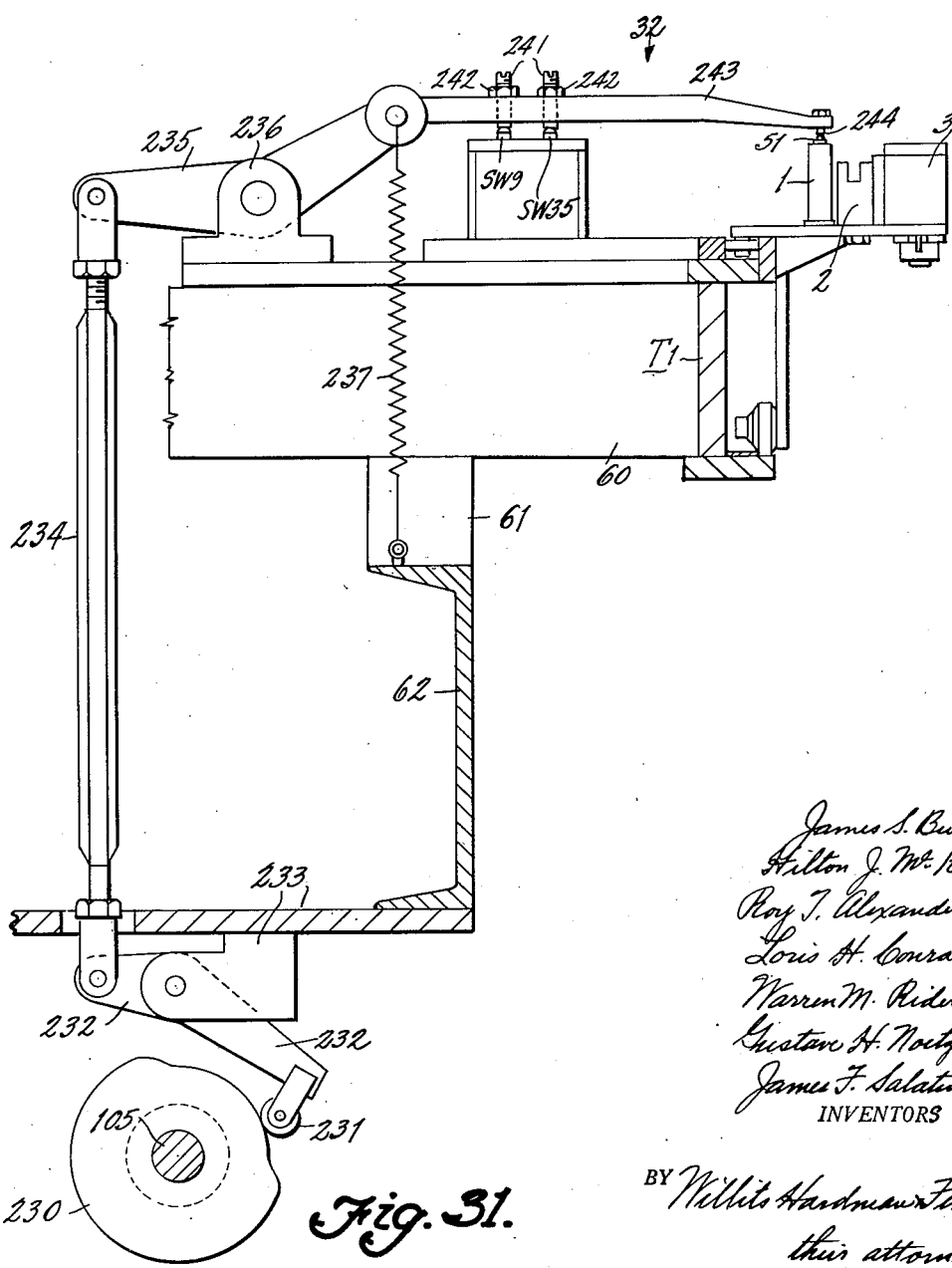

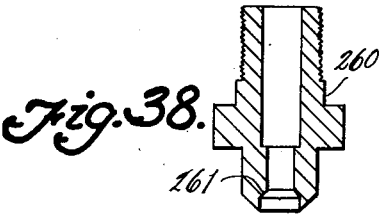
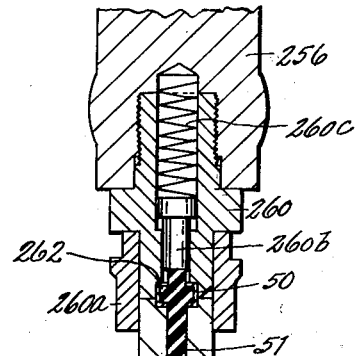
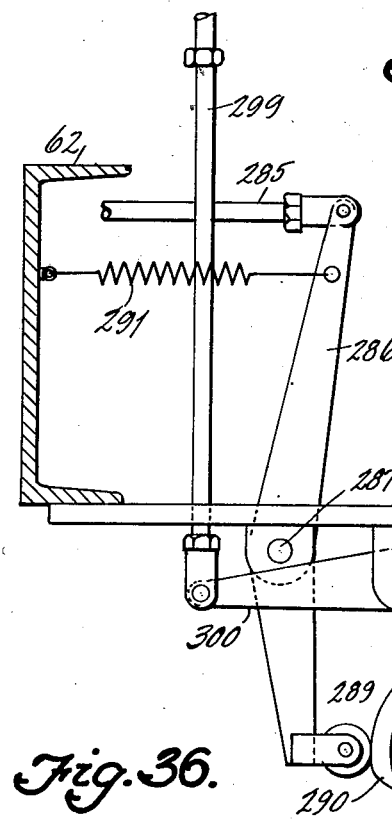
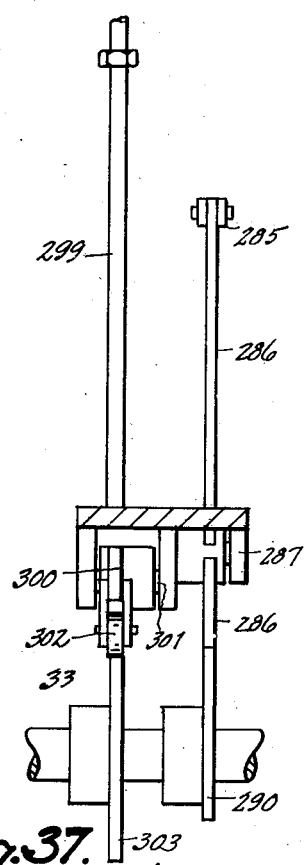

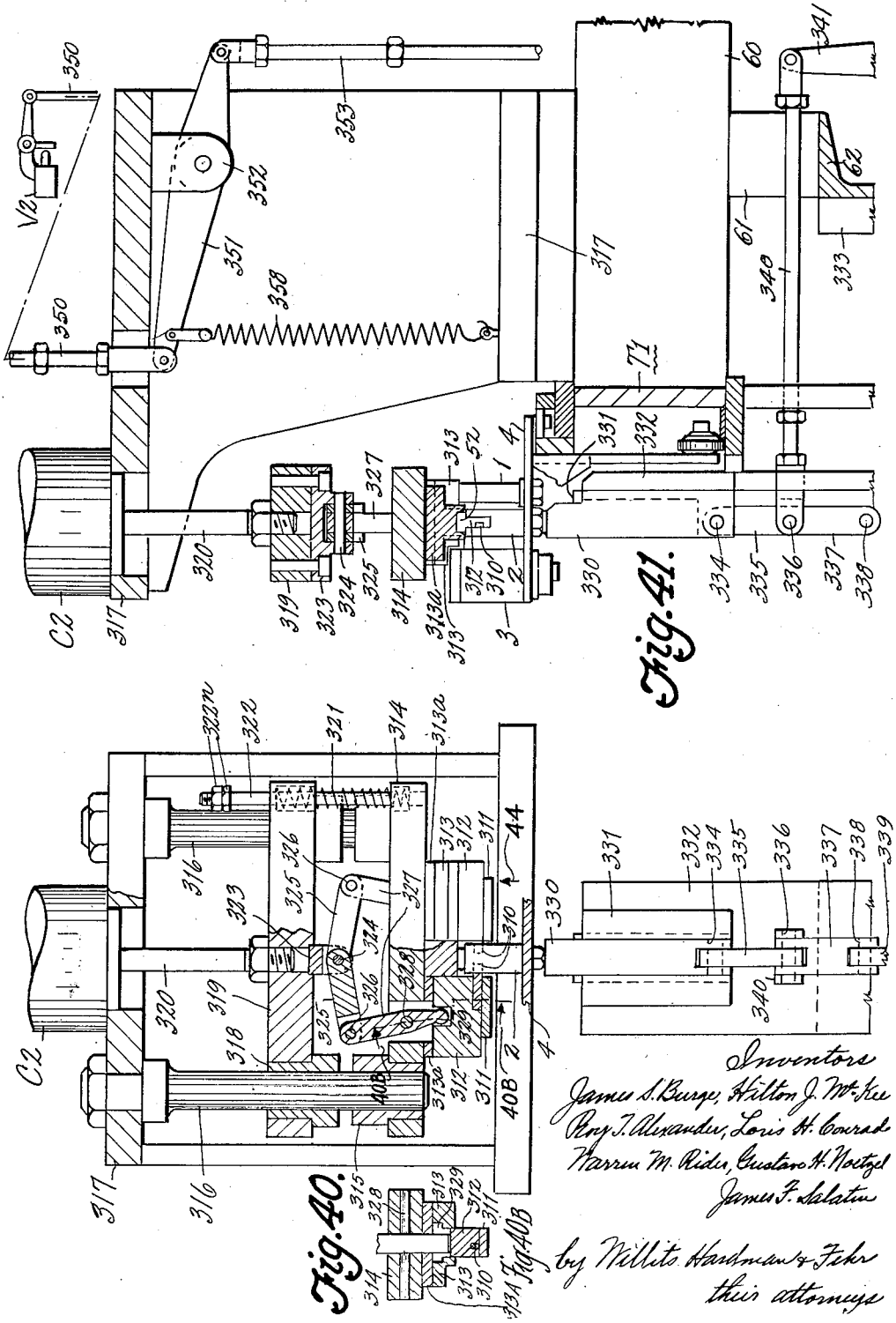

Nov. 6, 1956  J. S. BURGE ET AL  2,769,228
ASSEMBLING MACHINE
Filed April 11, 1951  39 Sheets-Sheet 14
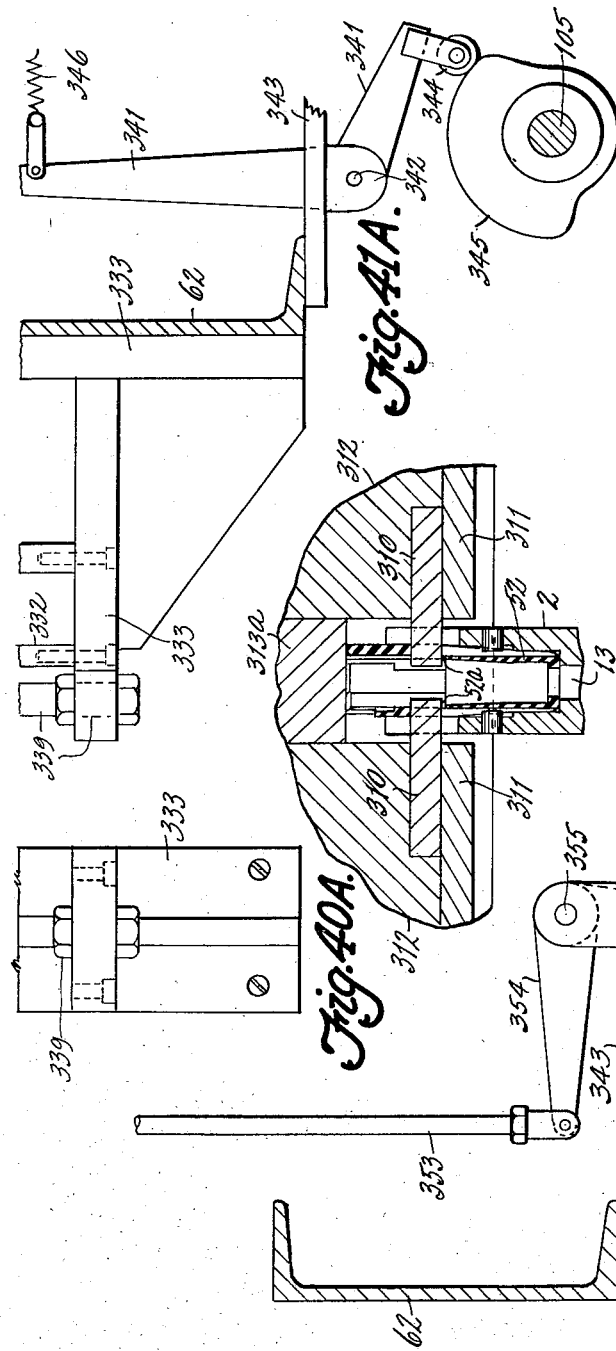
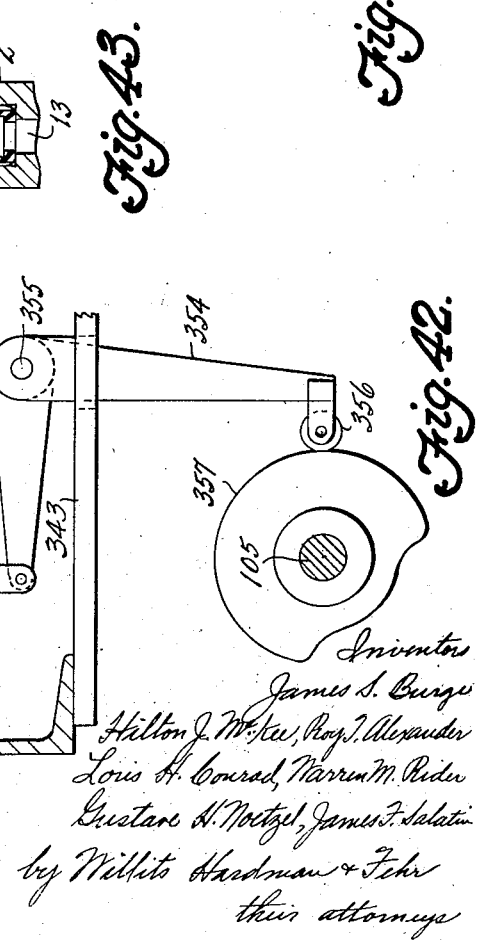
Inventors
James S. Burge
Hilton J. McKee, Roy J. Alexander
Louis H. Conrad, Warren M. Rider
Gustave H. Noetzel, James F. Salatin
by Willits Hardman & Fehr
their attorneys Nov. 6, 1956  J. S. BURGE ET AL  2,769,228
ASSEMBLING MACHINE
Filed April 11, 1951  39 Sheets-Sheet 15
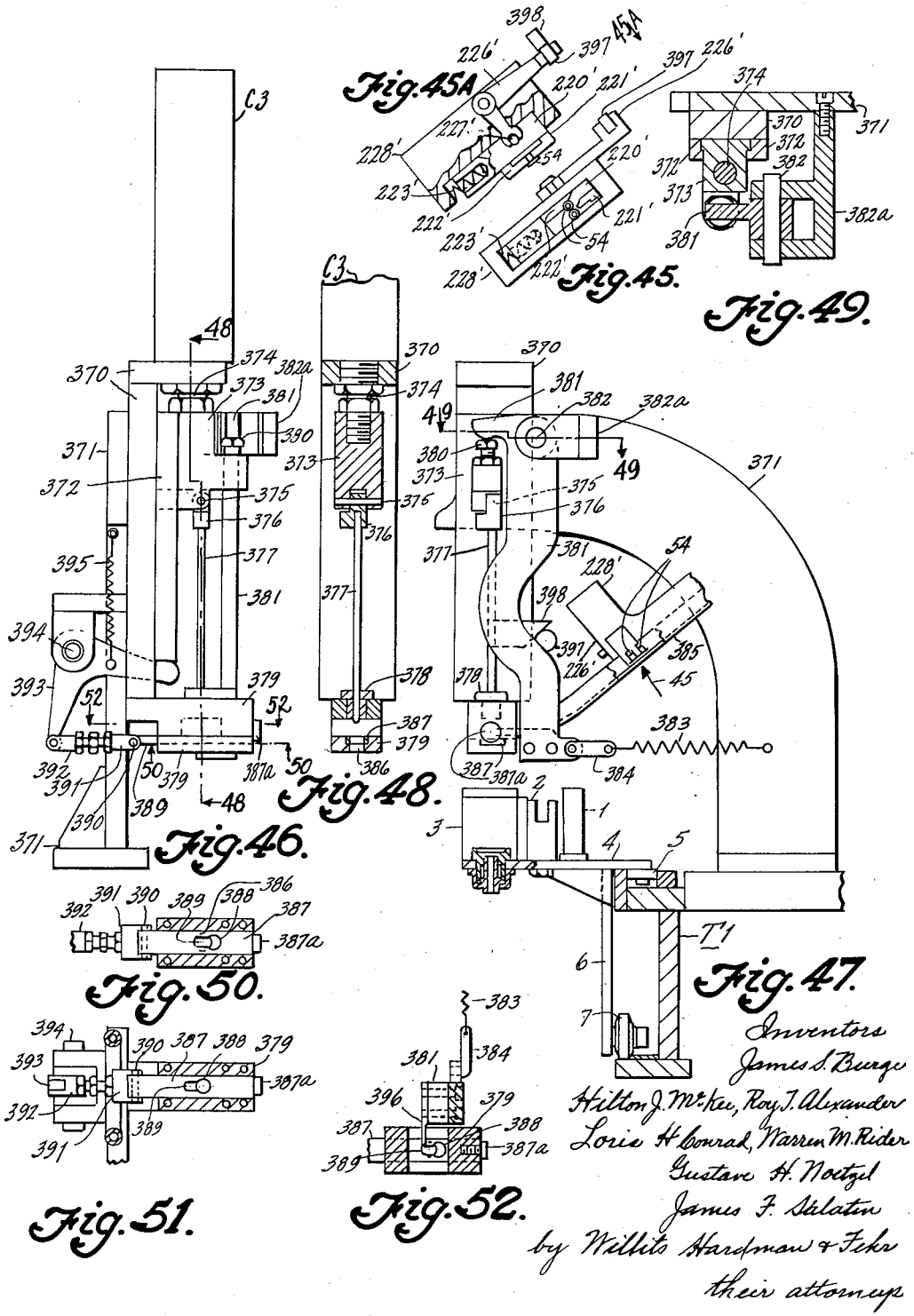

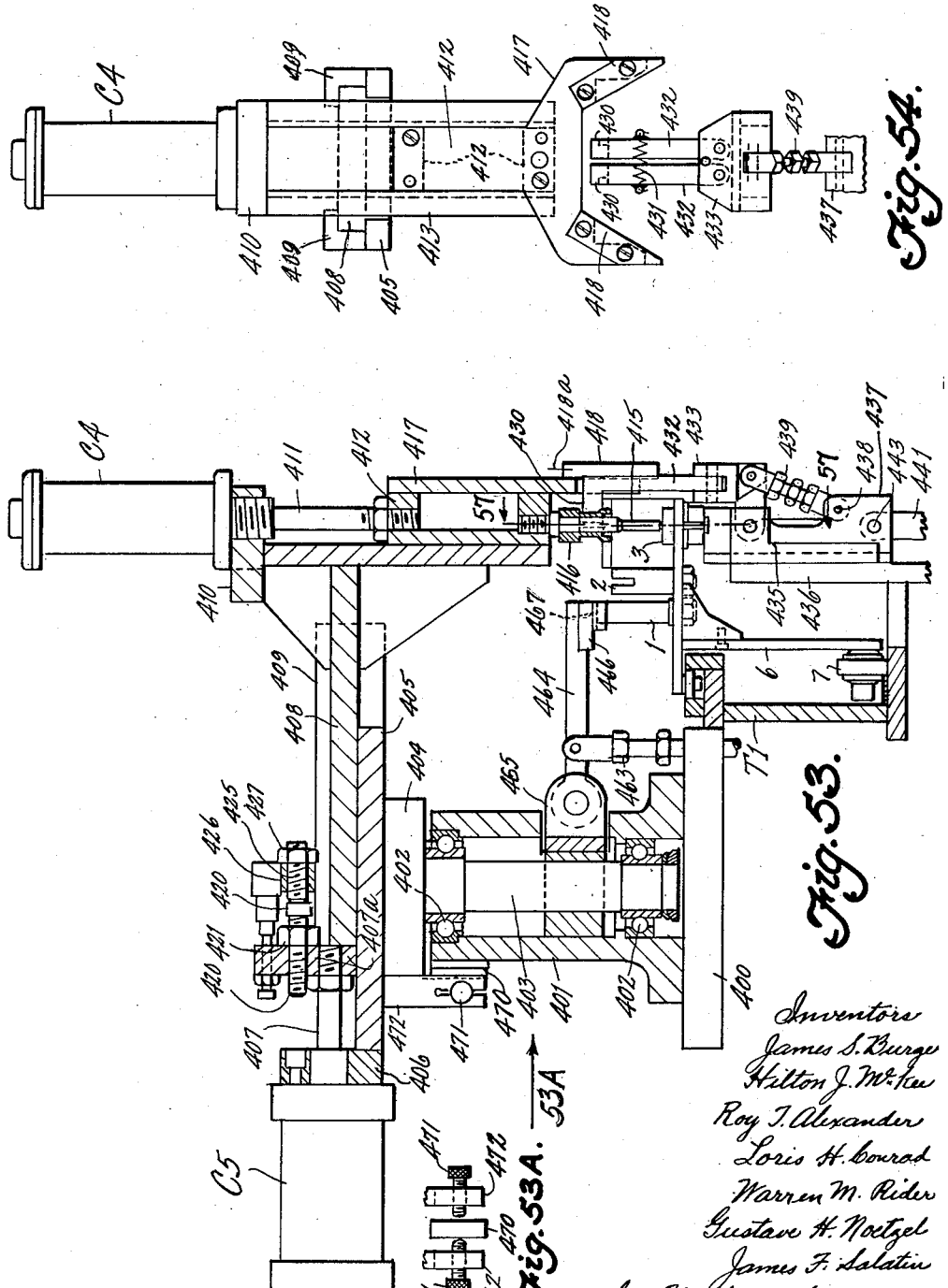

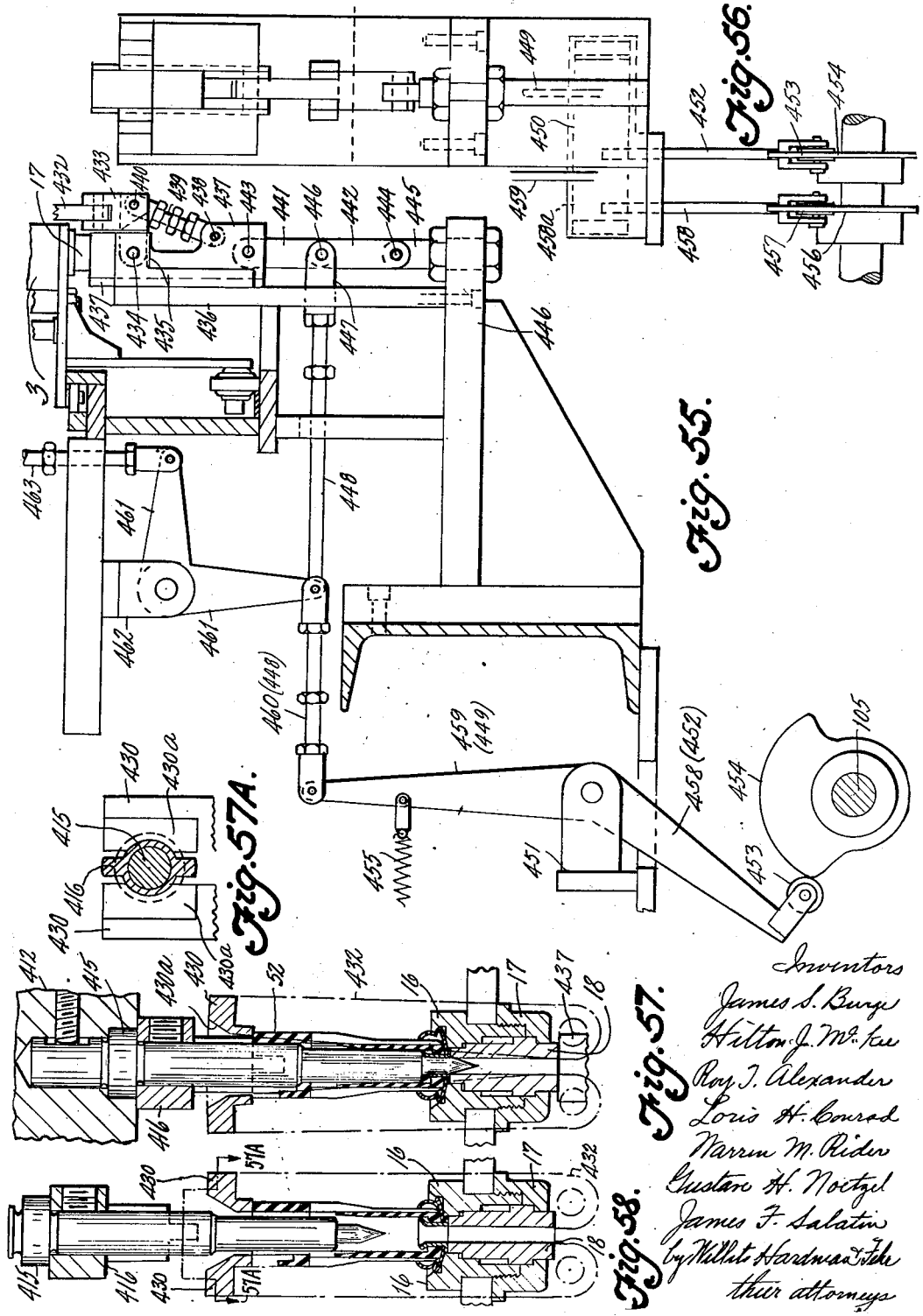

Nov. 6, 1956    J. S. BURGE ET AL    2,769,228
ASSEMBLING MACHINE

Filed April 11, 1951    39 Sheets-Sheet 18

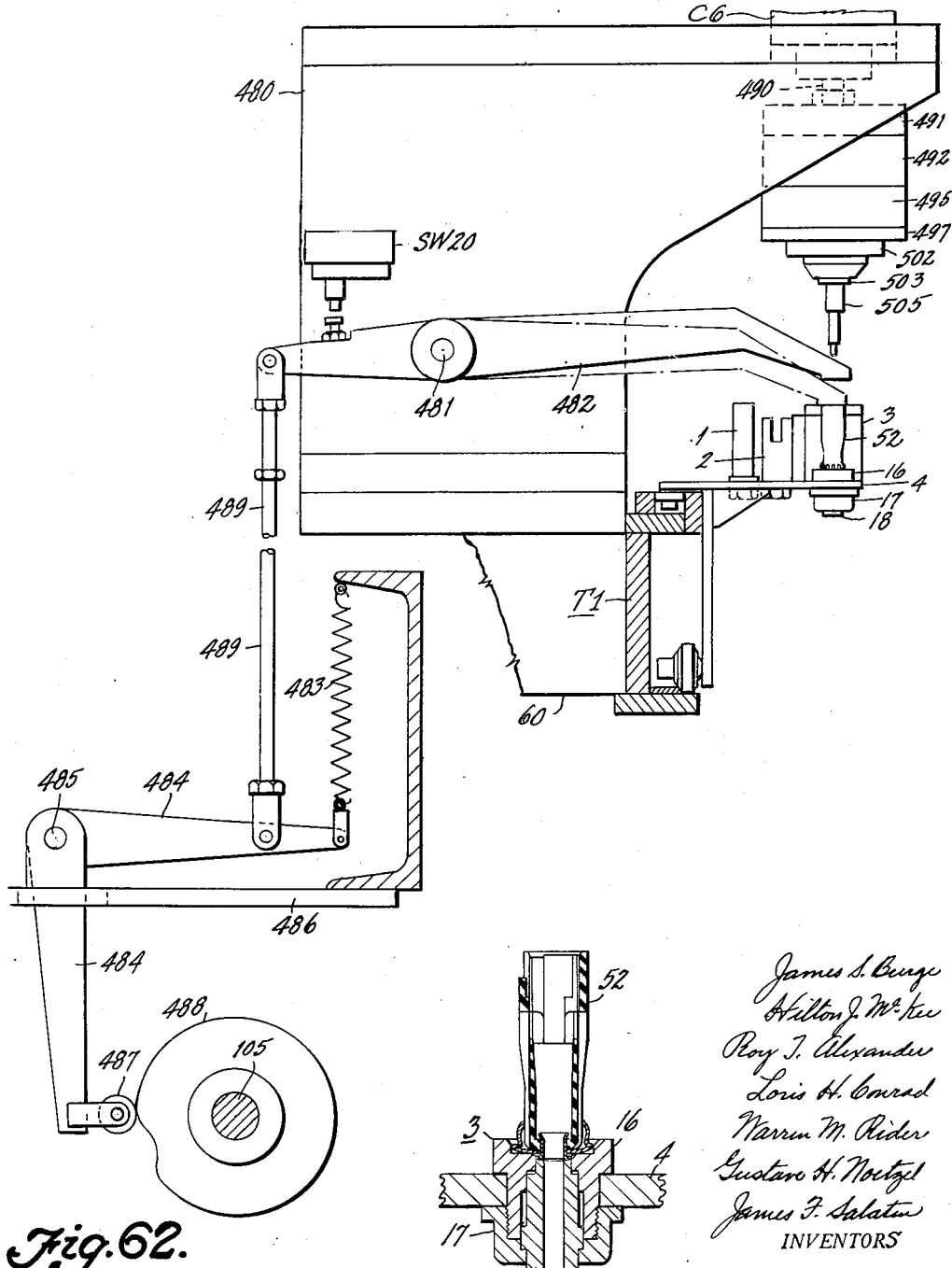

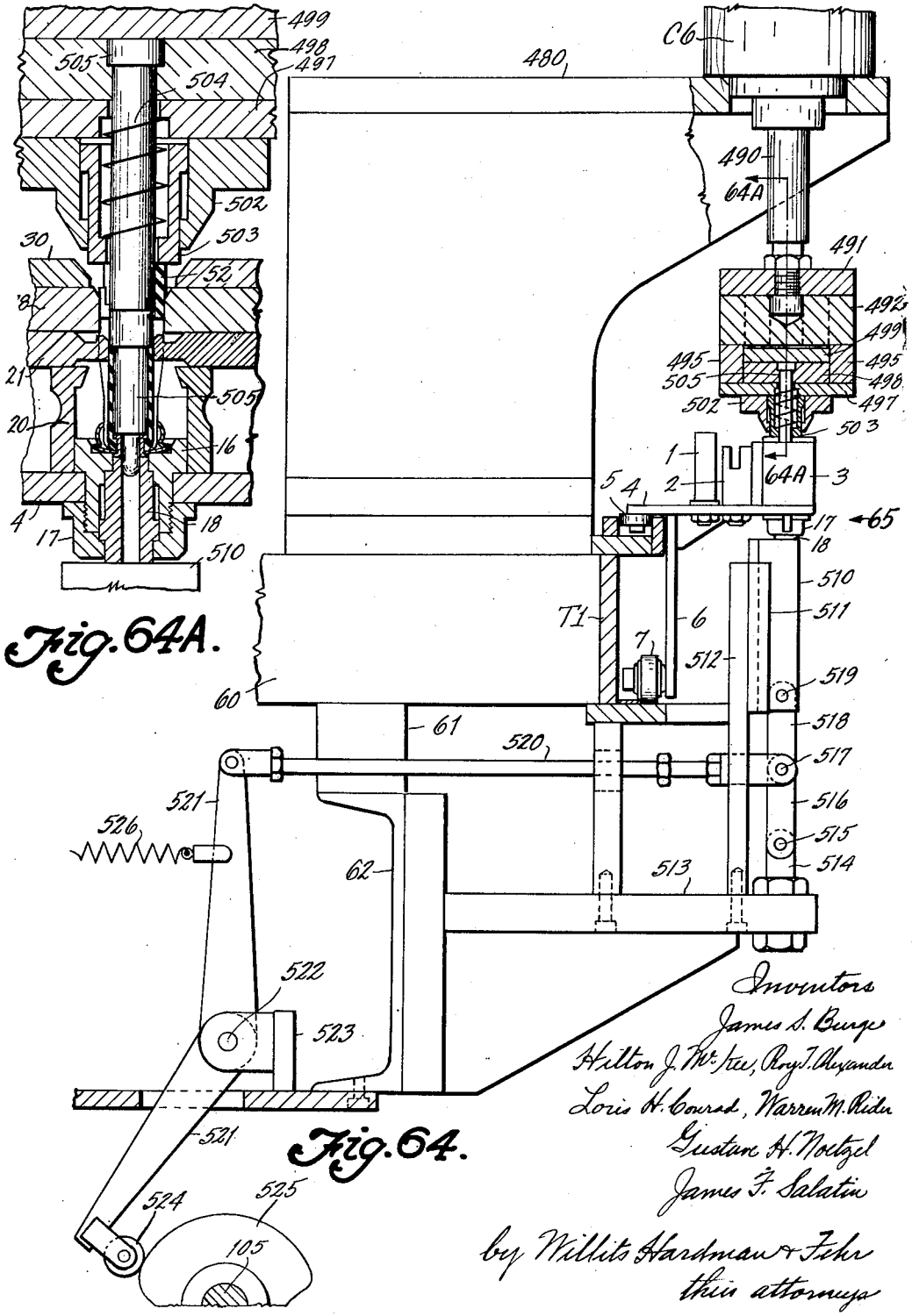

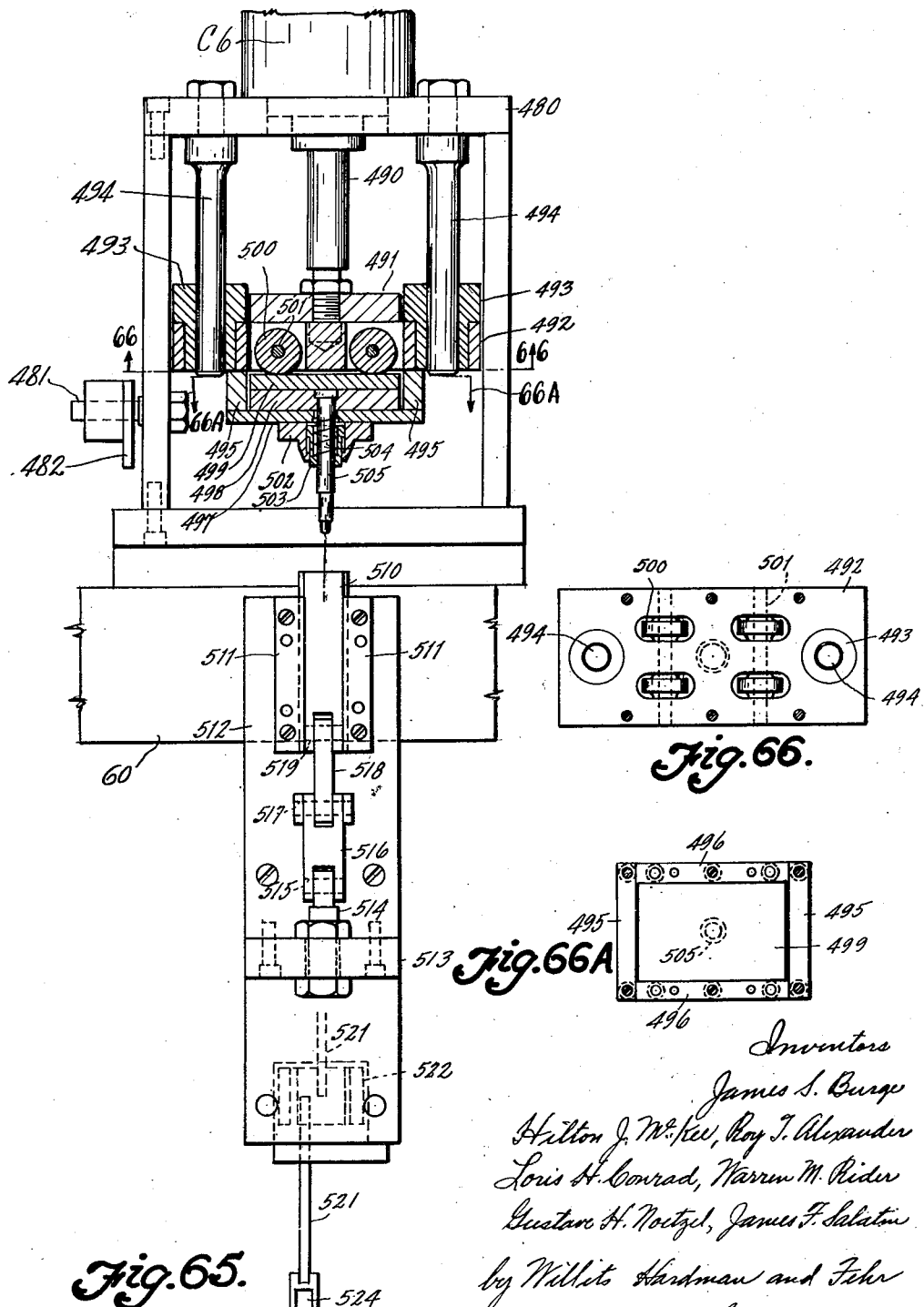

Nov. 6, 1956

J. S. BURGE ET AL 2,769,228

ASSEMBLING MACHINE

Filed April 11, 1951

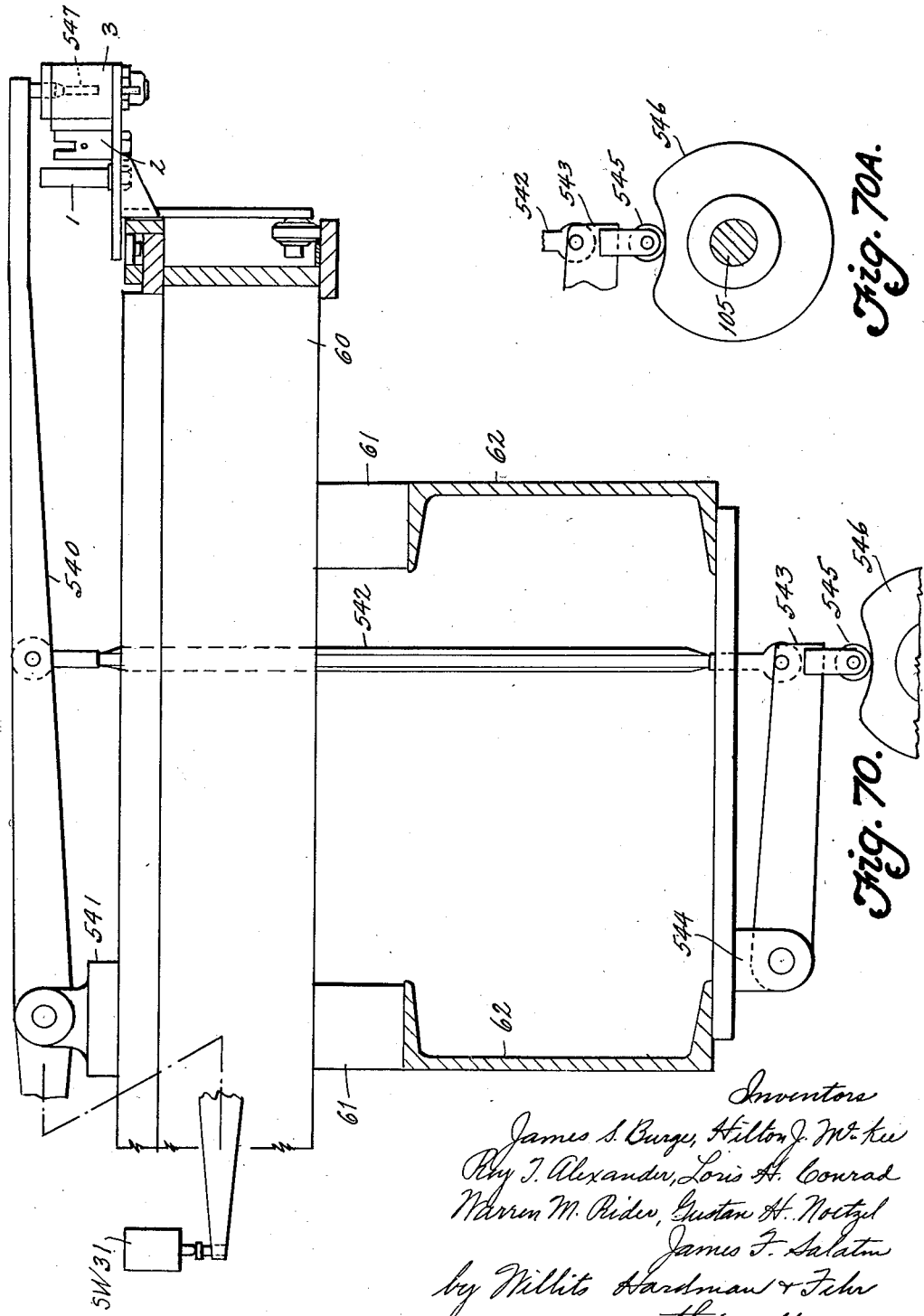

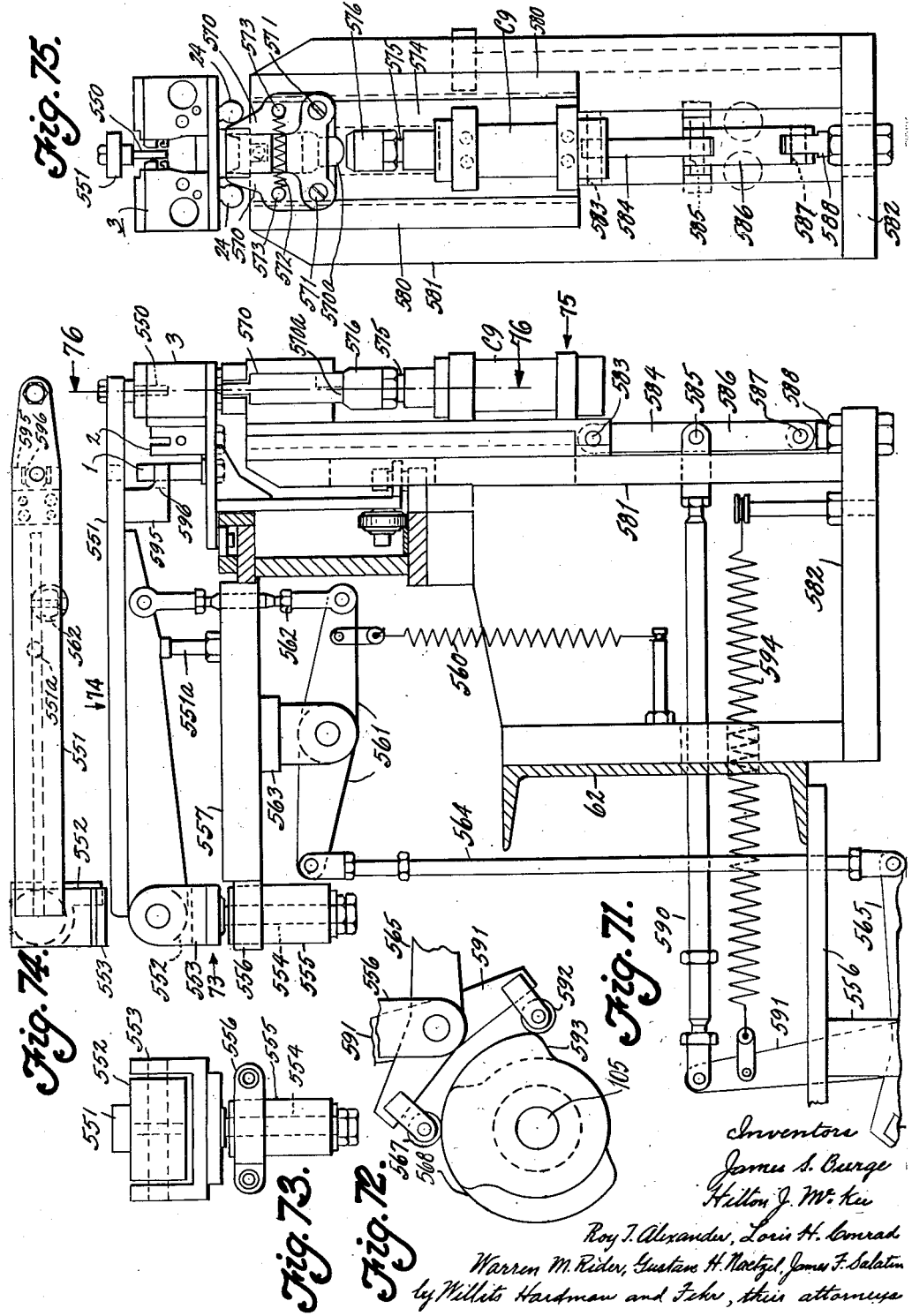

Nov. 6, 1956

J. S. BURGE ET AL 2,769,228

ASSEMBLING MACHINE

Filed April 11, 1951

James S. Burge
Hilton J. McKee
Roy T. Alexander
Loris H. Conrad
Warren M. Rider
Gustave H. Noetzel
James F. Salatin
INVENTORS BY Willits Hardman & Fehr
their attorneys

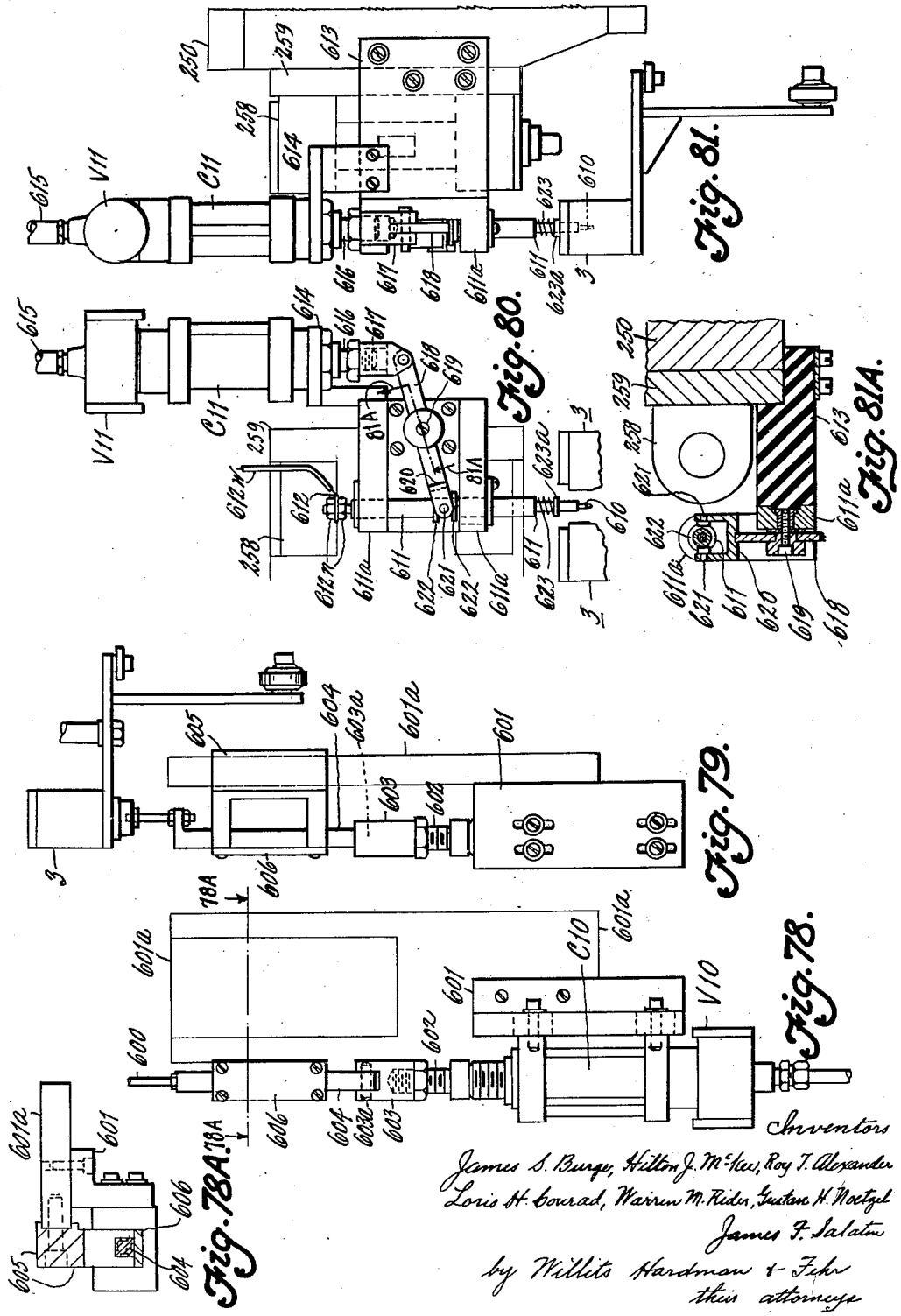

Nov. 6, 1956   J. S. BURGE ET AL   2,769,228
ASSEMBLING MACHINE
Filed April 11, 1951   39 Sheets-Sheet 28
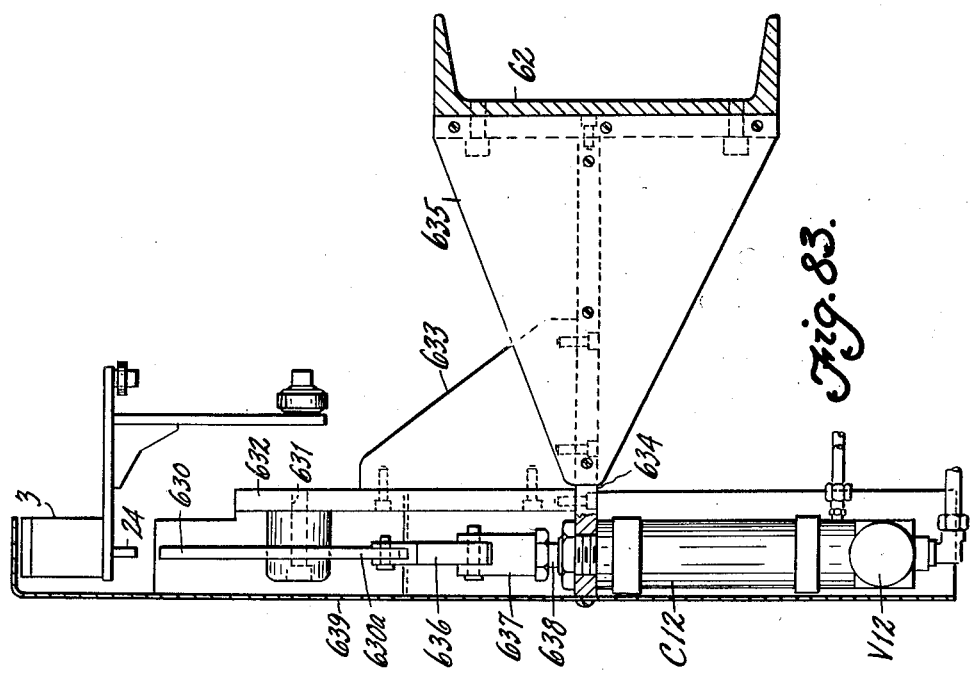
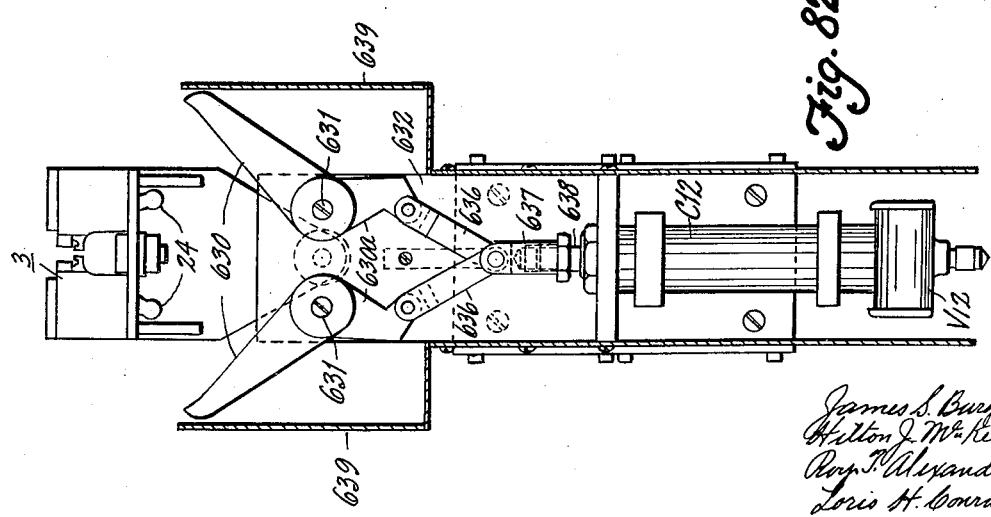

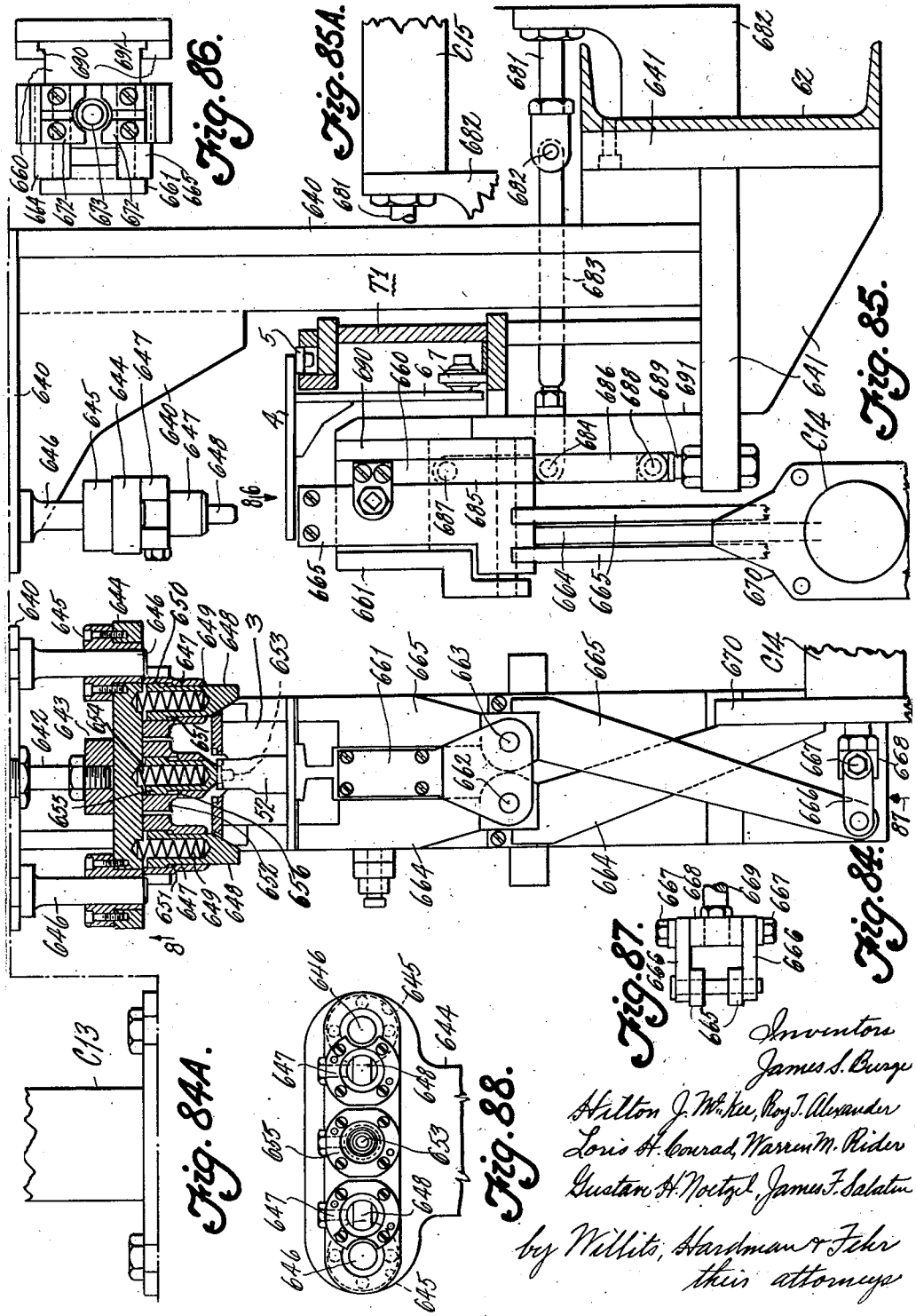

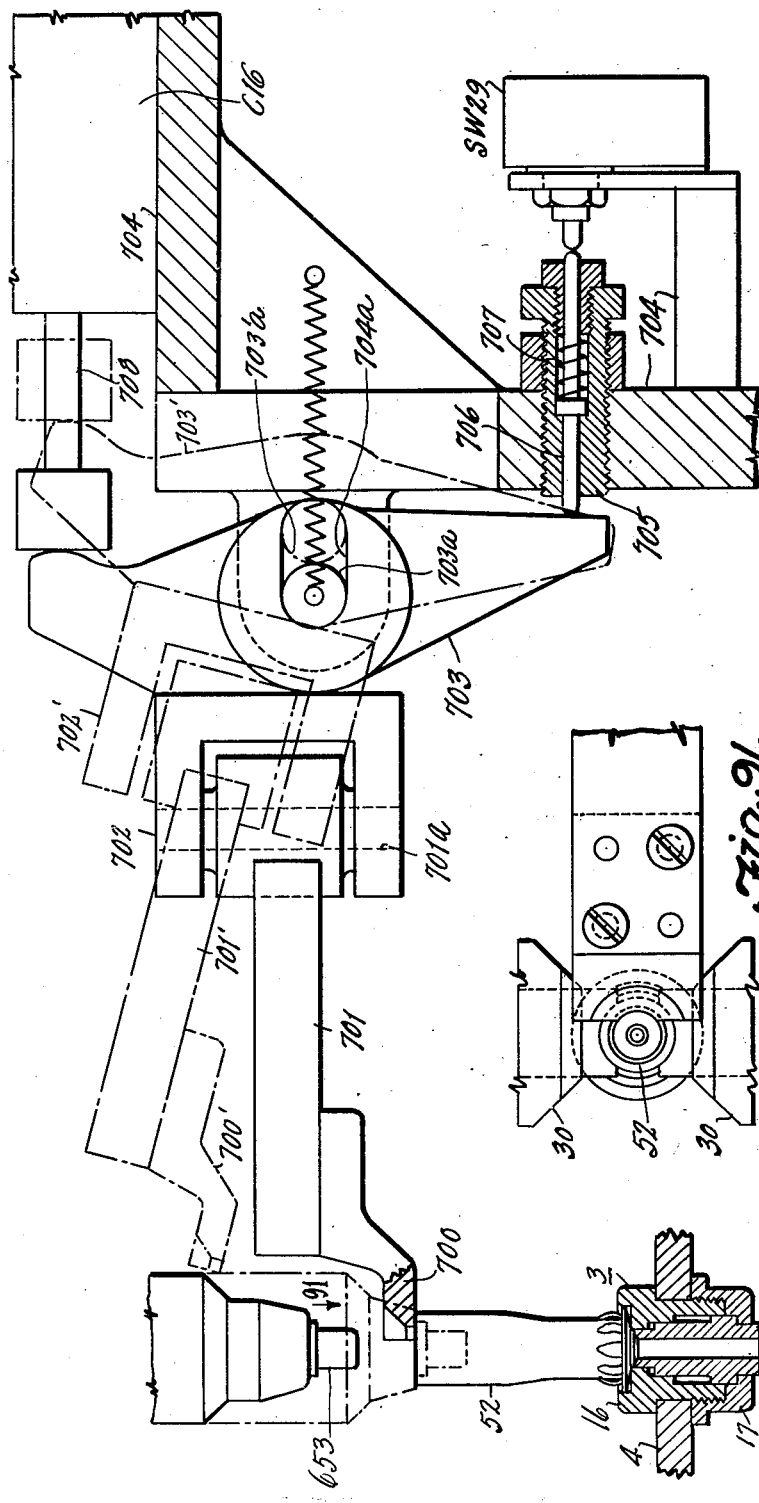

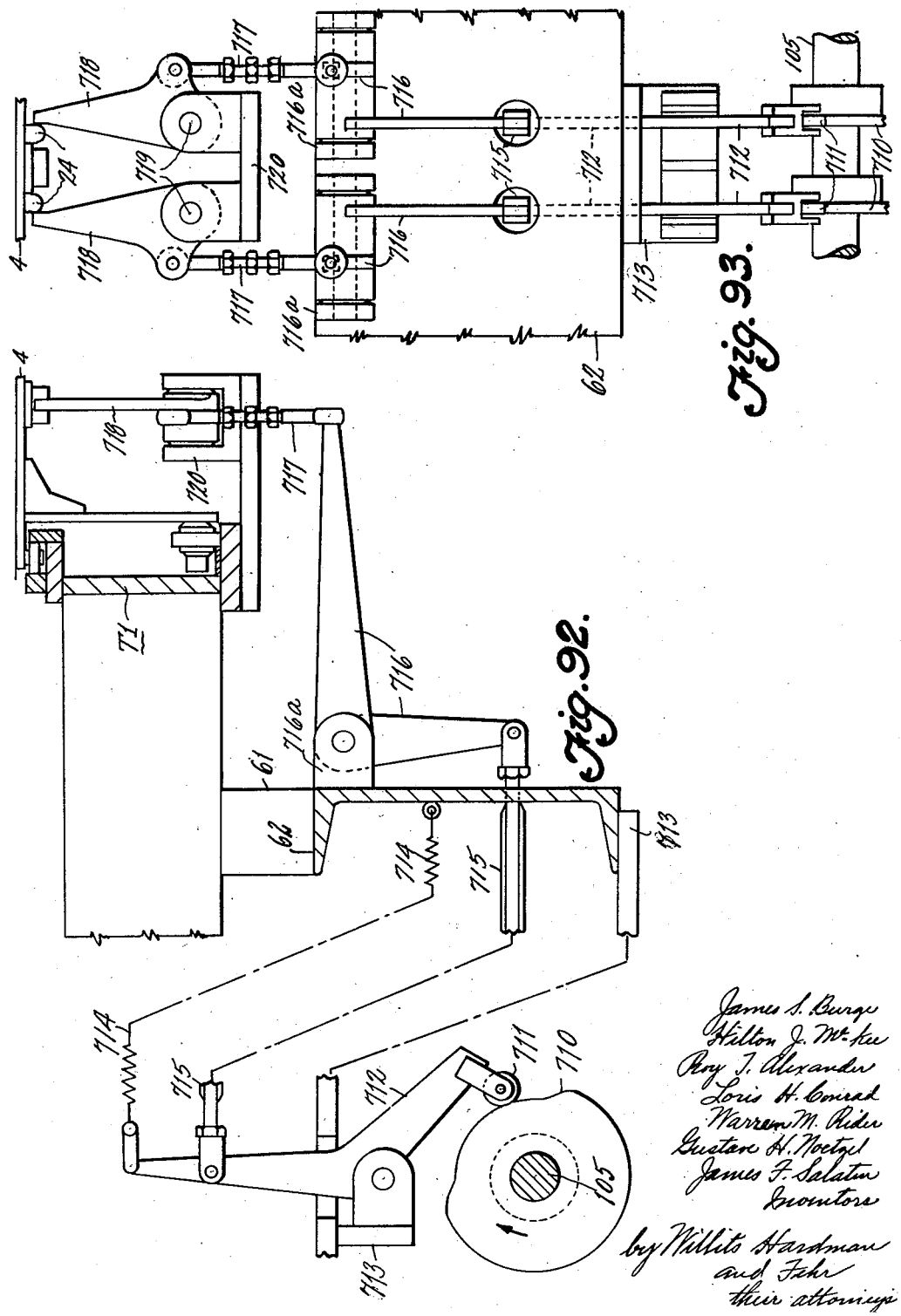

Nov. 6, 1956     J. S. BURGE ET AL     2,769,228
ASSEMBLING MACHINE
Filed April 11, 1951     39 Sheets-Sheet 35
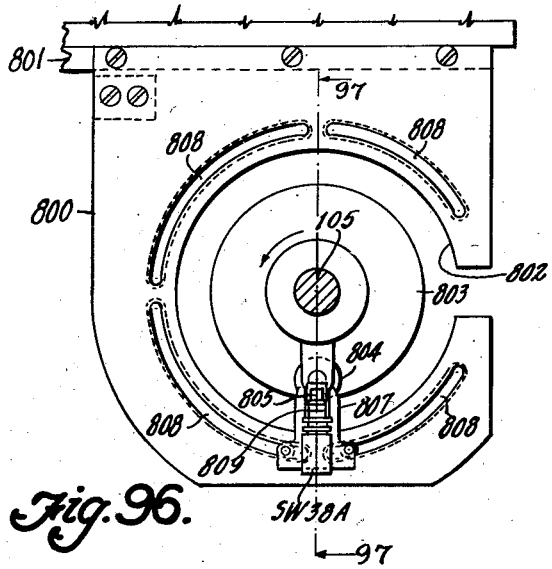
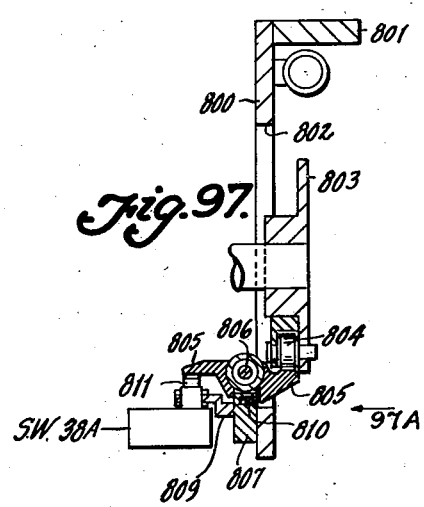
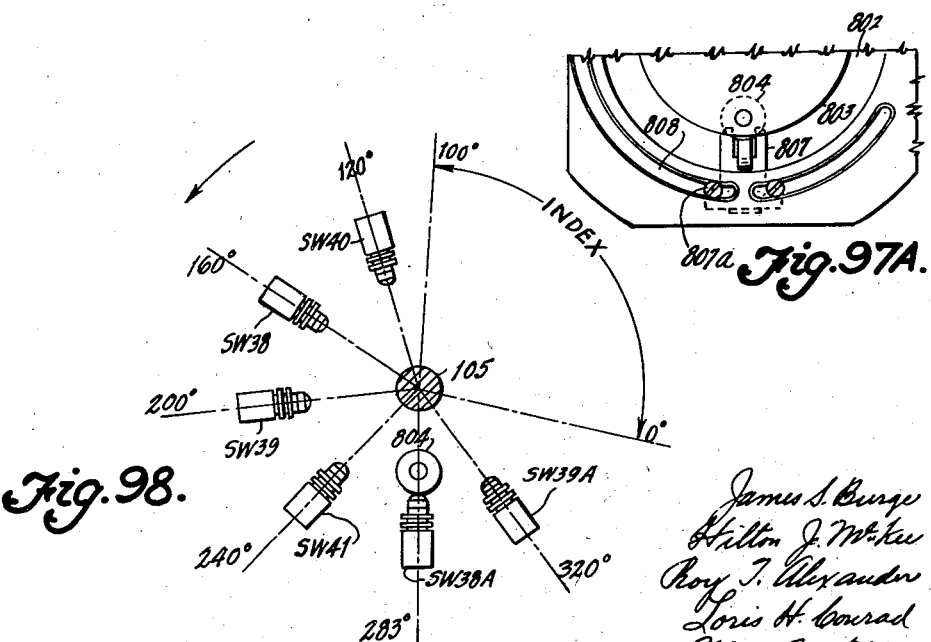

Nov. 6, 1956  J. S. BURGE ET AL  2,769,228
ASSEMBLING MACHINE
Filed April 11, 1951  39 Sheets-Sheet 36

Nov. 6, 1956 — J. S. BURGE ET AL — 2,769,228
ASSEMBLING MACHINE
Filed April 11, 1951 — 39 Sheets-Sheet 39

| STATION | CAM | 0° | 30° | 60° | 90° | 120° | 150° | 180° | 210° | 240° | 270° | 300° | 330° |
|---|---|---|---|---|---|---|---|---|---|---|---|---|---|
| 1.1 FEEDER GUIDE / 1.3 LOWERING | 215 | | | | | | | FEEDER GUIDES DOWN | | | | | |
| 1.2 CUP CHECKER | 170 | | | | | | | | | CUP CHECKER DOWN | | | |
| 1.4 BUTTON CHECKER | 230 | | | | | | | | | BUTTON CHECKER DOWN | | | |
| 1.5 TOGGLE CUP-BUTTON STAKE | 290 | | | | | | WORK HOLDER SUPPORTED | | | | | | |
| 1.5 CYLINDER CUP-BUTTON STAKE | 303 | | | | | | | STAKE PUNCH DOWN | | | | | |
| 2.2 TOGGLE PUNCH FLASH | 345 | | | | | | WORK HOLDER SUPPORTED | | | | | | |
| 2.2 CYLINDER PUNCH FLASH | 357 | | | | | | | FLASH PUNCHES ADVANCED | | | | | |
| 3.3 TOGGLE TRANSFER | 454 | | | | | | WORK HOLDER SUPPORTED | | | | | | |
| 3.7 STATION CENTERING | 456 | | | | | | STATION IS CENTERED | | | | | | |
| 3.5 CHECKER FOR EYELET STAKER | 488 | | | | | | | IF CASE IS MISSING, SW20 CLOSES | | | | | |
| 3.5 TOGGLE EYELET STAKER | 525 | | | | | | WORK HOLDER SUPPORTED | | | | | | |
| 3.8 CHECKER, CUP-BUTTON TRANS. | 546 | | | | | IF CUP-BUTTON IS MISSING, SW31 CLOSES | | | | | | | |
| 3.10 CYLINDER C9 | 833 | | | | | | | SLIDE HOOKS ADVANCED | | | | | |
| 3.10 COMPRESS SPING | 568 | | | | | | | SWITCH SPRING COMPRESSED | | | | | |
| 3.10 TOGGLE | 593 | | | | | | WORK HOLDER SUPPORTED | | | | | | |
| 3.15 TOGGLE CYLINDER | 832 | | | | | | WORK HOLDER SUPPORTED | | | | | | |
| 3.15 TOP CYLINDER | 830 | | | | | | | SWITCH CASE GRIPPED / SOCKET HEAD DOWN | | | | | |
| 3.15 SCISSORS CYLINDER | 831 | | | | | | | SOCKET TANGS BENT | | | | | |
| 3.15 FEELER CYLINDER C16 | 835 | | | | | | IF STATION IS EMPTY, SW 29 CLOSES | | | | | | |
| 3.16 STATION OPENING | 710 | | | | | | | SLIDES RETRACTED | | | | | |
| SWITCHES SW5 & SW6 | 836 | | | SW5 CLOSES | | | | SW6 CLOSES | | | | | |
| SWITCHES SW2 & SW8 | 837 | | | SW2 CLOSES | | | | SW8 CLOSES | | | | | |
| SWITCH SW21 | 840 | | | SW21 OPEN | | | | | | | | | |
| SWITCH SW7 | 838 | | | | | | SW7 CLOSES | | | | | | |
| SWITES SW16 & SW14 | 839 | | | | SW16 OPENS | | | | | | SW14 CLOSES | | |
| TRANSFER CONTROL | | CLOSING OF | | SW40 SW38 | | SW39 SW41 | | SW38A SW39A | | | | | |
| INDEX | | INDEXING TIME | | | | | | | | | | | |

James S. Burge, Hilton J. McKee, Roy T. Alexander,
Louis H. Conrad, Warren M. Rider, Gustave H. Noetzel
and James F. Salatin, Inventors
by Willits Hardman & Fehr
their attorneys

Fig. 102.

United States Patent Office

2,769,228
Patented Nov. 6, 1956

2,769,228

ASSEMBLING MACHINE

James S. Burge, Anderson, Hilton J. McKee, Middletown, Roy T. Alexander, Pendleton, and Loris H. Conrad, Warren M. Rider, Gustave H. Noetzel, and James F. Salatin, Anderson, Ind., assignors to General Motors Corporation, Detroit, Mich., a corporation of Delaware Application April 11, 1951, Serial No. 220,482

3 Claims. (Cl. 29—203)

This invention relates to the manufacture of electric switches and its object is to provide a machine for assembling parts of a push button switch which includes a socket for holding a lamp which glows when the switch is closed in response to opening the door of a compartment in which the switch is located.

The machine disclosed herein includes a conveyor which moves intermittently to various stations a plurality of work supports each providing three work holders. At certain stations parts are assembled and prepared for assembly respectively in two of the holders and are transferred to the third holder in which the assembly is progressively completed. Before assembly is completed, the switch is tested to determine its ability to complete an electric circuit; and, if it fails in the test, a part of it is caused to be dislodged thereby indicating that it is defective and the attendant removes it.

Further objects and advantages of the present invention will be apparent from the following description, reference being had to the accompanying drawings wherein preferred embodiments of the present invention are clearly shown.

In the drawings:

Fig. 6 is a sectional view on line 6—6 of Fig. 1.

Fig. 7 is a sectional view on line 7—7 of Fig. 3.

Fig. 8 is a fragmentary longitudinal sectional view of work holder 1 supporting a contact cup 50.

Fig. 9 is a view similar to Fig. 8, a button 51 having been added.

Fig. 10 is a view similar to Fig. 8 showing the cup 50 staked to the button 51.

Fig. 11 is a fragmentary longitudinal sectional view of work holder 2 supporting a switch case 52.

Fig. 12 is a fragmentary longitudinal sectional view of work holder 3 supporting an eyelet 54, a plug 55 and the case 52.

Fig. 13 is an enlarged longitudinal sectional view of the completed switch.

Fig. 14 is a plan view of the machine frame supporting the conveyor and work support tracks.

Fig. 15 is a front view of the machine frame.

Figure 16:
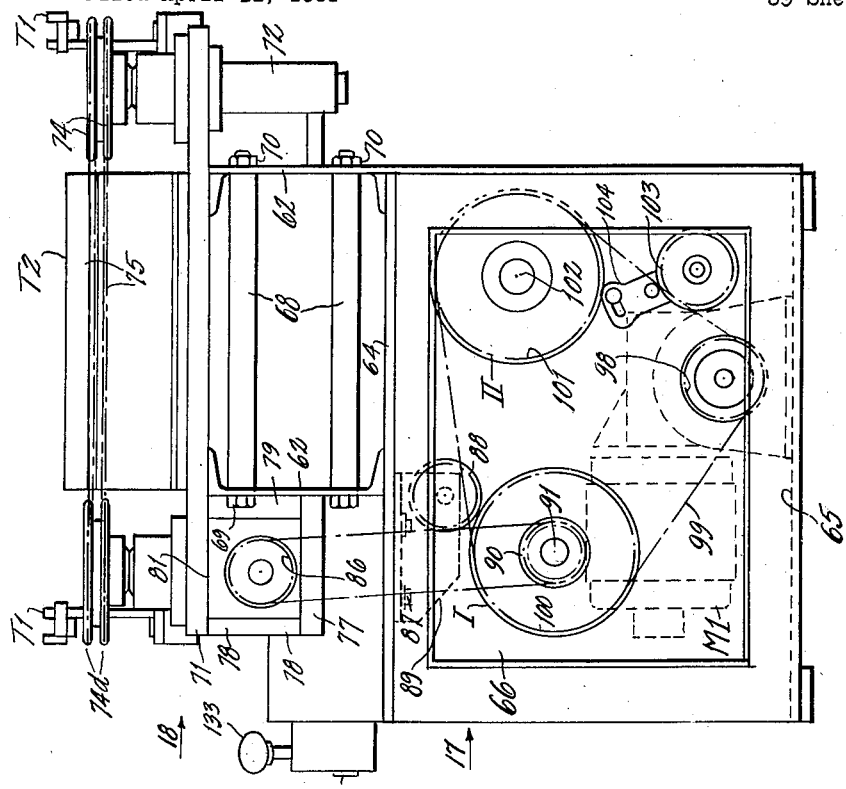

Fig. 16 is a larger scale view in the direction of arrow 16 of Fig. 15.

Figure 17:
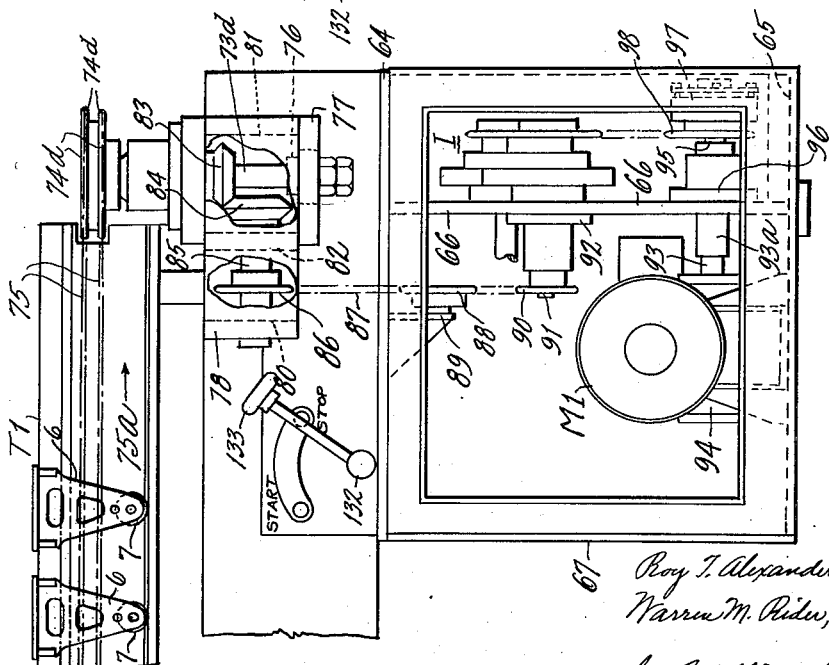

Fig. 17 is a view in the direction of arrow 17 of Fig. 16.

Fig. 18 is a larger scale view in the direction of arrow 18 of Fig. 16.

Fig. 19 is a view in the direction of arrow 19 of Fig. 18.

Fig. 20 is a fragmentary view of a clutch control operated by the mechanism shown in Figs. 18 and 19.

Fig. 21 is a side view of the contact cup feeder.

Fig. 22 is a view in the direction of arrow 22 of Fig. 21.

Fig. 22A is a view in the direction of arrow 22A of Fig. 22.

Fig. 23 is a side view of the contact cup checker.

Figs. 24 and 25 are respectively fragmentary views in the direction of arrows 24 and 25 of Fig. 23.

Fig. 26 is a side view partly in section of the button feeder.

Figs. 26A and 26B are views in the direction of arrows 26A and 26B respectively of Figs. 26 and 26A.

Figs. 27 and 28 are respectively sectional views on lines 27—27 and 28—28 of Fig. 26.

Fig. 29 is a side view of the button feeder guide operating mechanism.

Fig. 30 is a fragmentary view in the direction of arrow 30 of Fig. 29.

Fig. 31 is a side view of the button checker.

Fig. 32 is a plan view of the button checker.

Figures 33, 34, 34A:
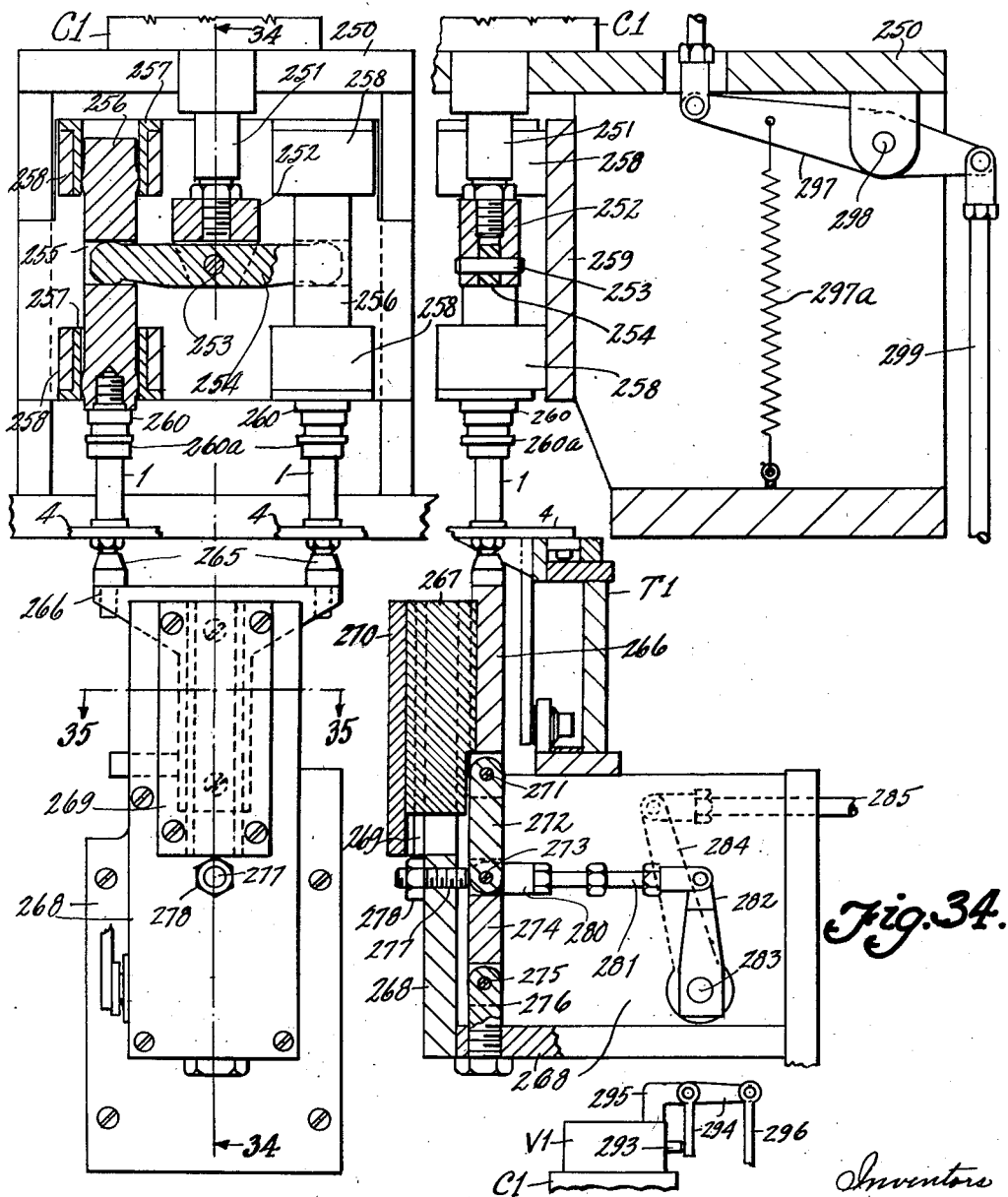

Fig. 33 is a front view partly in section of the contact cup staker.

Figure 35:
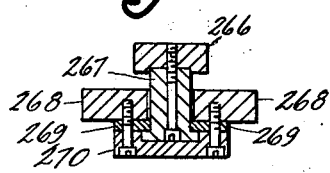

Figs. 34 and 35 are respectively sectional views on lines 34—34 and 35—35 of Fig. 33. Fig. 34A is a diagram of valve mechanism operated by a link 296 in Fig. 34.

Fig. 36 is a side view of the cup staker toggle and valve operating mechanisms.

Fig. 37 is a view in the direction of arrow 37 of Fig. 36.

Fig. 38 is a longitudinal sectional view of the punch for performing the first cup staking operation.

Fig. 39 is a longitudinal sectional view of the punch for performing the second cup staking operation and includes a longitudinal sectional view of holder 1, cup 50, button 51 and the punch support.

Figs. 40 and 40A constitute a front view partly in section of the flash remover.

Fig. 40B is a sectional view on line 40B—40B of Fig. 40.

Figs. 41 and 41A constitute a side view partly in section of the flash remover.

Fig. 42 is a side view of a mechanism for operating a valve controlling admission of air to the cylinder C2 shown in Fig. 40.

Fig. 43 is an enlarged fragmental longitudinal sectional view of holder 2, case 52 and the flash removing punches.

Fig. 44 is a view in the direction of arrow 44 of Fig. 40.

Fig. 45 is a view in the direction of arrow 45 of Fig. 47 showing the eyelet releaser.

Fig. 45A is a view in the direction of arrow 45A of Fig. 45.

Fig. 46 is a side of the eyelet placer.

Fig. 47 is a view of the eyelet placer on the side opposite to that shown in Fig. 46.

Fig. 48 is a sectional view on line 48—48 of Fig. 46.

Fig. 49 is a sectional view on line 49—49 of Fig. 47.

Fig. 50 is a sectional view on line 50—50 of Fig. 46.

Fig. 51 is a view similar to Fig. 50 but with certain parts in other positions.

Fig. 52 is a sectional view on line 52—52 of Fig. 46.

Figs. 53 and 54 are respectively side and front views of the case transfer mechanism.

Fig. 53A is a view in the direction of arrow 53A of Fig. 53.

Figs. 55 and 56 are respectively side and front views of the toggle mechanism of the case transfer mechanism.

Fig. 57 is an enlarged longitudinal sectional view on line 57—57 of Fig. 53.

Fig. 57A is a sectional view on line 57A—57A of Fig. 58.

Fig. 58 is a view similar to Fig. 57 showing certain parts in other positions.

Figure 4:
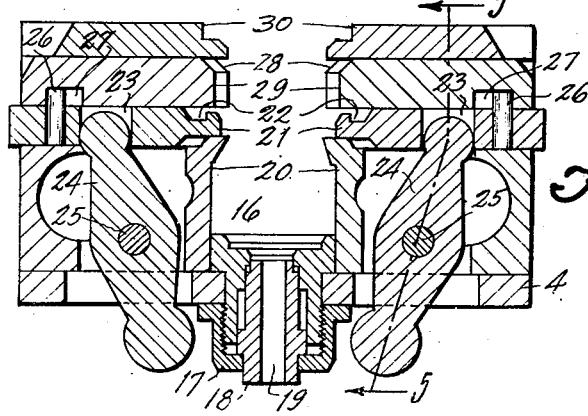
Fig. 4 is a sectional view on line 4—4 of Fig. 1, certain parts being in positions differing from the positions shown in Fig. 1.
Figure 59:
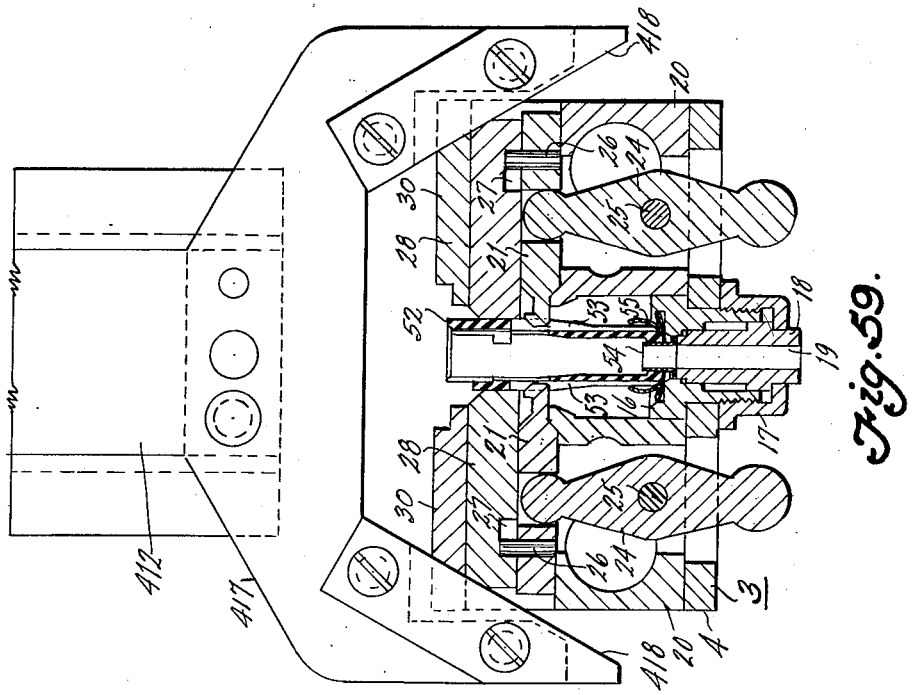

Fig. 59 is a longitudinal sectional view of holder 3 (similar to Fig. 4) and showing a mechanism for conditioning holder 3 preparatory to receiving a case from holder 2.

Figure 60:
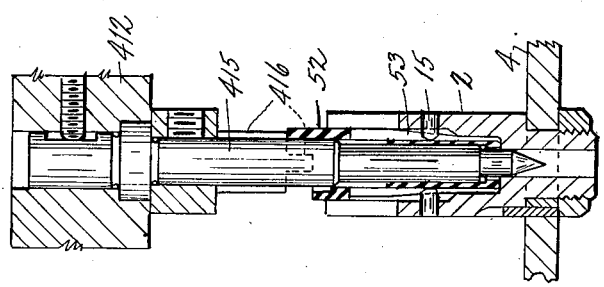

Fig. 60 is a longitudinal sectional view of holder 2 receiving a switch case which is gripped by a squeeze collet preparatory to transfer to holder 3.

Figure 61:
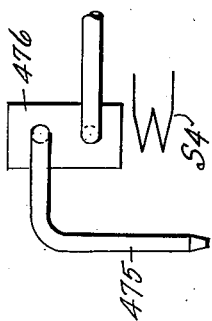

Fig. 61 is a diagram of a flash blow out mechanism.

Fig. 62 is a side view of the case checker at a station preceding the eyelet staker station.

Fig. 63 is a longitudinal sectional view of a part of holder 3 supporting the partial assembly of eyelet, plug and case.

Fig. 64 is a side view partly in section of the eyelet staker.

Fig. 64A is an enlarged sectional view on line 64—64A of Fig. 64.

Fig. 65 is a view partly in section in the direction of arrow 65 of Fig. 64, but omitting the holder 3 and the switch parts.

Figs. 66 and 66A are sectional views respectively on lines 66—66 and 66A—66A of Fig. 65.

Fig. 67 is a side view partly in section of the cup-button transfer mechanism.

Figs. 68 and 68A are enlargements of a portion of Fig. 67 showing certain parts in different positions.

Figure 69:
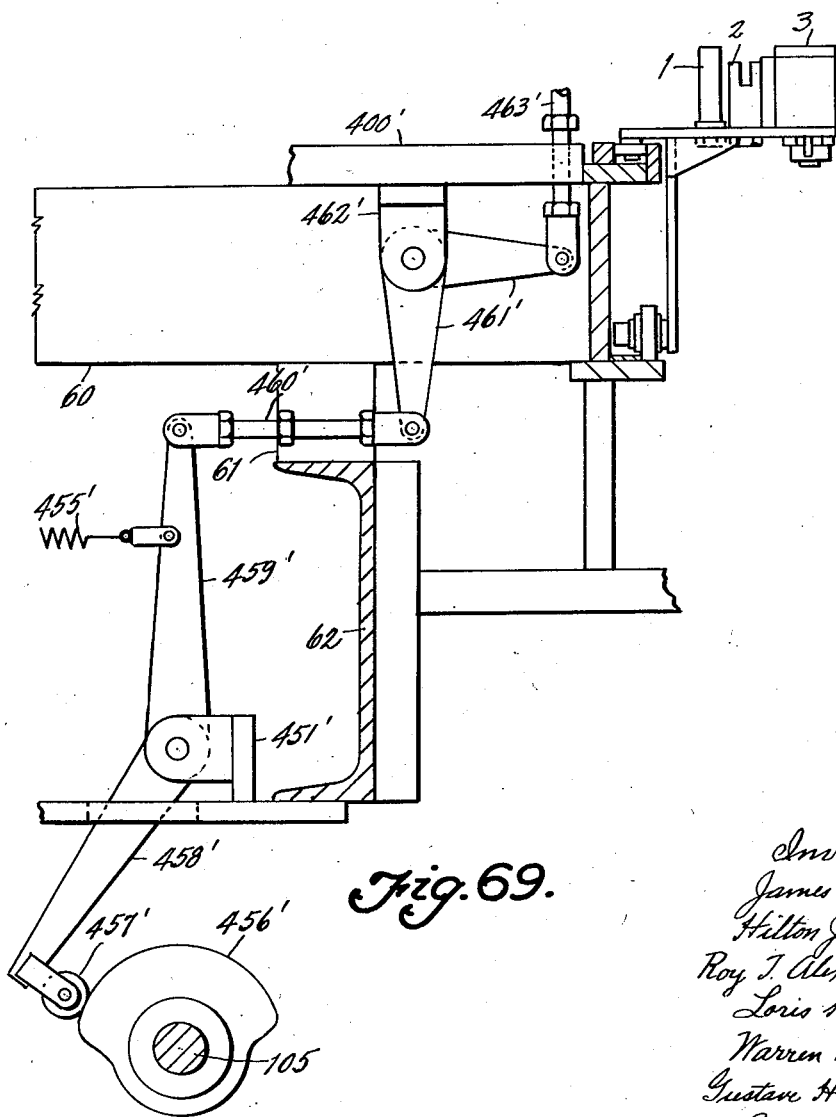

Fig. 69 is a side view of a station locater mechanism of the cup-button transfer mechanism.

Figs. 70 and 70A constitute a side view of the cup-button checker.

Figs. 71 and 72 constitute a side view of the switch spring push-down mechanism.

Figs. 73, 74 and 75 are respectively views in the directions of arrows 73, 74 and 75 of Fig. 71.

Figure 76:
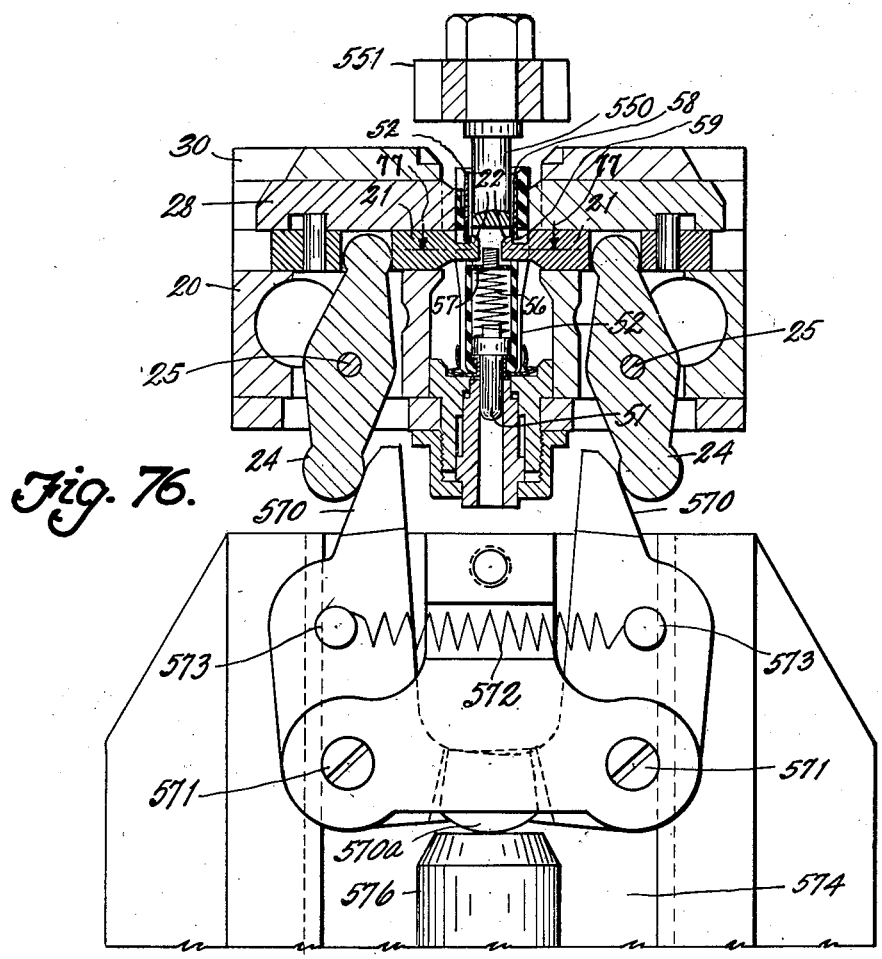

Fig. 76 is an enlarged sectional view on line 76—76 of Fig. 71.

Figure 77:
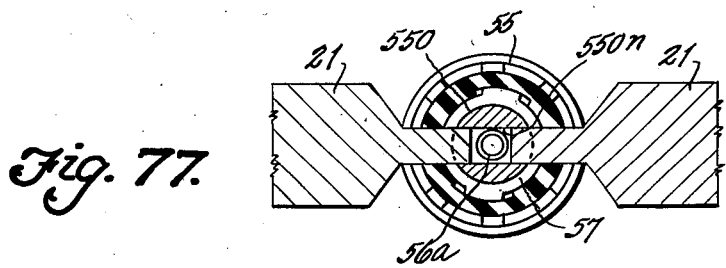

Fig. 77 is a sectional view on line 77—77 of Fig. 76.

Figs. 78 and 79 are respectively front and side views of the switch button pusher.

Fig. 78A is a sectional view on line 78A—78A of Fig. 78.

Figs. 80 and 81 are respectively front and side views of the switch tester.

Fig. 81A is a sectional view on line 81A—81A of Fig. 81.

Figs. 82 and 83 are respectively front and side views of the switch spring releaser.

Figs. 84 and 85 are respectively front and side views of the lamp socket tang bender.

Fig. 84A is a fragmentary upper extension of Fig. 84.

Fig. 85A is a fragmentary side extension of Fig. 85.

Figs. 86 and 87 are respectively views in the direction of arrows 86 and 87 respectively of Figs. 85 and 84.

Fig. 88 is a fragmentary view in the direction of arrow 88 of Fig. 84.

Figure 89:
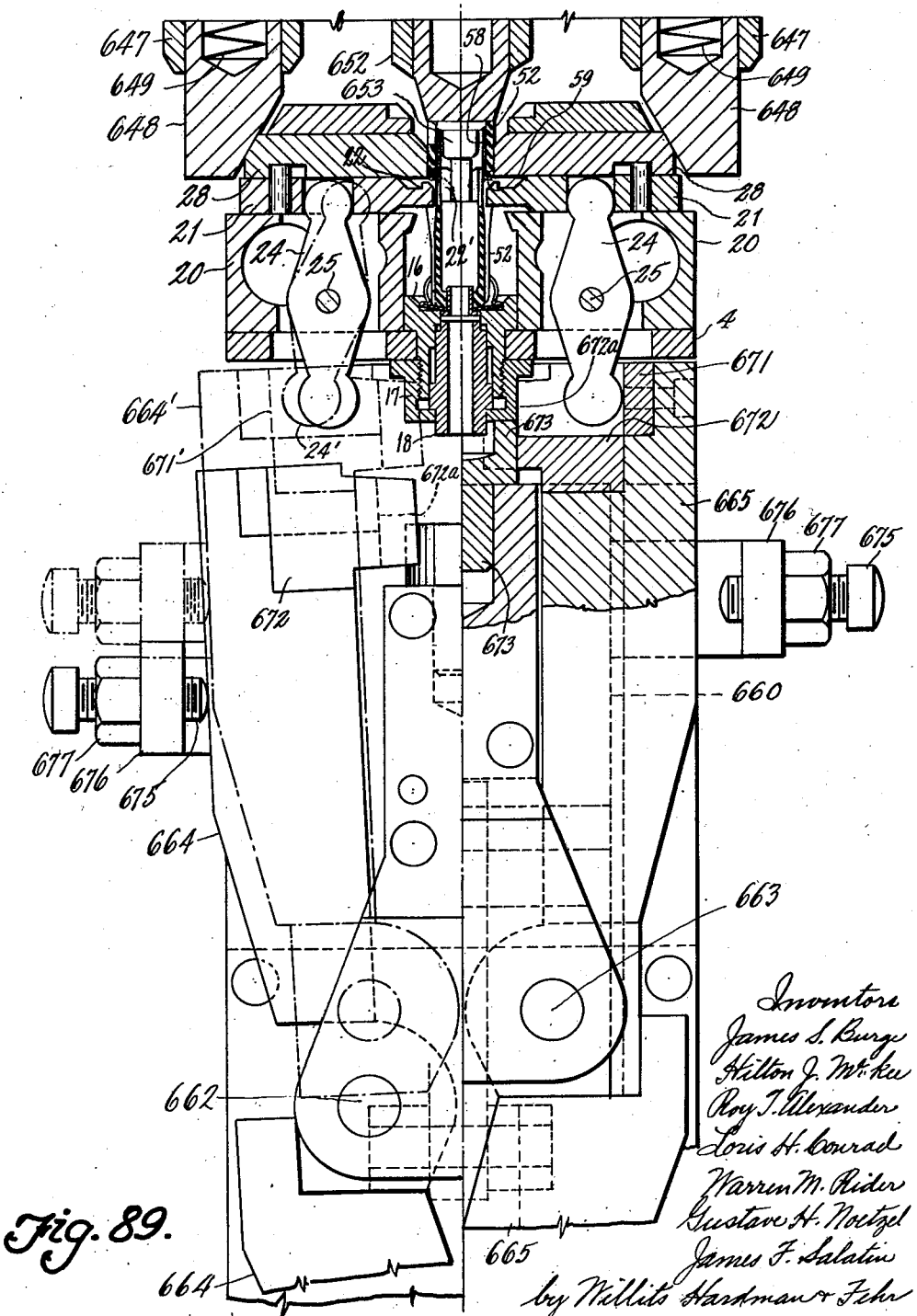

Fig. 89 is an enlarged fragmentary front view of the tang bender partly in section and showing, on the sides divided by the center line of this figure, certain parts in different positions.

Fig. 90 is a side view of a stripper and case checker mechanism used with the tang bender.

Fig. 91 is a fragmentary view in the direction of arrow 91 of Fig. 90.

Figs. 92 and 93 are respectively side and front views of a mechanism for opening holder 3 preparatory to removal of the completed switch.

Figure 94:
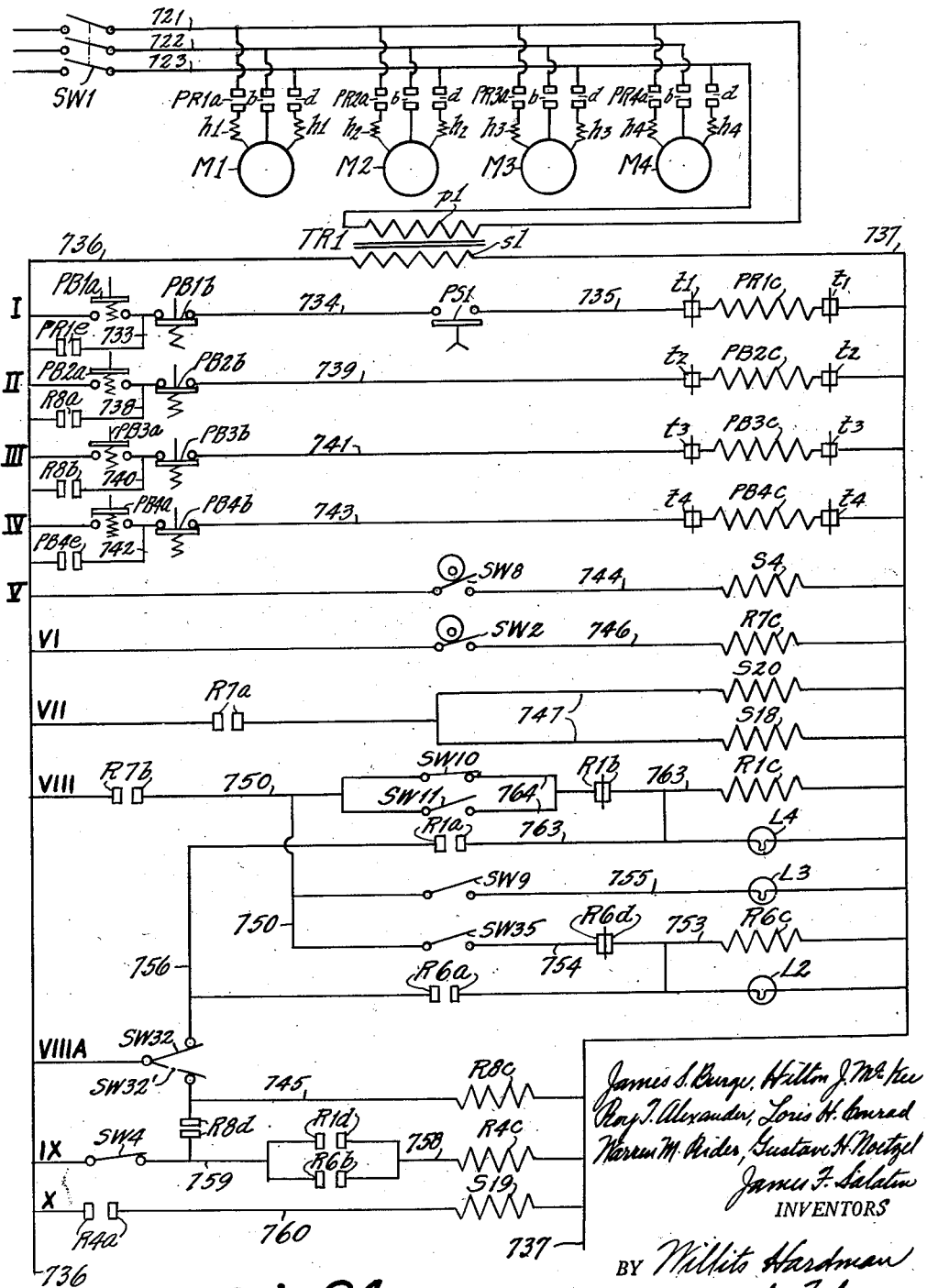
Figure 95:
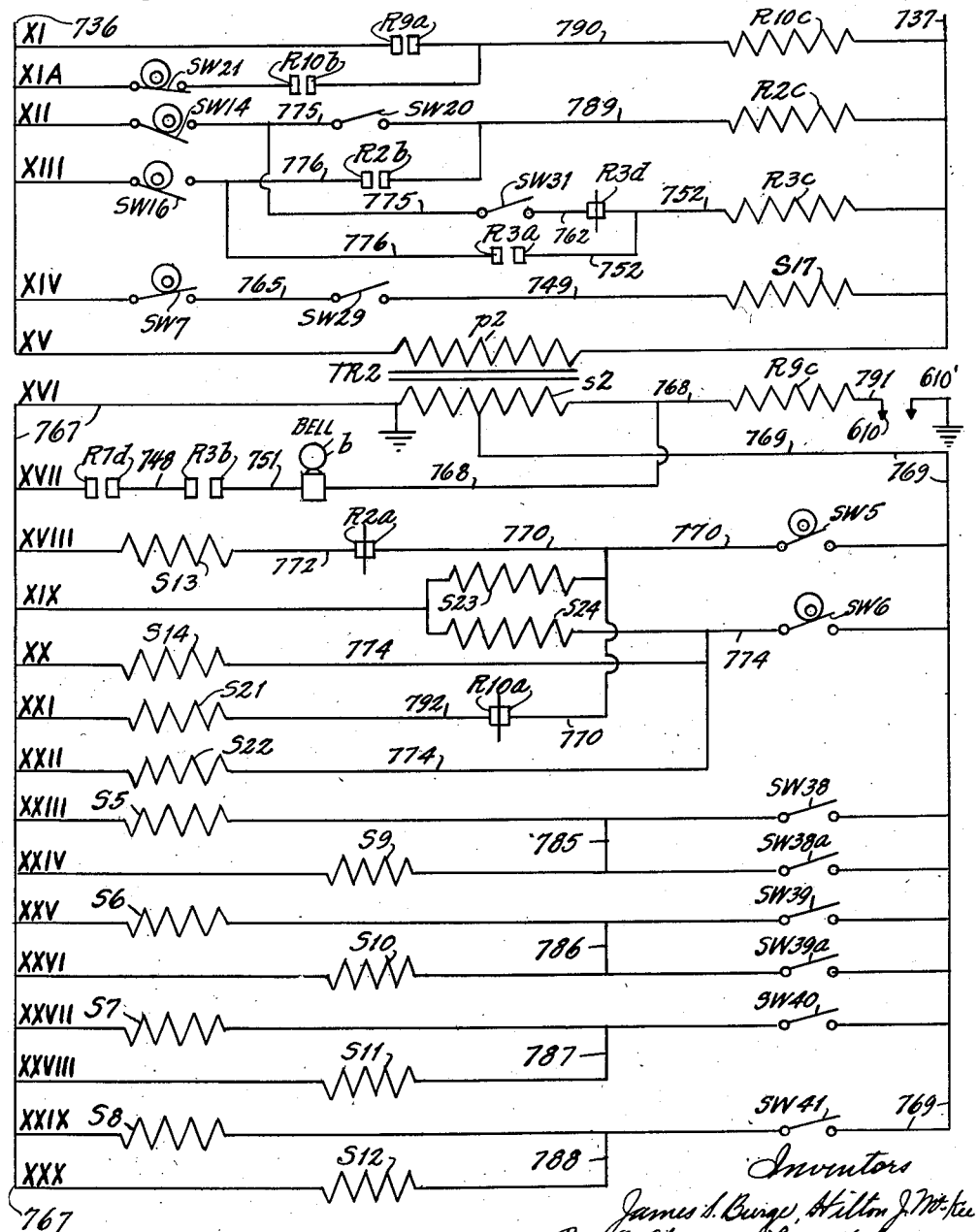

Figs. 94 and 95 constitute a wiring diagram of electrical controls.

Fig. 96 is a side view of a bracket and one of six control switches supported thereby.

Fig. 97 is a sectional view on line 97—97 of Fig. 96.

Fig. 97A is a fragmentary view in the direction of arrow 97A of Fig. 97.

Fig. 98 is a diagram of six control switches supported by the bracket shown in Fig. 96.

Figure 99:
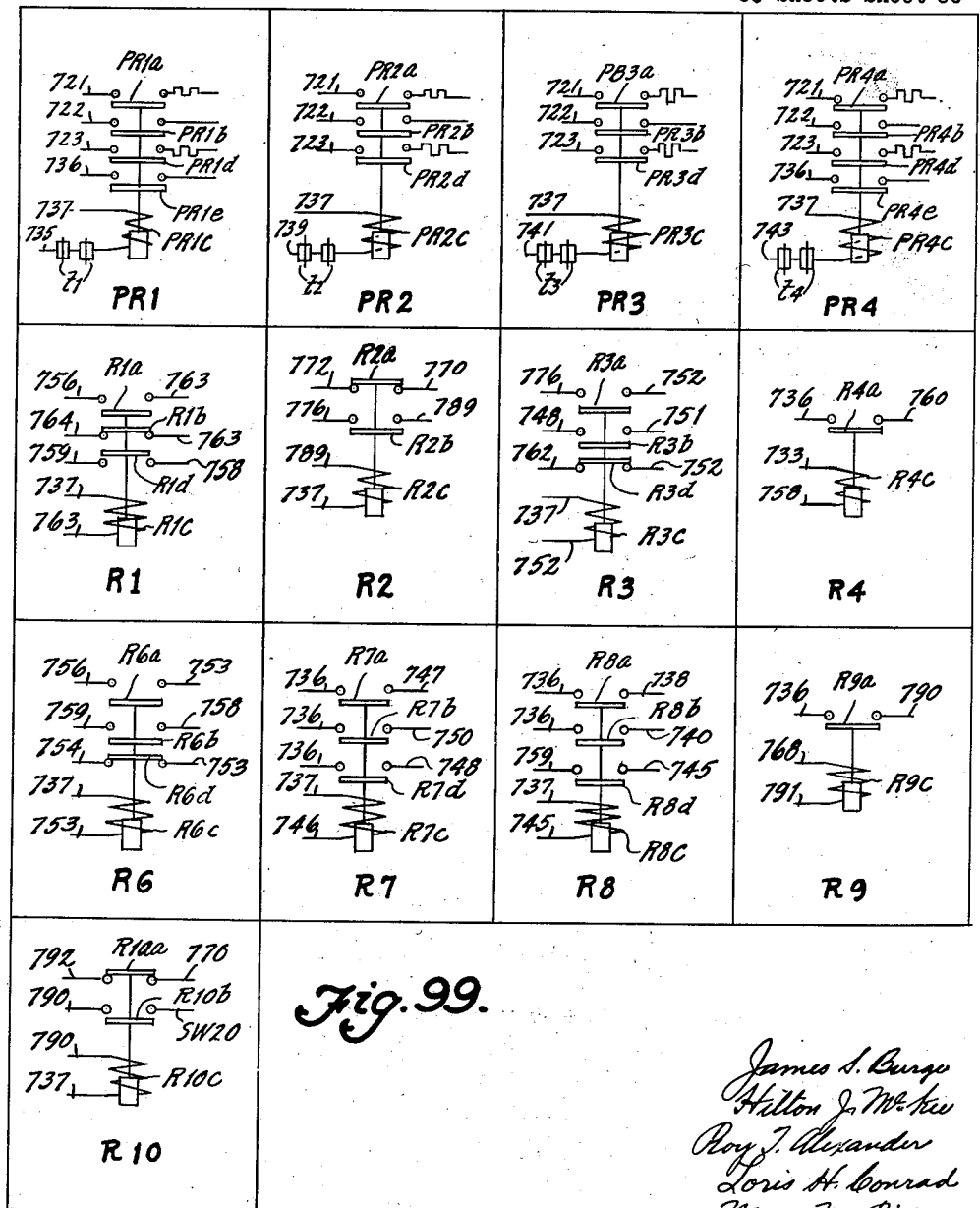

Fig. 99 is a chart of the relays included in the wiring diagram.

Figure 100:
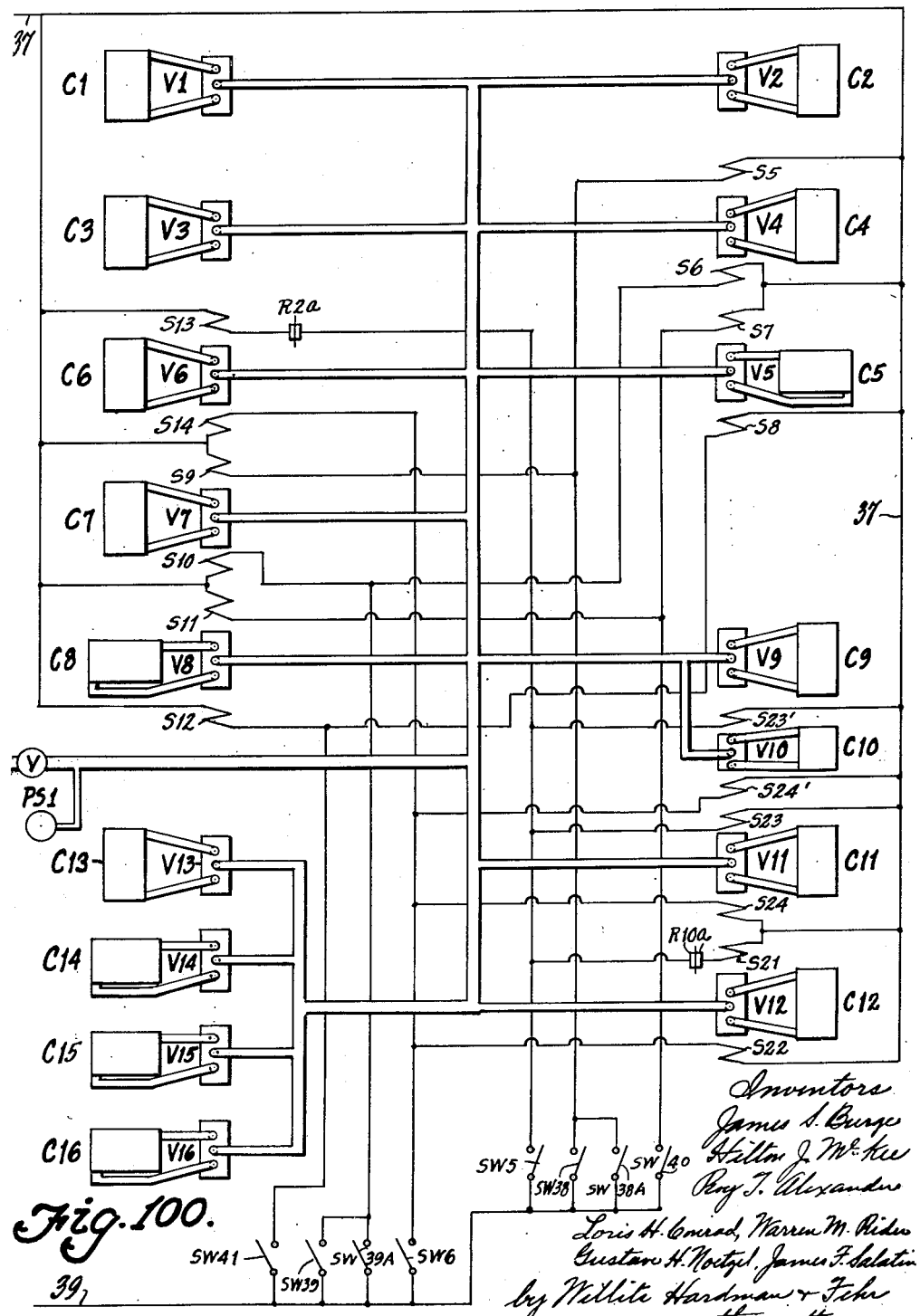

Fig. 100 is a diagram of compressed air servo cylinders and controls thereof.

Figure 101:
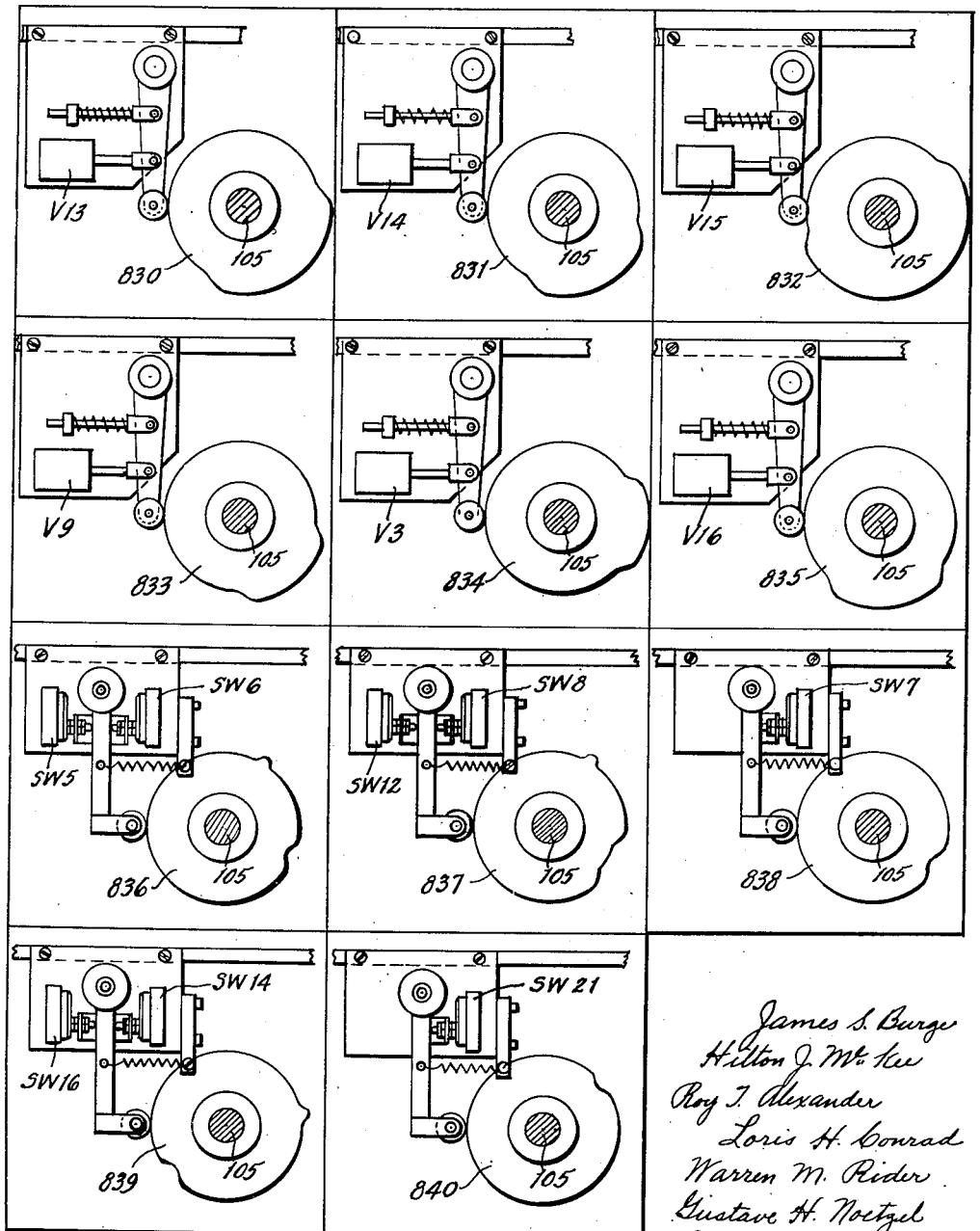

Fig. 101 is a chart of cam controlled switches and valves.

Fig. 102 is a chart showing sequence of operations.

Work holder

Figure 1:
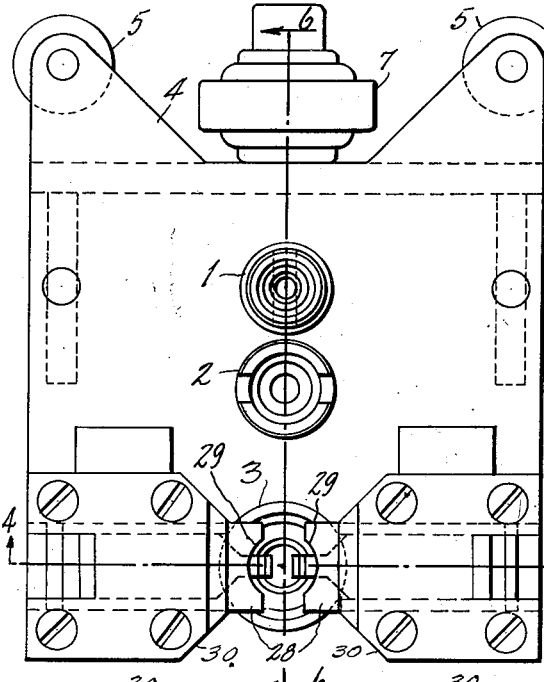
Fig. 1 is a plan view of a work support.
Figure 2:
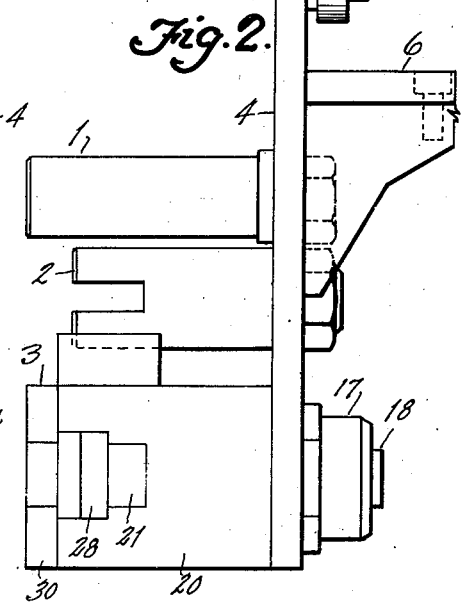
Fig. 2 is a fragmentary side view of the support.

Referring to Figs. 1–12, each of a plurality of work holder supports moved by a conveyor to be described comprises parts holders 1, 2 and 3 mounted on a horizontal plate 4 carrying track engaging rollers 5 and attached to a vertical plate 6 carrying a supporting and track engaging roller 7. Holder 1 (Fig. 6) has a socket 10, a central hole 11 and a cross hole 12. Holder 2 has a central stopped bore 13, side notches 14 and inwardly projecting pins 15. Holder 3 has a socket member 16 clamped to plate 4 by a nut 17 which retains a bushing 18 having a central bore 19. On each side of socket 16, there is a block 20 (Fig. 4) which guides, for horizontal movement radially of the socket 16, a slide 21 having a hook 22 and a notch 23 which receives the upper end of a lever 24 pivoted on a rod 25 supported by the block 20. Slide 21 carries a pin 26 received by a slot 27 in a slide 28 having an arcuate surface 29 whose center of curvature is aligned with socket 16 when the slides 28 are in advanced position as shown in Fig. 1. These slides are retained by plates 30 attached to blocks 20.

Referring to Fig. 7, each slide 21 has three notches 31, 32, 33 each adapted to receive a detent ball 34 which a spring 35 urges toward the slide. Spring 35 is retained by a plate 36 which screws 37 attach to block 20. Each slide 28 has two notches 38 and 39 each adapted to receive a detent ball 40 urged toward that slide by a spring 41 retained by plate 36.

Referring to Fig. 8, holder 1 receives first a cup-shaped contact forming member called a cup 50. A non-conducting contact moving button 51 is inserted through the cup 50 as shown in Fig. 9. The cup 50 is formed about a flange of the button 51 as shown in Fig. 10.

Referring to Fig. 11, holder 2 receives a case 52 of molded insulated material having grooves 53 which are received by pins 15 to hold the case 52 in a certain position.

Figure 3:
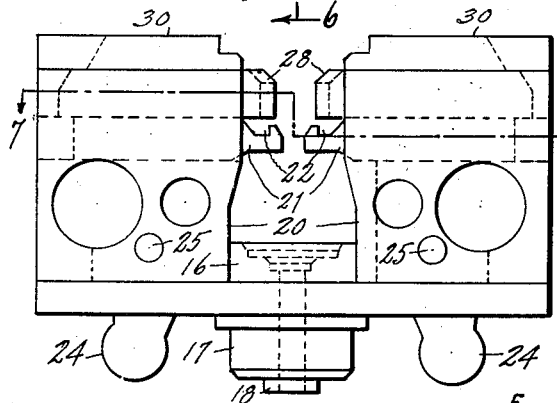
Fig. 3 is a front view of the support.
Figure 5:
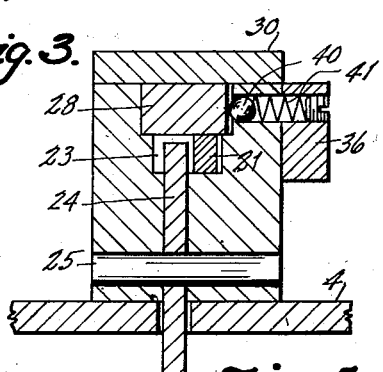
Fig. 5 is a sectional view on line 5—5 of Fig. 4.

Referring to Fig. 12, the socket 16 of holder 3 first receives a metal eyelet 54, second, a plug 55 designed to snap into a hole in a metal switch holding plate which is electrically grounded. Socket 16 receives next the case 52 which is transferred from holder 2 to holder 3. Then the up-standing flange of eyelet 54 is formed against case 52 as shown in Fig. 13. Then the cup-button assembly is transferred from holder 1 and placed in the case 52. A spring 56 and a non-conducting washer 57 are placed in the case. Spring 56 has a smaller closely wound portion 56a which is to serve as a contact for engaging the center contact of a lamp base which is received by a lamp socket 58 which is assembled while the washer 57 is being pressed down to a level near the lower ends of side openings 52a in the case 52. The socket 58 has two ears or tangs 59 which initially extend downwardly. The slides 21 having been advanced as shown in Fig. 3 over the washer 57 as shown in Fig. 76, the hooks 22 of these slides receive the tangs 59 when the socket 58 is placed in the case 52. Then the slides 21 are retracted to cause the tangs 59 to be bent into the side openings 52a of the case 52 and outwardly into horizontal positions as shown in Fig. 13 to retain the socket 58 against the action of spring 56 which urges the washer 57 against the lower end of the socket 58.

Machine frame and conveyor

Referring to Figs. 14 and 15, the work holder supports are guided for horizontal movement by track sections T1 and T2. Referring to Fig. 21, each section such as T1 comprises bars t1, t2, t3, t4, t5 and t6.

Bars *t3* and *t4* receive rollers 5 of the work holder support between them and plate *t5* which is engaged by roller 7 takes the weight of the support. Bar *t6* receives the lateral thrust of roller 7 and maintains support plate 6 in a vertical position. Sections T1 are supported by plates 60 (Fig. 14) supported by spacers 61 supported by channels 62 which are supported above the floor by leg frames 63 (Fig. 15) and by a box-like structure which includes horizontal plates 64 and 65 (Figs. 16 and 17), and by vertical plates 66 and 67. The channels 62 are spaced by tubes 68 (Fig. 16) through which there pass bolts 69 which receive nuts 70, the tightening of which clamp the channels against the ends of spacing tubes 68.

Referring to Figs. 14 and 15, the channels 62 support plates 71 which support track sections T2 and bearings 72 for shafts 73 attached to sprockets 74 around which there pass two conveyor chains 75 which move in directions indicated by arrows 75a, 75b (Figs. 14 and 15) and are connected with the work holder support plates 6 as shown in Fig. 21. The sprocket 74 which is the upper left hand one in Fig. 14 is the driving sprocket marked 74d in Figs. 16 and 17. Its shaft 73d is journaled also in a bearing 76 provided by a plate 77 supported by vertical plates 78 and 79 supported by plate 71 as shown in Figs. 16 and 17. This structure includes end plates 80 and 81 and a partition plate 82. Shaft 73d is connected with bevel gear 83 meshing with a bevel gear 84 connected with a shaft 85 journaled in bearings provided by plates 80 and 82 and connected with a sprocket 86 meshing with a chain 87 which engages a chain slack-takeup sprocket 88 supported by an adjustable bracket 89 and meshing with a sprocket 90 attached to a shaft 91 supported by a bearing bracket 92 attached to plate 66.

An electric motor M1 drives a shaft 93 through a speed reducer contained in a housing 94 supported by plate 65. Shaft 93 is connected by a coupling 93a with a shaft 95 journaled in a bearing bracket 96 supported by a plate 66. A torque limiting clutch 97 connects shaft 95 with a sprocket 98 which meshes with a chain 99 meshing with a sprocket 100 coaxial with shaft 91 and with a sprocket 101 coaxial with a shaft 102. Chain 99 is received also by a slack take-up sprocket 103 supported by a bracket 104 adjustable on plate 66. In Fig. 16 the circles marked I and II represent clutches. Clutch I when tripped connects sprocket 100 with shaft 91. Clutch II when tripped connects sprocket 101 with shaft 102. The details of these clutches and the mechanisms for tripping them are disclosed in application Serial No. 192,912 filed October 30, 1950. During each rotation of shaft 102, clutch I is tripped automatically and disengages automatically at the end of one-third revolution of shaft 91 thereby causing the work holder supports connected with conveyor chains 75 to move a distance equal to the spacing of the work holder supports as shown in Fig. 17. Shaft 102 (Fig. 15) is connected by a coupling 102a with a cam shaft 105 supported by bearings 106 some of which are supported by brackets 107 supported by channels 62.

Referring to Fig. 20, plate 66 supports a shaft 110 connected with a pawl 111, the point of which is received by a notch 112 of a lever 113 pivotally supported at 114 by plate 66. When pawl 111 is turned counterclockwise (Fig. 20), a spring 115 moves the lever 113 counterclockwise to effect, through action of a link 116, counterclockwise movement of a latch lever 117 to disengage it from a clutch disc 118. This action releases the disc and causes it to be connected with sprocket 101 as disclosed in the application referred to. Thus the sprocket 101 is connected with cam shaft 105. If, before one revolution of cam shaft 105 the pawl 11 is not permitted to return to the normal position shown in Fig. 20, the cam shaft will continue to rotate. The disengagement of clutch II is effected by returning the pawl 111 to normal position so that it will be in position to be received by the notch 112 of lever 113 as it is rotated to the position shown by the action of a roller 119 carried by clutch disc 118. Therefore if the lever 113 is retained by pawl 111 in advance of the end of one revolution, the clutch will be disengaged and cam shaft 105 will stop in home position.

The mechanism for controlling pawl shaft 110 comprises a lever 120 attached to shaft 110 and connected by link 121 (Fig. 18) with a lever 122 pivotally supported at 123 by a plate 124 which is supported by plate 64. Lever 122 is connected with a lever 125 which a spring 126 urges counterclockwise and link 121 downwardly to locate pawl 111 in clutch disengaging position. Lever 125 carries a pin 127 received by slot 128 provided by a link 129 connected by a pin 130 with a lever 131 attached to a shaft 132. To trip clutch II, shaft 132 is rotated counterclockwise by a control lever 133.

Shaft 132 is moved clockwise for the purpose of causing disengagement of clutch II by energization of a solenoid S19 (Fig. 19), the armature 136 of which is connected by link 137 and pin 138 with a lever arm 139 attached to shaft 132. Armature 136 has moved toward solenoid S19 to effect clockwise movement of shaft 132 to stop position indicated by the word "Stop" in Fig. 18. Clockwise rotation of shaft 132 is limited by engagement of an arm 140 of shaft 132 with a fixed pin 141. In the stop position, arm 140 engages the plunger 142 of a switch SW4. A switch SW32 is normally held closed by a spring 144 which urges a lever 145 against the plunger 146 of this switch. Lever 145, which is pivoted at 147, has an arm 148 carrying a pin 149 which pivotally supports a bar 149a which a spring 149b, connecting bar 149a and arm 148, urges clockwise against a stop surface 149c of arm 148. During movement of shaft 132 from "stop" to "start" position, the arm 140 engages bar 149a and arm 148 is caused to rotate clockwise until plate 140 clears bar 149a. Therefore during counterclockwise rotation of shaft 132, switch SW32 is momentarily shifted from a normal status by a spring of the switch and is returned to normal status by the action of spring 144. During movement of lever 133 from Start to Stop position, the switch SW32 is not actuated.

In Fig. 14, the short lines *w* represent positions of the work holder supports at the end of conveyor indexing. The decimal numbers indicate the stations for holders 1, 2 and 3 as follows:

Station 1.1 feed cup
Station 1.2 check cup
Station 1.3 feed button
Station 7.4 check button
Station 1.5A stake cup
Station 1.5B stake cup
Station 1.6 transfer cup-button to holder 3
Station 2.1 place case in holder 2
Station 2.2 punch flash
Station 2.3 transfer case to holder 3
Station 3.1 feed eyelet
Station 3.2 place plug in holder 3
Station 3.3 receive case from holder 2
Station 3.4 blow flash
Station 3.5 check case
Station 3.6 stake eyelet
Station 3.7 receive cup-button from holder 1
Station 3.8 check button
Station 3.9 place spring and washer
Station 3.10 push down spring
Station 3.11 push up button
Station 3.12 lower test prod
Station 3.13 release spring if switch is defective
Station 3.14 load socket
Station 3.15 bend socket tangs
Station 3.16 open holder 3
Station 3.17 unload

Station 1.1 contact cup feeder

Referring to Figs. 21 and 22, a motor operated hopper feed delivers contact cups 50 to a chute 150 from which they gravitate singly, when released by a releaser to be described, into the vertical hole 151 of a guide 152 which is caused to descend upon holder 1 after conveyor indexing is completed. The mechanism for lowering and raising the guide 152 is the same as that used with the guide 201 in Fig. 26 and the description thereof is found under heading, Station 1.3. The cup releaser comprises pins 154 and 155 carried respectively by leaf springs 156 and 157 attached at one end to a bracket 158 supported by chute 150 and biased toward actuating cams 160 and 161 respectively provided by an horizontally movable slide 162 which a spring 163 urges left in Fig. 22 so that pin 155 is up (Fig. 21) to retain the lowermost cup 50 in chute 150 and pin 154 is down. Slide 162 carries a pin 164 received by a notch in a bell crank lever 165 pivoted at 166 and connected by a link 167 with the armature 168 of a solenoid S18 supported by a bracket 159 attached to bracket 158. When the solenoid is energized, slide 162 moves right to move pin 154 into the hole of the next to lowest cup 50 while pin 155 moves down to release the lowest cup 50. When solenoid S18 is deenergized, pin 155 moves up into cup retaining position before pin 154 has moved down sufficiently to release a cup 50.

Station 1.2, contact cup checker

Referring to Figs. 23, 24 and 25, a cam 170 driven by shaft 105 is engaged by a roller 171 carried by a lever 172 pivotally supported by a bracket 173 and urged clockwise by springs 174. Lever 172 is connected by a link 175 with a lever 176 pivoted on a bracket 177 and carrying a pin 178 providing a pivot for a feeler arm 179 which carries a feeler pin 180. A spring 181 connected with studs 182 and 183 attached respectively to lever 176 and arm 179 urges the latter clockwise in Fig. 25 to cause a part 184 of arm 179 to engage a surface 185 of lever 176 whereby the feeler pin 180 is normally located for cup engagement. When cam 105, which turns counterclockwise in Fig. 23, presents its lower land to roller 171, the springs 174 effect clockwise movement of levers 172 and 176 to cause pin 180 to move toward holder 1. If the cup 50 is in the correct position as shown in Fig. 8, a switch SW10 is moved by lever 176 from normally closed status to open status and a switch SW11, which is normally open, is not closed by lever 176. If the cup 50 is inverted on holder 1, normally closed switch SW10 remains closed. If the cup 50 is missing, switch 10 is opened and switch SW11 is closed. If the cup 50 is inverted or is missing, the machine stops at the end of its cycle which is just before indexing starts. Control lever 133 (Fig. 18) moves to Stop position.

If the cup is missing, a lamp burns to indicate a missing cup; and the attendant moves the arm 179 about the pin 178 to clear holder 1 and places a cup in this holder. Then the machine is started by moving lever 133 to start position.

Station 1.3, button feeder

Referring to Figs. 26–30, the button feeder comprises a conventional motor operated hopper feed (not shown) by which the buttons 51 are discharged rounded end lowermost into a chute 190. The buttons descend until the lowermost one is caught by a finger of a conventional single-part releaser operated by a solenoid S20. When this solenoid is energized, the releaser permits gravitation of only the lowermost button and retains the remainder. The released button descends the chute and drops through a passage 200 in a guide 201 which is supported for vertical movement by a bracket 202 and rails 203. Normally guide 201 is above holder 1 and is moved down into engagement therewith by a mechanism comprising a roller 204 received by a notch 205 in the guide 201 and carried by a lever 206 journaled on bearings 207 supported by a rod 208 supported by a bracket 209 attached to bracket 202.

Lever 206 is connected by pin 210 with a link 211 connected with a lever 212 pivoted on a bracket 213 and urged counterclockwise by a spring 214 which urges lever 206 clockwise to push the guide 201 against holder 1 permitted to do so by a cam 215 (Fig. 29) rotated by a shaft 105. Cam 215 is engaged by a roller 216 carried by a lever 217 pivoted at 218 on a cam shaft supporting bracket 107. Lever 217 is connected by a link 219 with lever 212. Cam 215 rotates clockwise as viewed in Fig. 29. In the home position of cam 215 shown in Fig. 29, lever 212 is rotated clockwise from the position shown in Fig. 26 and lever 206 counterclockwise so that slide 201 is above work holder 1. When cam 215 presents its lower land to roller 216, spring 214 is effective to move lever 212 counterclockwise from the position shown in Fig. 29 to that shown in Fig. 26 so that the guide 201 is moved down yieldingly against the work holder 1.

The releaser comprises a slide 220 supporting fingers 221 and 222 which, as shown in Figs. 26B, are respectively disengaged from the next to lowest button 51 and in engagement with the lowest button 51 in the chute 190. Slide 220 is urged left in Fig. 26A by a spring 223 and is moved right by a solenoid S20 which, when energized, moves up an armature 224 connected by a link 225 with a lever 226 connected by a pin 227 with slide 220. When slide 220 moves right in Fig. 26A, finger 222 releases the lower-most button 51 while finger 221 retains the next to lowermost button. When solenoid S20 is deenergized, spring 223 moves finger 222 to button retaining position as finger 221 moves to button releasing position. Bracket 228 supported by chute 190 guides the slide 220 and supports a bracket 229 which supports solenoid S20.

Station 1.4, button checker

Referring to Figs. 31 and 32, cam shaft 105, which rotates clockwise in Fig. 31, drives a cam 230 engaged by a roller 231 carried by a lever 232 pivoted on a bracket 233 and connected by link 234 with a lever 235 pivoted on a bracket 236 attached to a bar 60. A spring 237 urges lever 235 clockwise and lever 232 counterclockwise so that roller 231 is urged toward cam 230. Lever 235 carries screws 240 retained in adjusted position by nuts 242 and located to operate switches SW9 and SW35 respectively.

Lever 235 carries a feeler pin 244 which, in the position of cam 230 shown in Fig. 31, the spring 237 urges against the button 51. If the button 51 is missing, lever 235 will move clockwise to such position that switch SW9 is closed and a lamp burns to indicate that the button 51 is missing. The operator can manually place the button upon holder 1 before it arrives at the next station. If the button 51 is in holder 1 in inverted position so that its upper end is at a level higher than normal, lever 235 cannot move clockwise far enough to open a normally closed switch SW35; and the machine is caused to stop by means to be described.

When, before the next conveyor indexing, the higher land of the cam 230 is presented to the roller 231, lever 232 moves counterclockwise and lever 235 clockwise from the position shown so that the feeler 244 is retracted above the button 51 so that next indexing operation will not be obstructed.

Station 1.5, stake cup to button

Referring to Figs. 33 and 34, a bracket 250 supports a cylinder C1 which contains a piston connected with a rod 251 carrying a yoke 252 which supports a pin 253 pivotally supporting an equalizing lever 254. The ends of lever 254 are received by recesses 255 of two plungers 256 which are spaced apart a distance equal to the spacing of the work holders on the conveyor. Each plunger 256 is guided by bushings 257 supported by arms 258 of a bracket 259 attached to the bracket 250. As shown in Fig. 39, each plunger 256 supports a contact cup forming punch 260. As viewed in Fig. 33, the work holder 1 moves from left toward right. The left hand punch 260 is provided, as shown in Fig. 38, with a conical surface 261 for engaging the contact cup 50 and forming it conically toward the contact button 51. The right hand punch 260 is provided with a surface 262 in a plane at right angles to the punch which completes the forming of the contact 50 against the button 51 as shown in Fig. 39. The forming operations performed by the right and left hand punches 260 (Fig. 33) are effected concurrently by downward movement of rod 251, the force exerted by said rod being equalized on the punches by the lever 254. Each punch 260 carries a sleeve 260a (Fig. 39) which receives holder 1 and pilots the punch with respect to the contact cup 50. A stripping plunger 260b is urged down by a spring 260c for the purpose of stripping the contact cup 50 from the punch 260 when it rises.

During the cup staking operation, the work holders 1 are supported underneath by studs 265 mounted upon a plate 266 attached, as shown in Fig. 34, to a vertically movable slide 267 guided by a fixed bracket 268 and rails 269 and a plate 270 attached to the bracket. The plate 266 is connected by a pin 271 with a toggle link 272 which a pin 273 connects with a toggle link 274 which a pin 275 connects with a screw 276 threaded through bracket 268. The extent to which the links 272 and 274 are brought into alignment is determined by a stop screw 277 threaded through bracket 268 and secured in adjusted position by a nut 278.

The toggle pin 273 is connected by a clevis 280 and a link 281 with a lever 282 attached to a shaft 283 pivotally supported by the bracket 268 and attached to a lever 284 which a link 285 connects with a lever 286 (Fig. 36) pivoted at 287 on a bracket 288 and carrying a roller 289 engageable with a cam 290 rotated by shaft 105 counterclockwise, as viewed in Fig. 36. A spring 291 urges lever 286 counterclockwise and exerts the force which causes the links 272 and 274 to be brought more nearly into alignment whereby the work holder, while at station 1.5, will be yieldingly supported. As shown in Fig. 36, roller 289 is engaged by the higher land of cam 290. In this position the cam 290, the links 272 and 274 would not be aligned as shown in Fig. 34 but would be disaligned so that the bushings 265 would be retracted below the work holder so that conveyor indexing could take place. After indexing, the cam 290 is turned so as to present its lower land to the roller 289 so that the spring 291 can move counterclockwise from the position shown to cause alignment of the toggle links 272 and 274 as shown in Fig. 34.

The admission of pressure fluid to the ends of air cylinder C1 is controlled by a valve V1 (Fig. 34A) having an operating plunger 293 which can be engaged by a lever 294 pivoted on a bracket 295 supported by valve V1 and connected by a link 296 with a lever 297 pivoted at 298 on bracket 250 (Fig. 34). Lever 297 is connected by link 299 with a lever 300 (Fig. 36) pivoted at 301 on bracket 288 and carrying a roller 302 engageable with a cam 303 driven by a shaft 105. A spring 297a (Fig. 34) urges lever 297 counterclockwise and lever 300 clockwise so that roller 302 will follow cam 303. Cam 303 is so timed as to admit compressed air to the upper end of cylinder C1 at the time required for the staking operation and to admit compressed air to the lower end of cylinder C1 so that the staking punches will be elevated before the next indexing operation.

In the position of cam 300 shown in Fig. 34, lever 294 (Fig. 34A) is in position to permit a spring in valve V1 to move valve plunger 293 right to a position such that valve V1 admits compressed air to the upper end of cylinder C1.

At station 1.6 the cup button assembly is transferred from holder 1 to holder 3 while that holder is at station 3.7. The cup button transfer mechanism will be described under the heading "STATION 3.7."

The case 52 is placed in work holder 2 at station 2.1.

*Station 2.2, punch flash*

Referring to Figs. 40–44, the flash punching mechanism will be described. The case 52, which is made of molded thermo-setting plastic, comes from its mold with thin webs of flash material closing its openings 52a. Fig. 43 shows the case 52 within holder 2 at station 2.2. At this station, bars 310 are caused to move in to break out the flash in openings 52a and the pieces of flash descend to the bottom of the case. Some pieces may drop through the hole 13 of holder 2. After the bars 310 have moved in, they are caused to move out and to rise to clear the holder 2 before the next indexing operation. The slides 310 (Figs. 40 and 40B) are clamped by plates 311 against blocks 312 which, as shown also in Fig. 44, are guided by rails 313 which, together with a spacer 313a, are attached to a plate 314. Plate 314 (Fig. 40) carries bushings 315 which receive guide rods 316 attached to a bracket 317. Rods 316 are received by bushings 318 carried by a plate 319 connected by a rod 320 with a piston in a cylinder C2 supported by bracket 317. Plates 314 and 319 are urged apart by springs 321 and the separation of these plates is limited by nuts 321 adjustably fixed to rods 322 which pass through plate 319 and are attached to plate 314. Plate 319 carries a yoke 323 connected by pin 324 with links 325 connected by pins 326 with levers 327 pivoted on rods 328 supported by plate 314 and having their ends extending into notches 329 of blocks 312. As shown in Fig. 40, the rod 320 has moved down to perform the flash removing operation. During a portion of downward movement of rod 320, the plate 314 moves down with plate 319 while the bars 310 are retracted. Downward movement of plate 314 stops when spacer 313a engages the case 52 (Fig. 43) in holder 3. Thereafter, during downward movement of plate 319, the links 325 are caused to be more nearly aligned so that the bars 310 move through the case 52 to break out the flash to leave the holes 52a (Fig. 11). During the first part of upward movement of the plate 319, the links 325 are caused to be more disaligned and the slides 310 move out to clear the holder 2. By the time bars 310 have been fully retracted, the plate 319 will have engaged the lowermost nut 322n. Thereafter during upward movement of plate 319, plate 314 moves up with it to carry the parts 310, 311 and 312 above the work holder.

During the operation of breaking out a flash, the work holder is supported by a bar 330 guided for vertical sliding movement by rails 331 and a plate 332 supported by a bracket 333 (Fig. 41A). Bar 330 is connected by pin 334 with a toggle link 335 connected by a pin 336 with a toggle link 337 connected by a pin 338 with a screw 339 (Fig. 41A) adjustably supported by bracket 333. Pin 336 is connected by link 340 with a lever 341 (Fig. 41) which, as shown in Fig. 41A, is supported at 342 by a bracket 343. Lever 341 carries a roller 344 engaging a cam 345 which is driven clockwise, as viewed in Fig. 41A, by shaft 105. Roller 344 is urged against cam 345 by springs 346 which urge lever 341 clockwise and in a direction tending to disalign the toggle links 335 and 337. When cam 345 presents its higher land to roller 344, the toggle links are straightened so that the work holder will be supported during the flash removing operation. The admission of pressure fluid to the upper end, lower end of cylinder C2 is controlled by a valve V2 shown diagrammatically in Fig. 41 and constructed like valve V1 (Fig. 34A) and operated in the same manner by a rod 350 (Fig. 41) connected with a lever 351 pivoted at 352 on bracket 317 and connected by a link 353 (Fig. 42) with a lever 354 pivotally supported at 355 on bracket 343 and carrying a roller 356 for engaging a cam 357 which shaft 105 rotates clockwise. A spring 358 (Fig.

41) urges lever 351 counterclockwise and lever 354 clockwise so that roller 356 follows cam 357. Cam 357 is timed so that descent and rise of piston rod 320 (Fig. 40) will occur at the proper time.

At station 2.3, the case 52 is transferred from holder 2 to holder 3 then at station 3.3 to be described under the heading "STATION 3.3."

*Station 3.1, eyelet feeder*

The eyelet 54 is placed in the socket 16 of holder 3, as shown in Fig. 12, by a feeding mechanism illustrated in Figs. 45–52. An air cylinder C3 controlled by a solenoid operated valve, to be described, is supported by a bracket 370 supported by bracket 371. Bracket 370 supports rails 372 which guide for vertical movement a block 373 attached to the piston rod 374 of a piston in cylinder C3. Block 373 carries a pin 375 supporting an arm 376 which carries an eyelet placing rod 377, the lower end of which is guided by bushing 378 supported by a block 379 which is attached to bracket 371. Block 373 carries an adjustable screw 380 which receives an arm of a lever 381 pivotally supported on a pin 382 supported by a bracket 382a supported by bracket 371 (Fig. 49) and urged counterclockwise by a spring 383 connected by a link 384 with the lower end of lever 381, as shown in Figs. 48 and 52. Eyelets 54 are fed by a motor driven hopper feed bottom flange lowermost to a chute 385. The lowermost eyelet of the chute gravitates which is released by a releaser to be described toward a discharge hole 386 (Fig. 48) in the bottom of block 379 and is aligned with it by means to be described. Descent of the eyelet through this hole is blocked by a gate slide 387 when in the position shown in Fig. 50. The slide 387 has a round hole 388 large enough to admit the eyelet 54 and a communicating notch 389 of such size as to admit the placing pin 377 but not the eyelet. Slide 387 is connected by pin 390 with a yoke 391 (Fig. 50) connected by a link 392 with a lever 393 (Fig. 46) pivotally supported at 394 by bracket 371 and urged counterclockwise by spring 395 from the position shown in Fig. 46 to a position causing slide 387 to occupy the position shown in Fig. 50 wherein slide 387 engages a stop 387a attached to block 379.

As block 373 moves down, the pin 377 is received by the eyelet which is retained upon the slide 387 until the pin 377 is moved near to the socket 16 (Fig. 12) of work holder 3 which is in alignment with it. During the final movement of rod 77 downwardly, it is received by the hole 19 of bushing 18 and the block 373 engages lever 393 to move it into the position shown in Fig. 46, thereby causing the gate slide 387 to move into the position shown in Fig. 51. Then the eyelet 54 descends along the pin 377 which had received it. During upward movement of the block 373, the pin 377 moves up and the slide 387 moves into the position shown in Fig. 50 preparatory to receiving another eyelet gravitating from chute 385.

As the block 373 returns to uppermost position, it engages lever 381 to move it against the action of spring 383 to the position shown in Figs. 48 and 52 so that a finger 396, carried by lever 381, will move an eyelet, which had gravitated nearly into alignment with the pin 377, into a position directly under the pin so that the pin will pass through it during next downward movement of the pin.

The eyelet releaser, like the button releaser (Fig. 26B), has fingers 221' and 222' carried by a slide 220' which a spring 223' urges into the position shown in Fig. 45 so that the lowermost eyelet 54 is retained by finger 222' while finger 221' is retracted from the next to lowermost eyelet. Slide 220' is connected by a pin 227' with a lever 226' pivotally supported by the slide guiding bracket 228' which is suported by chute 385. Lever 226' carries a roller 397 which is engaged by a cam 398 carried by lever 381. When pin 377 moves down to place an eyelet, cam 398 pushes down on roller 397 and causes clockwise movement of lever 226' (Fig. 45) to cause finger 222' to release the lowermost eyelet in the chute and finger 221' to retain the eyelet which had been next to the lowermost. As the pin 377 rises, the eyelet releaser returns to eyelet retaining position and the finger 396 pushes the released eyelet, which had gravitated down the chute, into a position substantially in alignment with the point of pin 377 then above the eyelet.

At station 3.2 the plug 55 (Fig. 12) is manually placed upon the socket 16 and around the eyelet 54 already received by the plug.

*Station 3.3, transfer case from station 2.3*

The case transfer mechanism will be described with reference to Figs. 54–60. Referring to Fig. 53, a plate 400 supports a sleeve 401 supporting bearings 402 for a shaft 403 integral with a disc 404 which supports a plate 405 which supports a plate 406 which supports a cylinder C5 containing a piston which is connected by a rod 407 threaded into a bar 407a and attached to a carriage 408 slidable on plate 405 and guided by rails 409. Plate 405 supports a bracket 410 which supports a cylinder C4 containing a piston connected by a rod 411 with a slide 412 guided by rails 413 attached to the bracket 410. Slide 412 supports a punch 415 to which a squeeze collet 416 is attached. Slide 412 carries a plate 417 which carries cam plates 418. The distance between the vertical center line 418a of plates 14 and the axis of punch 415 equals the center line distance between holders 2 and 3. Therefore, when punch 415 is in alignment with holder 2, cam plates 418 will be in alignment with holder 3. The left movement of carriage 408 from the position shown in Fig. 53 effects the alignment referred to, the left motion being arrested through the engagement of plate 406 by a stop screw 420 threaded through plate 407a and locked in adjusted position by a nut 421. This movement obviously takes place when the slide 412 is above the position shown in Fig. 53 so that the punch 415 will be vertically above the holder 2. Following left movement of the carriage 408, slide 412 is caused to move down so that punch 415 is received by the case 52 and the squeeze collet 416 is caused to frictionally engage the upper end of case 52 shown in Fig. 10 with pressure sufficient to withdraw it from holder 2. The down movement of the slide 412 to cause collet 416 to grip case 52 in holder 2 is accompanied by down movement of cam plates 418 into position shown in Fig. 59, whereby plates 418 cause slides 28 to move in preparatory to reception of case 52 and to cause slides 21 to move in so that their inner ends will be in position to be received by the grooves 53 of case 52. The down movement of punch 415, while alignment with holder 2, is followed by up movement of slide 412 and this by punch 415 and collet 416 with holder 3, as shown in right movement of carriage 408 to position for aligning punch 415 and collet 416 with holder 3, as shown in Fig. 53. For this purpose, right movement of carriage 408 is arrested by engagement of the head of screw 420 with a stop screw 425 which is adjustable in a plate 426 fixed to rails 409 and locked in adjusted position by nut 427. After the punch 415 and chuck 416 arrive at the position shown in Fig. 53, the carriage 412 is caused to descend and the case is placed between the slides 28 of holder 3 and upon the socket 16 thereof, as shown in Fig. 57, and the punch enters the eyelet and spreads the flange slightly to make certain that the eyelet flange will be staked in the proper manner at the eyelet staking station 3.6. The squeeze collet 416 (Fig. 57A) provides clearance for stripping fingers 430 which are located as shown in Fig. 57 so as to engage the upper end of case 52 and hold it down while the punch 415 and collet 416 are retracted.

The stripping fingers 430 are provided by the ends of levers 432 which are urged together by a spring 431 and which are pivotally supported by a block 433 (Figs. 53, 54 and 55). Block 433 is pivoted at 434 upon rails 435 attached to a vertical plate 436 and guiding for vertical movement a slide 437 connected by pin 438 with an adjustable link 439 connected by a pin 440 with block 433. When slide 437 moves up, as shown in Figs. 53, 54 and 55, the levers 432 present the stripping fingers 430 in alignment with the punch 415. The fingers 430 have beveled surfaces 430a engaged by the case 52 as it is moved down upon holder 3. The fingers 430 spread apart to receive the case 52. When case 52 is below the fingers 430, the spring 431 places them in case stripping position shown in Fig. 57. In the upper position of the slide 437, it engages the bushing 18 (Fig. 57) to move it up so that the lower flange of eyelet 54 engages the bottom of plug 55 preparatory to the eyelet flaring operation performed by the punch, as shown in Fig. 57.

Before the next indexing operation, it is necessary to lower the slide 437 in order that the fingers 430 and their supporting levers 432 will be removed from the path of movement of the work holder and so that slide 437 will be below the bushing 18. This lowering of the slide 437 is effected by disaligning toggle links 441 and 442 which, respectively, are connected by pins 443 and 444 with slide 437 and a screw 445 supported by a bracket 446. These links are connected by a pin 446 with a yoke 447 which is connected by a link 448 with a lever 449, a portion of which is shown in Fig. 56, said lever 449 being behind a lever 459 in Fig. 55. Lever 449 extends from a hub 450 supported by a bracket 451. Hub 450 carries a lever 452 which supports a roller 453 urged clockwise into engagement with a cam 454 rotated counterclockwise by shaft 105, said engagement being effected by a spring 455 which urges lever 449 counterclockwise. Therefore, when the lower land of cam 454 is presented to roller 453, the toggle links 441 and 442 are disaligned so that the slide 437 is lowered before indexing takes place.

To the left of cam 454 (Fig. 56) there is a cam 456 driven by shaft 105 and engaging a roller 457 carried by a lever 458 extending from a hub 458a coaxial with hub 450. From hub 458a there extends a lever 459 which a spring like 455 urges clockwise. Lever 459 is connected by link 460 with a lever 461 which is pivoted on a bracket 462 and which is connected by link 463 with a lever 464 (Fig. 53). Lever 464 is pivotally supported by a clamp bracket 465 attached to shaft 403 and lever 464 is provided with a plate 466 providing a notch 467 for receiving the upper end of work holder 1. At the proper time after indexing, the cam 456 allows a spring (like spring 455) to urge lever 459 counterclockwise and lever 461 clockwise and lever 464 clockwise to cause notch 467 to receive the upper end of holder 1. If the punch 415 should have been slightly disaligned with either of the work holders 2 or 3, the engagement of the plate 466 with holder 1 will cause alignment or station centering to be effected by slight rotation of shaft 403 which is always maintained in near alignment by reason of a lug 470 (Fig. 53A) attached to sleeve 401 and located between the ends of two closely spaced screws 471 supported by bars 472 attached to plate 405 which supports the carriage 408.

Station 3.4, blok flash

At station 3.4 the case 52 is directly under a nozzle 475 (Fig. 61) connected by a valve 476 with a compressed air source when a solenoid S4 is energized once after each conveyor indexing. A blast of air removes flash particles from the case and these particles are removed from the environs by air suction to which this station is subjected.

Station 3.5, check case

At station 3.5 (Fig. 14), a check is made to determine whether the case has been transferred at station 3.3. The case checker will now be described with reference to Figs. 62 and 63. A bracket 480 pivotally supports at 481 a checking lever 482 adapted to engage a top of a case 52 if one is present. This engagement is effected by a spring 483 attached to a lever 484 pivotally supported at 485 by bracket 486 and carrying a roller 487 for engaging a cam 488 which is rotated counterclockwise in Fig. 62 by the cam shaft 105. Lever 484 connected by a link 489 with lever 482. When the high land of cam 488 receives roller 487, lever 482 is above the case 52. When the low land of cam 488 receives roller 487, spring 483 is permitted to lower the right end of lever 482 into engagement with a case 52 if one is present. If the case 52 is not present, lever 482 can move clockwise far enough to operate a switch SW20 which controls a circuit for preventing operation of the eyelet staker at station 3.6.

Station 3.6, eyelet staker

The eyelet staker will now be described with reference to Figs. 62, 64, 65 and 66. Bracket 480, shown in Figs. 62 and 64, supports an air cylinder C6 containing a piston connecting a rod 490 with a plate 491 attached to a block 492 carrying bushings 493 (Fig. 65) which receive guide rods 494 attached to bracket 480. Block 492 supports two opposite bars 495 and two opposite bars 496 which define a rectangular box which receives a cover 497 for supporting a plate 498 attached to a plate 499 which is engaged by rollers 500 journaled on pins 501 supported by block 492. Cover 497 carries a sleeve 502 which supports a stripper bushing 503 which is urged downwardly by a spring 504 and which surrounds an eyelet riveting punch 505 which extends into the plate 498 and which has a head against which the plate 499 bears. When the rod 490 is in the upper position, shown in Fig. 62, the stripper 503 is urged down until its external flange engages the internal flange provided by sleeve 502. Downward movement of the rod 490 causes the punch 505 to stake the eyelet, as shown in Fig. 64A, while the stripper bushing 503 engages the case 52. While the punch 505 is being retracted after the staking operation, the spring 504 retains the case 52 in place in holder 3 until after the punch is removed from the eyelet and does not frictionally drag upon the case 52.

During the staking operation, the bushing 18 of holder 3 (Fig. 4) is held up, as shown in Figs. 64 and 64A, by a slide 510 which is guided for vertical movement by rails 511 attached to a plate 512 supported by a bracket 513 which supports a screw 514 connected by pin 515 with a toggle link 516 connected by a pin 517 with a toggle link 518 connected by a pin 519 with the slide 510. Pin 517 is connected by link 520 with a lever 521 pivoted at 522 on a bracket 523 and carrying a roller 524 for engaging a cam 525 which is rotated counterclockwise by shaft 105. A spring 526 urges roller 524 into engagement with the cam 525. Cam 525 is so timed that the toggles 516 and 518 are disaligned and slide 510 is lowered to permit indexing the conveyor. Other cam means to be described control the admission of pressure fluid to the ends of cylinder C6 so that rod 490 descends after indexing and retracts before the next indexing.

Station 3.7, transfer cup-button assembly from station 1.6

Figs. 67, 68 and 69 show a transfer mechanism and a station centering mechanism which is similar to that used with the case transfer mechanism. Therefore, the parts which are similar in function to those associated with the case transfer mechanism are referred to in the drawings by the same reference numbers but with primes affixed thereto. Description of most of these similar parts is omitted. The horizontal cylinder shown in Fig. 67 is marked C8 and the vertical cylinder C7. Cylinders C7 and C8 have functions corresponding to cylinders C4 and C5, respectively, in Fig. 53. Slide 412' supports a bushing 530 which receives a pressure block 531 which springs 532 urge downwardly until a flange 533 of stripper 531 engages a shoulder 534 of bushing 530. Block 531 surrounds the jaws 535 of a collet chuck 536 which is threaded through block 531 and is retained by a nut 537 supported by slide 412'. Chuck 536 receives a stripper rod 538 carried by slide 412' and retained by a screw 539. While the slide 412' descends with chuck 436 in alignment with work holder 2, the lower end of the chuck is substantially below the rod 538 as shown in Fig. 68; and springs 532 transmit the down movement of slide 412' to the chuck 536 as it advances against the button 51 and its jaws 535 spread slightly to receive the button 51. Then as slide 412' moves up while the chuck 536 is aligned with holder 2, the button 51 moves up. Following this up movement of slide 412', the carriage 408' moves to the right into the position shown in Fig. 67, thereby locating the button 51 in alignment with the eyelet 54 in holder 3 which has been riveted against the case 52. Following right movement of carriage 408', slide 412' is caused to descend to lower the block 531 upon holder 3; and thereafter, during down movement of slide 412', the stripper 538 moves down to push the button 51 from the chuck 536 to allow the button to drop in the case 52 and its lower end to move through eyelet 54. Then, the slide 412' moves up so as to clear the work holder. The cycle of transfer ends with the chuck 536 vertically above holder 3 and it begins after indexing with movement of carriage 408' to the left of the position shown in Fig. 67 to align the chuck with work holder 2 preparatory to picking up from that holder another button and cup assembly.

*Station 3.8, check button assembly*

Referring to Figs. 70 and 70A, the presence of the button-cup assembly in the case is checked before any additional parts are assembled into the case. For this purpose there is a lever 540 pivotally supported by bracket 541 and connected by a link 542 with a lever 543 pivotally supported by bracket 544 and carrying a roller 545 for engaging a cam 546 which is rotated counterclockwise in Fig. 70A by shaft 105. Roller 545 is urged against cam 546 by force of gravity. After indexing, the cam 546 presents its low land to roller 545 to effect lowering of a feeler rod 547 carried by lever 540. If feeler 547 engages the upper end of button 50 in the case at this station, nothing happens; but, if the button is absent, a switch SW31 is permitted to close by action of its own spring and establishes a circuit between a current source and a bell which rings to indicate that a button is missing. Therefore, after the rod 547 is lifted to clear the case and after the following indexing operation, the attendant can manually insert a button and cup assembly.

At station 3.9 in Fig. 14 or stations adjacent thereto, the attendant assembles a spring 56 and a washer 57 which are shown in Fig. 13.

*Station 3.10, push down spring and washer*

As shown in Fig. 76, a rod 550 has been lowered into the case 52 and has forced down the washer 57 and has compressed spring 56 and the slides 21 have moved in above the washer 57 to hold it down after the rod 550 is moved up. The rod 550 (Fig. 71) is carried by a lever 551 extending from a hub 552 pivotally supported by yoke 553 extending from a rod 554 pivotally supported by a sleeve 555 which a clamp 556 secures to a plate 557. Lever 551 is urged downwardly by a spring 560 toward a stop 551a attached to plate 557. A lever 561, which connected by a link 562 with lever 551, is pivotally supported by a bracket 563 attached to plate 557 and is connected by a link 564 with a lever 565 pivotally supported by a bracket 566 and carrying a roller 567 (Fig. 72) for engaging a cam 568 driven clockwise by shaft 105. When the high land of cam 568 engages roller 567, lever 565 is in position for causing lever 551 to be in upper position and the rod 550 to clear the work holder 3. When the low land of cam 568 is presented to roller 567, spring 560 is effective to cause counterclockwise rotation of lever 565 and clockwise rotation of levers 561 and 551 until lever 551 engages stop 551a and rod 550 pushes the spring 56 and the washer 57 into the position shown in Fig. 76.

While the washer is thus held down, the slides 21 (Fig. 76) are caused to advance toward each other by separation of the lower ends of levers 24. This movement is effected by outward movement of the upper ends of levers 570 which are pivoted on screws 571 and which are urged toward each other by a spring 572 connected with studs 573 attached to these levers. The screws 571 are carried by a slide 574 (Fig. 75) which supports a cylinder C9 containing a piston connected by a rod 575 with a block 576 which is engageable with the overlapping lower arms 570a of levers 570. Therefore, when the block 576 moves up, the upper ends of arms 570 are caused to separate to effect separation of the lower ends of levers 24 (Fig. 76) and the inward movement of slides 21. The lower end portion of rod 550 which engages the washer 57 is provided with a notch 550n (Fig. 77) which receives the slides 21. Slides 21, when in their fully advanced position, provide clearance for the portion 56a of spring 56.

The slide 574 is guided for vertical movement by rails 580 and a plate 581 to which the rails are attached, plate 581 being supported by bracket 582. Slide 574 is connected by a pin 583 with a toggle link 584 connected by pin 585 with a toggle link 586 connected by pin 587 with a screw 588 adjustably supported by bracket 582. Pin 585 is connected by a link 590 with a lever 591 which carries a roller 592 (Fig. 72) engageable with a cam 593 which is rotated clockwise by shaft 105. When cam 593 presents its higher land to roller 592, the toggle links 584 and 586 are straightened to elevate the slide 574 into position, the levers 570 then being moved fully together by the spring 572. Following the upmovement of slide 574, pressure fluid is admitted to the lower end of cylinder C9 so that its piston rod 575 rises to effect separation of the upper ends of levers 570 so that the slides 21 move in as shown in Figs. 76 and 77. Before the next conveyor indexing, the upper ends of levers 570 move toward each other and down by the action of the cam 573 which presents its lower land to roller 572 so that a spring 594 is permitted to move link 590 to the right in Fig. 71 so that the toggle links 584 and 586 are disaligned and the slide 574 is lowered; and lever 551 is raised by the action of cam 568.

Lever 551 carries a block 595 providing a notch 596 which, during downward movement of lever 551, engages holder 1 for the purpose of station centering, that is, to align rod 551 with work holder 3.

*Station 3.11, push-up button*

Referring to Figs. 78 and 79, a rod 600 which will be vertically below a button 51 when located at station 3.11 is caused to move up by admitting pressure fluid to the lower end of cylinder C10 which is adjustably mounted on a bracket 601 fixed to plate 601a. A piston in cylinder C10 is connected by a rod 602, a yoke 603, a pin 603a wtih a slide 604 which supports the pin 600. Slide 604 is guided by a bracket 605 attached to bracket 601a and is retained by a cover plate 606. After rod 600 moves up to cause the switch button 51 to separate the contact 50 from the eyelet 54, pressure fluid is admitted to the upper end of cylinder C10 so that rod 600 will descend and allow the plunger to be moved down by the switch spring 56. If the switch should fail to return due to sticking in the switch case, the product switch will not pass the test at station 3.12 and the spring 56 will be released at station 3.13 to indicate a defective switch. The admission of pressure fluid to cylinder C10 is controlled by a solenoid operated valve V10 (Fig. 100).

*Station 3.12, switch testing apparatus*

Referring to Figs. 80 and 81, the testing of the switch to determine whether current will pass between the contact 50 and the eyelet 54 involves the lowering of a prod 610 into engagement with the spring portion 56a while at station 3.12 The test prod 610 extends through a tube 611 and is threaded at its upper end to receive nuts 612n which clamp a terminal 612 attached to a wire 612w which is connected with a current source having also a ground wire which is electrically connected through the machine with the eyelet 54. The tube 611 is guided for vertical movement by a bracket 611a attached to a nonconducting bracket 613 attached to the bracket 250 shown in Fig. 34. Bracket 613 supports a bracket 614 which supports a cylinder C11 carrying a control valve V11 to which compressed air is delivered to connections including a rubber hose 615. Cylinder C11 contains a piston connected by a rod 616 and a yoke 617 with a lever 618 pivoted at 619 on bracket 611a and providing a fork 620 whose arms each carries a pin 621 received in a groove between flanges 622 of the tube 611. When pressure of fluid is admitted to the lower end of cylinder C11, the rod 611 moves down and forces a spring 623 against a shoulder 623a of prod 610, thereby urging said prod yieldingly into engagement with the spring portion 56a of the product switch. After the switch has been tested to determine whether current passes between the contact and the eyelet, pressure fluid is admitted to the upper end of cylinder C11 to cause the prod 610 to be elevated before the next indexing operation.

*Station 3.13, release of switch spring if switch did not pass current while at station 3.12*

If the switch passed current while at station 3.12, the spring 56 of the product switch remains held down by the slides 21 while at station 3.13 so that the operator will observe that the switch has passed inspection. If the switch did not pass current while at station 3.12, its spring 56 is released at station 3.13 by causing the lower ends of levers 24 of holder 3 to move together to retract the slides 21 so that the spring 56, on being released, will pop out of the switch case 52 so that the attendant will know that the switch is defective and will remove it at a station following station 3.13.

The lower ends of levers 24 are moved together by levers 630 (Figs. 82 and 83) which are pivoted at 631 on a plate 632 attached to a bracket 633. A plate 634 supports plate 632 and bracket 633 and is attached to a bracket 635 supported by a channel 62 (Fig. 83). Levers 630 have arms 630a which are pivotally connected with links 636 connected by a yoke 637 with a piston rod 638 connected with a piston contained in a cylinder C12 which is supported by plate 634 and which is controlled by a valve V12 in a manner to be described. The mechanism shown in Figs. 82 and 83 is enclosed by a guard 639.

If the product switch, while at station 3.12, fails to pass current between its contact 50 and its eyelet 54, when the defective switch arrives at station 3.13 valve V12 is in condition for causing, at the proper time, admission of presure fluid to the lower end of cylinder C12 to cause the piston rod 638 to rise to cause the arms 630 to advance and to engage the lower ends of levers 24 to push them together for the purpose of retracting slides 21 to release the switch spring 56. After the spring 56 has been released and before the next indexing operation, pressure fluid is admitted to the upper end of cylinder C12 to cause the levers 630 to be retracted as shown in Fig. 82.

At station 3.14 (Fig. 14) and stations adjacent thereto, the lamp socket 58 (Fig. 13) is placed in the case 52 in such way that the tangs 59, while unbent and extending vertically, will be received in front of the hooks 22 of slides 21 as shown in Fig. 76. It will be understood that socket 58 is not yet in the holder 3 while as station 3.10. Socket 58 is shown in Fig. 76 for the purpose of showing the relation of the socket tangs 59 to the slide hooks 22 when the socket is placed in the case 52.

*Station 3.15, bend out tangs*

The tang bending apparatus will now be described with reference to Fig. 84 through 89. A bracket 640 supported by a bracket 641 supports a cylinder C13 (Fig. 84A) containing a piston connected by a rod 642 with a block 643 connected with a plate 644 carrying bushings 645 receiving guide rods 646 supported by bracket 640. Plate 644 supports sleeves 647 which receive pusher bars 648 urged down by springs 649 until flanges 650 of the bars 648 are received by shoulders 651 of sleeves 647. Plate 644 supports a sleeve 652 receiving a punch 653 which a spring 654 urges downwardly until a flange 655 of the punch engages a shoulder 656 of the sleeve 652. When the work holders 3 containing all of the switch parts arrive in alignment with rod 642, pressure fluid is admitted to the upper end of cylinder C13 to cause rod 642 to move down. This down movement causes the pushers 648 supported by plate 644 to engage slides 28 (Fig. 89) which engage the sides of the switch case 52 with yielding pressure provided by compressed springs 649. At the same time, spring 654 acting through pusher 653 applies yielding pressure to the lamp socket 58 to push it into the case 52 as far as it should go. Then, a slide 660 (Fig. 85) is caused to move up by means to be described. Slide 660 carries a plate 661 which together with the slide supports rods 662 and 663 supporting, respectively, levers 664 and 665. Lever 665, which is bifurcated, is connected at its lower ends with links 666 (Fig. 87) connected by pivot screws 667 with a block 668 connected with a piston rod 669 of a piston contained in a cylinder C14 attached to a pad 670 attached to lever 664. Normally, pressure fluid is admitted to the left end of cylinder C14 in order to cause the lower ends of levers 664 and 665 to move closer together and their upper ends to move further apart than shown in Fig. 84. This is the status of levers 664 and 665 when their supporting slide 660 is below the position shown in Fig. 85 so that the upper ends of the levers 664 and 665 are normally clear of the work holder support so that the conveyor can be indexed.

After the conveyor has moved the work holder to station 3.15, the slide 660 is caused to move up in the position shown in Fig. 85 and the pressure fluid is admitted to the right end of cylinder C14 to cause the lower ends of the levers 664 and 665 to separate and the upper ends thereof to move together as shown in Fig. 84. Movement of the upper ends of levers 664 and 665 causes plates 671 (Fig. 89) carried thereby to push against work holder levers 24 to move their lower ends toward each other and to separate their upper ends further so that the slides 21 are retracted. Blocks 672 carried by levers 664 and 665 move together, and the nut 17 of holder 3 is received in recesses 672a of the blocks 672. A stud 673 engages nut 17 of holder 3 (Fig. 89) when slide 660 is in upper position. During retraction of slides 21, hooks 22 engage the lamp socket tangs 59 and bend them into position shown in Figs. 13 and 89, thereby retaining the socket 58 in the case so that it will retain washer 57 and spring 56 as shown in Fig. 13. The right-hand portion of Fig. 89 shows lever 665 in its upper position and after having moved to effect retraction of a slide 21. The left-hand side of Fig. 89 shows, in full lines, the lever 664 in its down position, the upper end thereof being retracted. The position 664' of lever 664, shown in dot-dash lines is the upper position of this lever while still retracted preparatory to retracting slide 21. Before lever 664 moves its plate 671 (at 671') into a position corresponding to the position of plate 671 carried by lever 665, the left hand lever 24 is at 24' and the left hand hook of slide 21 is at 22'.

The retraction of levers 664 and 665 is limited by engagement of their upper ends with screws 675 threaded through brackets 676 supported by slide 660 and secured in adjusted position by lock nuts 677.

The raising and lowering of the slide 660 is effected by admission of pressure fluid to a cylinder C15 which is mounted on a bracket 680 (Fig. 85A) attached to a channel 62 and containing a piston connected by a rod 681 with a yoke 682 connected by link 683 with a pin 684 which connects toggle links 685 and 686 connected, respectively, by pins 687 and 688 with slide 660 and a screw 689, said screw being adjustably supported by the bracket 641. Admission of pressure fluid to the right end of cylinder C15 causes the toggle links 685 and 686 to be straightened to lift the slide 660; and admission of pressure fluid to the left end of cylinder C15 causes the links to be disaligned and slide 660 to be lowered. Slide 660 (Fig. 86) is guided for vertical movement by rails 690 and a plate 691 which is supported by bracket 641. Before the next indexing operation, pressure fluid is admitted to the lower end of cylinder C13 to cause the punch 653 to rise to clear work holder 3. Pressure fluid is admitted to the left end of cylinder C15 to cause slide 660 to descend and pressure fluid is admitted to the left end of cylinder C14 to cause separation of the upper ends of levers 664 and 665.

To prevent raising the product switch, when punch 653 (Fig. 89) moves up, a stripper finger 700 (Fig. 90) is caused to advance upon the switch case. Finger 700 is carried by a lever 701 pivoted at 701a on a yoke 702 attached to a lever 703 pivoted on a rod 703a, the ends of which are received by slots 704a of a bracket 704. Springs 703b urge rod 703 to the right in Fig. 90. A tube 705 supports a rod 706 which a spring 707 urges left. At the proper time, compressed air is admitted to the right end of a cylinder C16 supported by bracket 704 to cause its piston rod 708 to move left to rotate levers 703 and 701 counterclockwise so that stripper 700 will engage the case 52 if present. If not present, lever 703 can be moved by the piston rod 708 far enough to open a switch SW29 so that a counter operating solenoid will not be energized at the time when counting should take place.

*Station 3.16, unload completed switch*

Referring to Figs. 92 and 93, cam shaft 105 operates cams 710 engaging followers 711, each carried by lever 712 pivotally supported by bracket 713 and urged clockwise by a spring 714. Each lever 712 is connected by link 715 with a lever 716 pivotally supported by a bracket 716a and connected by link 717 with a lever 718 pivotally supported by rod 719 supported by bracket 720. After the work holder arrives at station 3.16, the cams 710 effect, by the mechanism described, movement of the upper ends of levers 718 toward each other so that they will engage work holder levers 24 and cause them to return to their normal position shown in Fig. 4 so that the completed switch can be manually removed from work holder 3 and inspected.

*Electrical controls*

Referring to Fig. 94, a switch SW1, when closed, connects a three-phase 220 volt A. C. source with wires 721, 722 and 723 which are connected by contacts of relays PR1, PR2, PR3 and PR4 respectively with machine driving motor M1, eyelet hopper feed motor M2, cup hopper feed motor M3, and button hopper feed motor M4. Wires 721 and 723 are connected with primary coil $p1$ of transformer TR1 having a secondary winding $s1$ connected with wires 736 and 737. Terminals of the four motors are connected, respectively, with contacts of their associated relays by heater resistances $h1$, $h1$ and $h2$, $h2$ and $h3$, $h3$ and $h4$, $h4$. In case of overload of the motors, one or both of each pair of heater resistances will separate normally closed thermo switch contacts which are marked $t1$, $t2$, $t3$, $t4$ in circuits I–IV.

Circuit I includes a normally opened switch PB1a, a normally closed switch PB1b, a normally opened pressure responsive switch PS1, thermo switches $t1$ and a relay coil PR1c. When a source of fluid pressure is connected with valves which control air cylinder, switch PS1 closes. Then, motor M1 can be started by closing switch PB1a, thereby completing circuit I and relay coil PR1c is energized and relay contacts PR1a, PR1b and PR1d close to connect motor M1 with the power source, switch SW1 having been closed. Also contacts PR1e are closed to bypass switch PB1a. Then, switch PB1a can be released. Motor M1 is stopped by opening normally closed switch PB1b or by failure of fluid pressure to maintain switch PS1 closed.

Circuit II includes normally open switch PB2a, normally closed switch PB2b, normally closed thermo switch contact $t2$ and relay coil PR2c. The eyelet feeder motor M2 is started by closing switch PB2a or it can be started by the closing of contacts R8a of relay R8 which closes when relay coil R8c (circuit VIIIA) is energized. This coil is energized by completion of movement of the machine starting lever 133 (Fig. 18) to start position which momentarily moves switch SW32 from the full line position to the dot-dash line position marked SW32'. Before switch SW32 can return to the full line position, contact R8d closes and the circuit is completed between wires 736 and 737 through a switch SW4 (circuit IX) so that coil R8c remains energized until the machine is stopped by movement of the control lever 133 to stop position which opens switch SW4 in circuit XI. Therefore, whenever the machine is stopped by movement of the control lever to stop position, the contacts R8a open. Since switch PB2a is a normally open push button switch not normally used to start motor M2. Motor M2 is stopped so that the eyelets will not be tumbled in the hopper feed while the machine is stopped. Therefor the abrasion of one eyelet upon another to remove its bright plating will be reduced to the minimum. Eyelet hopper feed motor M2 can be momentarily stopped by opening switch PB2b.

Cup feeder motor M3 is started by energizing relay coil PB3c in circuit III. This is effected normally by the closing of relay contacts R8b which close during movement of the machine control lever 133 to start position. Motor M3 can be started manually by closing push button switch PB3a and can be stopped manually by opening push button switch PB3b. As in the case of eyelets, the contact cups which are bright plated are not tumbled about in the hopper feed drum when the machine is not operating.

The button feeder motor M4 is caused to operate by energization of relay coil PB4c in circuit IV which is connected with wires 725 and 726 by momentary closure of switch PB4a. Energization of coil PB4c closes contacts PR4e which bypass switch PB4a. Motor M4 is stopped by opening switch PB4b.

The flash particles are blown out of the switch case by opening of an air valve controlled by a solenoid S4 (circuit V), when this solenoid is energized by closure of switch SW8.

Circuit VI includes a relay coil R7c which is energized by closure of cam controlled switch SW2. When coil R7c is energized, it closes contacts R7a in circuit VII, thereby effecting energization of solenoids S20 and S18 which, respectively, operate to cause the feeding of a switch button at station 1.3 and a contact cup at station 1.1.

Energization of coil R7c effects closure of contacts R7b in circuit VIII which include in parallel a normally closed switch SW10 and a normally opened switch SW11. This parallel circuit is in series with normally closed contact PR1b of a relay having a coil R1c in this circuit. If the contact cup is located upon holder 1 with its angular flange extending upwardly, the feeler at station 1.2 will open switch SW10 and coil R1c is not energized at a time following closure of contacts R7b resulting from closure of cam controlled switch SW2. If the contact cup is inverted, switch SW10 remains closed. If the contact cup is missing, switch SW11 closes. In either event, coil R1c is energized and contacts R1b open and contacts R1a close. Energization of coil R1c is maintained by switch SW32 in circuit VIIIA. Lamp L4 burns to indicate an inverted or a missing contact cup.

If the switch button 51 is missing at station 1.3, the feeler at the station closes switch SW9 which causes lamp L3 to burn to indicate a missing button and the attendant places a button in holder 1. If the button fed to holder 1 at station 1.3 is inverted, the checker at station 1.4 causes switch SW35 to close and relay coil R6c is energized, contacts R6a open and contacts R6b close to maintain energization of coil R6c. Lamp L2 burns to indicate an inverted button on holder 1. Energization of coil R1c, circuit VIII, which occurs, as stated before, if the contact cup is missing or is inverted, effects closure of contacts R1d, circuit IX, and coil R4c is energized. Also, if coil R6c is energized because the button is inverted, contacts R6b close to effect energization of relay coil R4c. When this coil is energized, relay contacts R4a close to effect energization of solenoid S19 which moves the control lever 133 to stop position to stop the machine and to open switch SW4 to open circuit relay coil R4c to deenergize solenoid S19. Relay coil R8c is also deenergized and its contacts R8a in circuit II open to cause the eyelet feeder motor M2 to stop; its contacts R8b, circuit III, open to cause cup feeder motor M3 to stop; and its contacts R8d open so that coil R8c is opened preparatory to the next movement of the control lever 133 from stop to start position. When the lever is thus moved, switch SW4 closes and switch SW32 moves momentarily to position SW32' so that coil R8c is energized to effect operation of eyelet feeder motor M2 and cup feeder motor M3.

Referring to Fig. 95, wires 736 and 737 are connected in circuit XV with primary coil p2 of transformer TR2 whose secondary coil s2 is connected at one end with ground and with a wire 767 and at the other end with relay coil R9c which is connected with the test prod 610 (Fig. 80) which is caused to engage spring portion 56a. Circuit 610' represents a ground connection from eyelet 54. If current passes between the contact 50 and the eyelet 54, coil R9c is energized and contacts R9a (circuit XI) close and coil R10c is energized and contacts R10b (circuit XIA) close to maintain energization of coil R10c until after the next index following which a cam controlled switch SW21 opens to deenergize coil R10c. Contacts R10a (circuit XXI) open to prevent the operation of a solenoid S21 which, if it operated, would effect retraction of slides 21 of holder 3 and spring 56 would be released to pop the washer 57 out of the case. If no current passes between contact 50 and eyelet 54 when the test prod 610 is down, coil R9c is not energized, coil R10c is not energized, and contacts R10b (circuit XXI) remain closed while the work is at station 3.12 and remain closed during indexing to station 3.13. After completion of this index, a cam controlled switch SW5 closes to effect energization of solenoid S21 through closed contacts R10b and the slides 21 of holder 3 retract and spring 56 is released and washer 57 pops up out of the case 52. Thus the attendant knows that the switch is defective and removes it from its holder at station 3.13. Switch SW5 in circuit XVIII controls energization of solenoid S23 which causes down movement of the test prod 610. Cam controlled switch SW6 closes to effect energization of solenoid S24 for raising the test prod 610 and energization of solenoid S22 to effect retraction of the mechanism which has caused retraction of slides 21.

If there is no case in holder 2 at a station 3.5 ahead of eyelet staking station 3.6, switch SW20 (circuit XXI) does not close and the eyelet staking operation is not performed when the holder moves to station 3.6. If the case is present at station 3.5, switch SW20 closes and coil R2c (circuit XII) is energized when a cam controlled switch SW14 closes. When a cam controlled switch SW16 closes (circuit XIII), energization of coil R2c is maintained through its closed contacts R2b. Energization of coil R2c is maintained during the following index and until after closure of switch SW5 (circuit XVIII). Therefore contacts R2a will be opened and closure of switch SW5 will not effect energization of solenoid S13 and the eyelet staker will not move down at station 3.6. If the case 52 had been in holder 3 at station 3.5 at the time switch SW14 closed, switch SW20 would be opened and coil R2c would not have been energized. Therefore, at station 3.6, the closure of switch SW5 effects energization of solenoid S13 because contacts R2a (circuit XVIII) remain closed. Energization of solenoid S13 causes down movement of the staker punch at station 3.6. The staker punch moves up following energization of solenoid S14 (circuit XX) by closure of switch SW6 which concurrently effects energization of solenoid S24 to cause the test prod 610 to move up and energization of solenoid S22 to cause the rejection apparatus to return to normal status.

If the cup button assembly is not present in holder 3 at station 3.8, switch SW31 is closed by the feeler 547 (Fig. 90). Therefore, when switch SW14 closes in circuit XII, relay coil R3c is energized and it opens its contacts R3a in circuit XII and it closes its contacts R3a in circuit XIII. Cam controlled switch SW16 having been closed, energization of coil R3c is maintained after the next indexing. Cam controlled switch SW2 (circuit VI), having been closed to cause relay coil R7c to be energized, contacts R7d (circuit XVII) are closed. Therefore bell b in that circuit rings to notify the attendant that the cup button assembly is missing at the station following station 3.8. Then, the attendant manually places a cup button assembly in the switch case.

Cam controlled switch SW7 (circuit XIV) having been closed, if a completed switch is in holder 3 at station 3.15, switch SW29 closes and solenoid S17 is energized to cause a counter to add one to its count of the number of switches produced since the counter had been reset to zero.

The operation of the case transfer mechanism for transferring the case from holder 2 at station 2.3 to holder 3 at station 3.3 is controlled by solenoids S5, (circuit XXIII), S6 (circuit XXV), S7 (circuit XXVII) and S8 (circuit XXIX). This control is effected by six switches which are closed momentarily in the following sequence following the indexing operation: switch SW40 closes to energize solenoid S7 which causes the case gripping collet to move into alignment with holder 2; switch SW38 closes to energize solenoid S5 to cause the collet to move down to grip a switch case; switch SW39 closes to energize solenoid S6 to cause the collet to ascend and lift a switch case from holder 2; switch SW41 closes to energize solenoid S8 to cause the collet carrying the switch case to move into alignment with holder 3; switch SW38A closes to energize solenoid S5 to cause the collet to move the switch case into holder 3; and switch SW39A closes to energize solenoid S6 which causes the collet to move up empty to a position above holder 3. The cycle ends with the empty case gripping collet above holder 3.

The button is transferred from holder 1 to holder 3 by the same process. The cycle starts with the button collet above holder 3. Switch SW40 closes to energize solenoid S11 which causes the button collet to move from holder 3 to holder 1. When switch SW38 closes, solenoid S9 is energized to cause the collet over holder 1 to move down preparatory to gripping a button. Switch SW39 closes to energize solenoid S10 which causes the button collet to ascend over station 1 with a button gripped thereby. Switch SW41 closes to energize solenoid S12 to cause the button collet to carry a button into alignment with holder 3. Switch SW38A closes to energize solenoid S9 which causes the button collet carrying the button to descend to place the button in holder 3. Switch SW39A closes to effect energization of solenoid S10 to cause the button collet to move up empty over holder 3.

The switches 38 through 41 are mounted upon a plate 800 (Fig. 96) supported by a bracket 101 and having an opening 802 coaxial with cam shaft 105 which drives a disc 803 carrying a roller 804 for engaging a series of levers, one of which is shown in Fig. 96 and is marked 805. Lever 805 is supported by a bearing 806 (Fig. 97) supported by a bracket 807 which is secured to plate 800 in a desired position of angular adjustment relative to shaft 105 by means of screws 807a (Fig. 97A) which pass through one or more of arcuate slots 808 with which the plate 800 is provided. Each bracket 807 has an arm 809 for supporting a switch, for example, switch SW38A shown in Figs. 96 and 97. A spring 810 urges lever 805 counterclockwise from the position shown in Fig. 97 so as to effect depression of the switch button 811 for the purpose of opening the switch. When roller 804 engages lever 805, this lever moves clockwise in opposition to spring 810 and the switch button 811 is permitted to move up by spring in the switch to close the switch. Therefore, each switch is closed only during the time the roller 804 has pushed the lever 805 clockwise into the position shown in Fig. 97. Rotation of shaft 805 is counterclockwise. Therefore, the switches which are angularly located upon plate 100, as indicated by the diagram, Fig. 98, will be momentarily closed in succession in the sequence which has been described.

In Fig. 99, the contacts and coils of the relay switches are shown diagrammatically in assembled relation and their connection in the circuits shown in Figs. 94 and 95 are indicated by wires numbered to conform to the numbering of wires shown in Figs. 94 and 95.

Fig. 100 shows a main pipe 820 which is connected by a valve 821 with a compressed air source and which is connected with pressure responsive switch PS1. Pipe 820 is connected by branch pipes with valves V1—V16 which respectively control the admission of compressed air to the ends of cylinders C1—C16 respectively. Some of these valves are controlled by solenoids which are controlled by the switches at the bottom of Fig. 100 which operate for effecting the movements which have been described.

Fig. 101 shows cams which have not previously been shown and the switches or valves which they control.

Fig. 102 shows the timing of all the cams of the machine in relation to a machine cycle of one rotation of cam shaft 105, said cycle starting with the beginning of indexing the conveyor.

While the embodiments of the present invention as herein disclosed, constitute a preferred form, it is to be understood that other forms might be adopted.

What is claimed is as follows:

1. In a machine for assembling a push button switch including a nonconducting case having a side opening therein and an eyelet receiving hole, a metal case mounting member having an eyelet receiving hole, a metal eyelet for attaching the case to the member, a push button extending through the eyelet, a contact attached to the button and engaging the eyelet, a spring in the case for urging the contact against the eyelet, a spring retainer in contact with said spring in said case and a terminal providing member attached to the case at said side opening and engaged by the spring retainer, the combination comprising a plurality of work holder supports, a conveyor for moving the supports successively to a plurality of stations, means for indexing the conveyor, each support having a holder which supports a first assembly of eyelet, mounting member and nonconducting case and a second assembly of button and contact when inserted within the case, and a spring supported by the second assembly and a spring retainer therefor, said retainer being adapted to be moved toward the button and away from said side opening for compressing said spring preparatory to assembling the terminal providing member with the case, means at a station for pushing said retainer toward the button and out of register with said opening, means provided by the holder for engaging the retainer to keep said spring in a compressed state, means for advancing the retainer engaging means through said case opening and into engagement with said retainer while the spring is compressed, means for retracting the retainer engaging means, said terminal providing member being adapted to be secured to the case by bending a part thereof into said side opening of the case, and means provided by the retainer engaging means for bending said part when the retainer engaging means is retracted.

2. In a machine for assembling a push button switch including a nonconducting case having a recess in the inner wall thereof, an eyelet receiving hole, a metal case mounting member having an eyelet receiving hole, a metal eyelet for attaching the case to the member, a push button extending through the eyelet, a contact attached to the button and engaging the eyelet, a spring in the case for urging the contact against the eyelet, a nonconducting washer engaging the spring, and a terminal providing lamp socket attached to said case, having a bayonet slot for receiving a pin projecting from a lamp base having a center contact, said spring providing a contact adapted for engaging the lamp base center contact, the combination comprising a plurality of work holder supports, a conveyor for moving the supports successively to a plurality of stations, and means for indexing the conveyor, each support having a holder which supports a first assembly of eyelet, metal mounting member and nonconducting case and a second assembly of button and contact within the case, and a spring supported by the second assembly within said nonconducting case and having a washer supported thereby, said washer being adapted to be moved toward the button for compressing said spring preparatory to assembling the socket with the case, means provided by the holder adapted to enter the case through said opening for engaging the washer and maintain said spring in a compressed state, means for advancing the washer engaging means into engaging position when said spring is compressed, means for retracting the washer engaging means, said lamp socket having a tang adapted to be received by said recess in the nonconducting case when the tang is bent to retain the lamp socket in the case, and means provided by the washer engaging means for engaging the tang and bending it into said recess of the case during retraction of the washer engaging means.

3. In a machine for assembling a switch which includes a tubular, nonconducting case open at one end and providing at the other end a fixed contact having a central hole and having side openings on the external sides thereof, a push button extending from within the case through the hole, a movable contact attached to the button and adapted to engage the fixed contact, a spring in the case for urging the movable contact against the fixed contact, a spring retainer in contact with said spring in the case and a terminal member having tangs adapted to bend over an edge of said openings for being attached thereto and engaged by the spring retainer, the combination comprising a plurality of work holder supports, a conveyor for moving the supports sequentially to a plurality of stations, means for indexing the conveyor at said stations, each support carrying a work holder adapted to support the case vertically therein, slides supported by the holder and adapted for moving laterally of the case from a fully retracted position to an advanced position for extending through the side openings of the case, means at a station for pushing the spring retainer toward said button to a location out of register with the slides, means for advancing the slides for holding the spring retainer in said pushed position preparatory to retraction of the spring retainer pushing means, said slides having hooks adapted, when the slides are fully advanced, for engagement with said tangs supported by said slides in alignment with said opening when said terminal member is placed in the case above the spring retainer and means for retracting the slides to cause the hooks to engage the tangs to bend them into the side holes of the case and against the case wall to fasten the terminal member to the case, sequentially followed by a retraction of the slides for permitting the spring to urge the spring retainer against the terminal member.

References Cited in the file of this patent

UNITED STATES PATENTS

| Number | Name | Date |
|---|---|---|
| 691,012 | Sibley | Jan. 14, 1902 |
| 1,114,301 | Smith | Oct. 20, 1914 |
| 1,118,590 | Sharp | Nov. 24, 1914 |
| 1,372,350 | Hunn | Mar. 22, 1921 |
| 1,456,796 | Gross | May 29, 1923 |
| 1,482,687 | Kraft | Feb. 5, 1924 |
| 1,600,517 | Sibley | Sept. 21, 1926 |
| 1,701,250 | Young | Feb. 5, 1929 |
| 1,854,371 | Engel | Apr. 19, 1932 |
| 1,871,382 | Meyer | Aug. 9, 1932 |
| 1,941,992 | Makenny | Jan 2, 1934 |
| 1,948,466 | Broecker | Feb. 20, 1934 |
| 2,192,106 | Ross et al. | Feb. 27, 1940 |
| 2,207,179 | Schrieber | July 9, 1940 |
| 2,310,008 | Wolff et al. | Feb. 2, 1943 |
| 2,315,340 | Knudsen | Mar. 30, 1943 |
| 2,350,020 | Drake et al. | May 30, 1944 |
| 2,359,433 | McNamara | Oct. 3, 1944 |
| 2,365,803 | Chambers | Dec. 26, 1944 |
| 2,374,464 | Skriba | Apr. 24, 1945 |
| 2,398,550 | Nelson | Apr. 16, 1946 |
| 2,539,085 | Kerseg | Jan. 23, 1951 |
| 2,545,808 | Du Pree | Mar. 20, 1951 |
| 2,548,991 | McNabb | Apr. 17, 1951 |
| 2,554,982 | Hartley | May 29, 1951 |
| 2,571,977 | Warren | Oct. 16, 1951 |
| 2,621,824 | Gookin | Dec. 16, 1952 |

FOREIGN PATENTS

| Number | Country | Date |
|---|---|---|
| 368,581 | Great Britain | Mar. 10, 1932 |